United States Patent [19]
Gotoh et al.

[11] Patent Number: 5,825,377
[45] Date of Patent: Oct. 20, 1998

[54] METHOD AND APPARATUS FOR INK-JET RECORDING WITH INKS HAVING DIFFERENT DENSITIES

[75] Inventors: Fumihiro Gotoh, Kawasaki; Hiromitsu Hirabayashi, Yokohama; Toshio Kashino, Chigasaki; Hiroshi Tajika, Yokohama; Yuji Akiyama, Yokohama; Hitoshi Sugimoto, Yokohama; Miyuki Matsubara, Tokyo; Hidehiko Kanda, Yokohama, all of Japan

[73] Assignee: Canon Kabushiki Kaisha, Tokyo, Japan

[21] Appl. No.: 901,957

[22] Filed: Jul. 29, 1997

Related U.S. Application Data

[63] Continuation of Ser. No. 234,958, Apr. 28, 1994, abandoned.

[30] Foreign Application Priority Data

| Apr. 28, 1993 | [JP] | Japan | 5-102758 |
| Apr. 28, 1993 | [JP] | Japan | 5-102759 |
| May 31, 1993 | [JP] | Japan | 5-129149 |

[51] Int. Cl.$^6$ .................................... B41J 2/205
[52] U.S. Cl. .................. 347/15; 347/43; 347/12
[58] Field of Search .................... 347/15, 9, 12, 347/43, 14

[56] References Cited

U.S. PATENT DOCUMENTS

| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 5,142,374 | 8/1992 | Tajika et al. | 347/15 |
| 5,343,231 | 8/1994 | Suzuki | 347/15 |

FOREIGN PATENT DOCUMENTS

| 59-123670 | 7/1984 | Japan. |
| 59-138461 | 8/1984 | Japan. |
| 2210962 | 8/1990 | Japan. |

OTHER PUBLICATIONS

Floyd et al., "An Adaptive Algorithm for Spatial Grey Scale," SID 75 Digest, pp. 36–37.

*Primary Examiner*—Valerie Lund
*Attorney, Agent, or Firm*—Fitzpatrick, Cella, Harper & Scinto

[57] ABSTRACT

An ink jet recording apparatus and ink jet recording method record using different kinds of ink each having the same series color and a different density. The jet recording apparatus includes a converting unit for converting an input image density signal into an output image density signal, a binary unit for converting the output image density signal into binary data, an inverting unit for inverting the binary data, and a distributing unit for distributing the binary data inverted and binary data to be inverted to drive data for an ink discharge unit and drive data for another ink discharge unit. Density unevenness and texture which arise from an image process, particularly a binary process, can be prevented. Different kinds of ink, each of which has the same series color and a different density, are respectively scanned so as not to overlap on the same pixel. Density unevenness due to ink soaking can be suppressed because different kinds of ink each having the same series color and a different density, are not shot at the same position.

17 Claims, 41 Drawing Sheets

FIG. 14
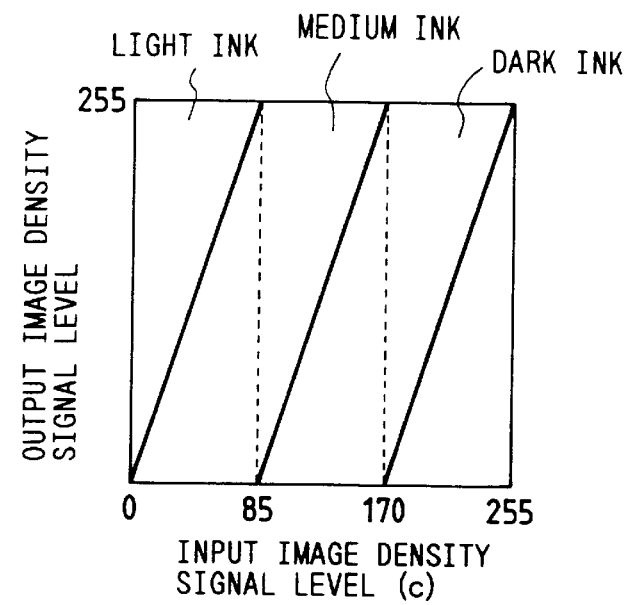
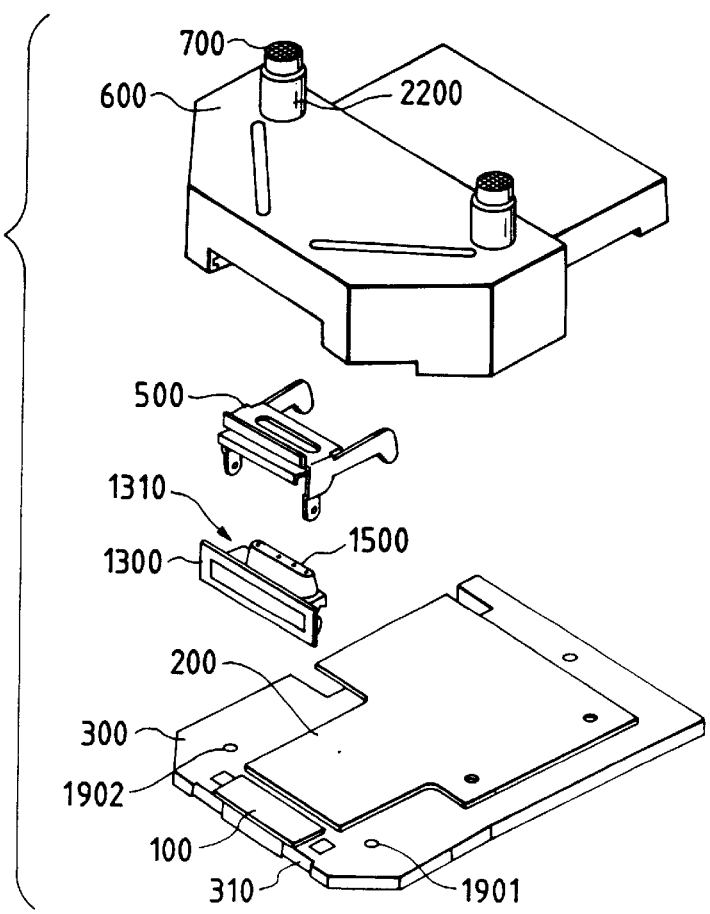
FIG. 16

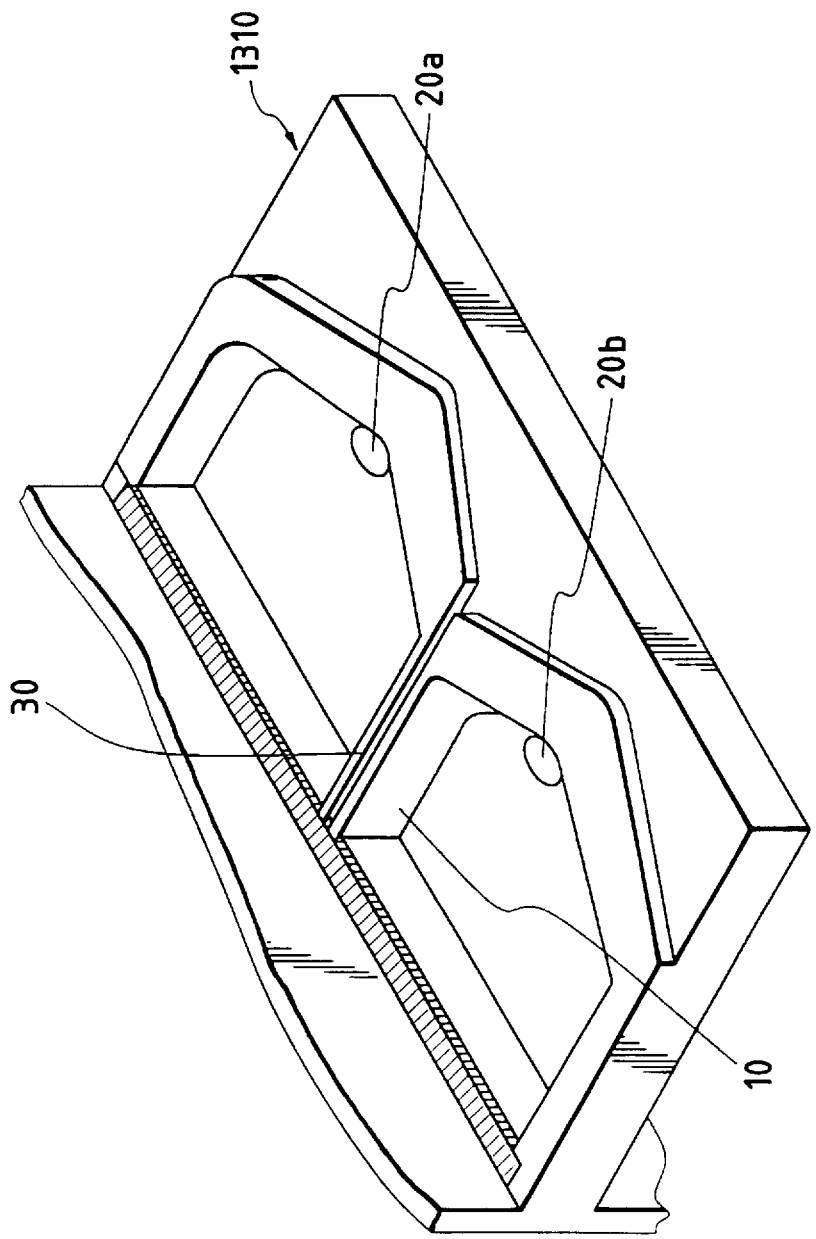

FIG. 40A

MULTI-VALUE DENSITY DATA

| f(i-2, j-1) | f(i-2, j) | f(i-2, j+1) |
|---|---|---|
| f(i-1, j-1) | f(i-1, j) | f(i-1, j+1) |
| f(i, j-1) | f(i, j) | f(i, j+1) |

FIG. 40B

TERNARIZING IMAGE DATA

| B(i-2, j-1) | B(i-2, j) | B(i-2, j+1) |
|---|---|---|
| B(i-1, j-1) | B(i-1, j) | B(i-1, j+1) |
| B(i, j-1) | B(i, j) | |

FIG. 40C

WEIGHTING MASK

| R(2, 1) | R(2, 0) | R(2, -1) |
|---|---|---|
| R(1, 1) | R(1, 0) | R(1, -1) |
| R(0, 1) | R(0, 0) | R(0, -1) |

R(0, 0) = R(0, -1) = 0

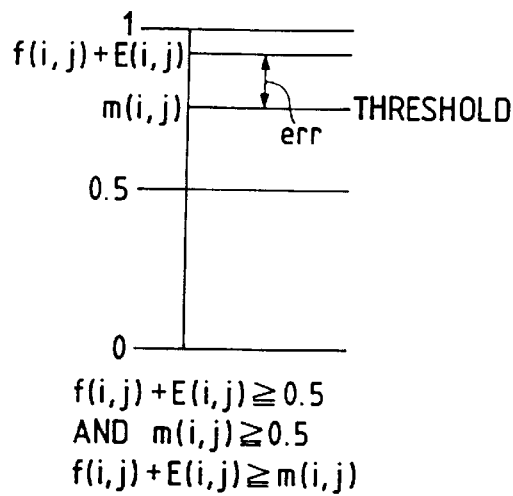
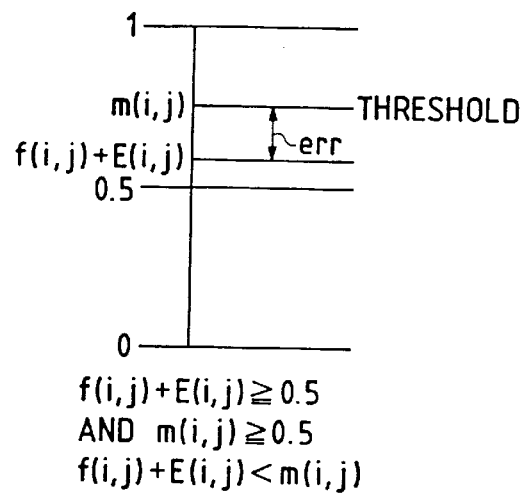
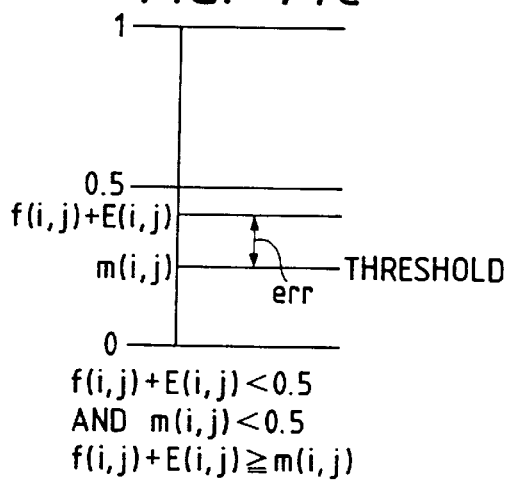
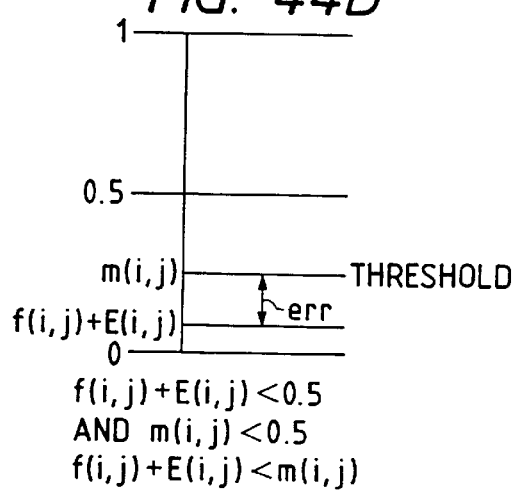
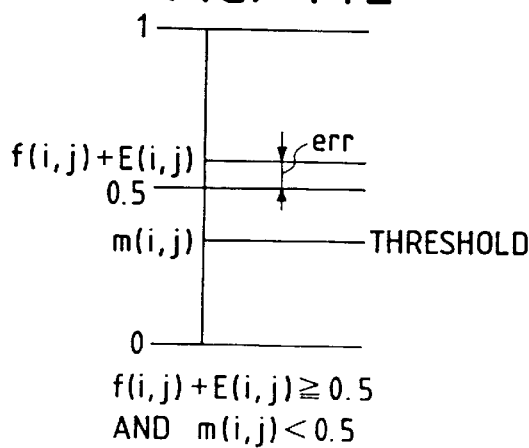
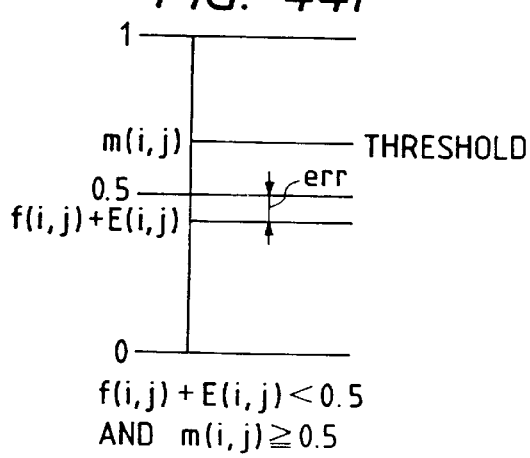

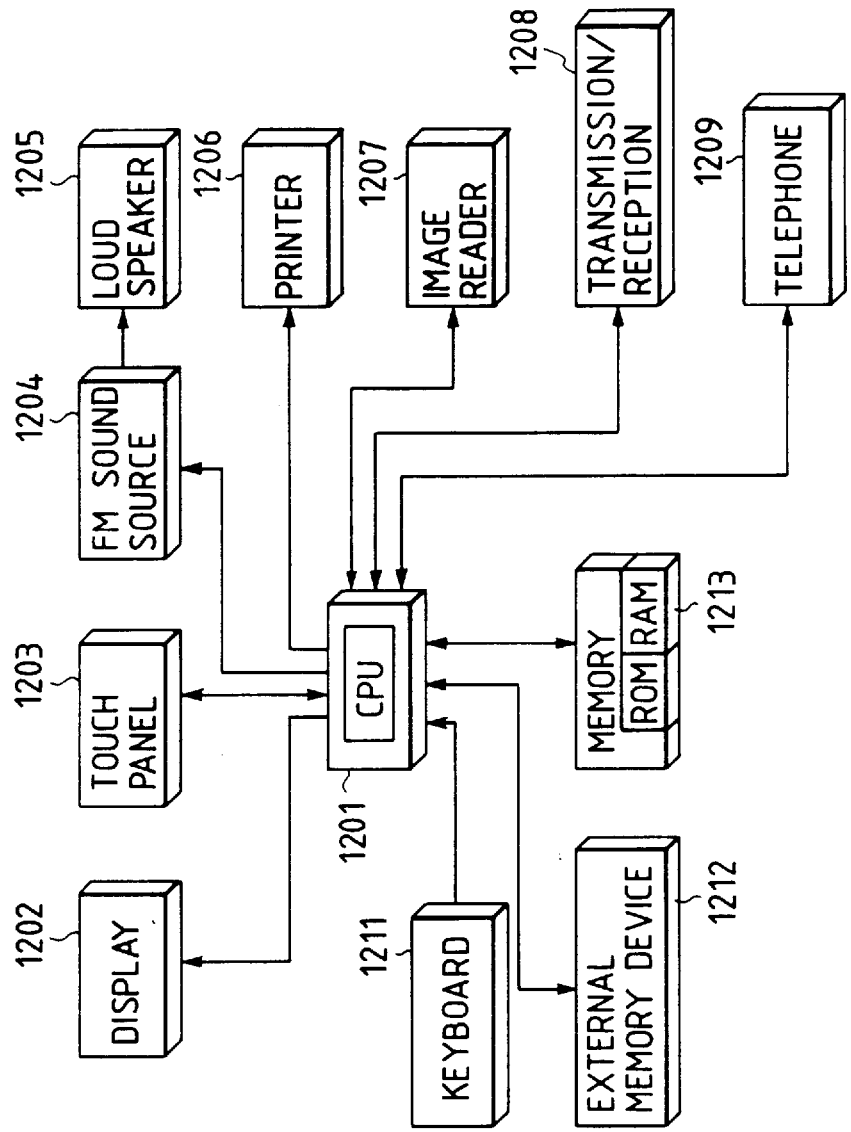

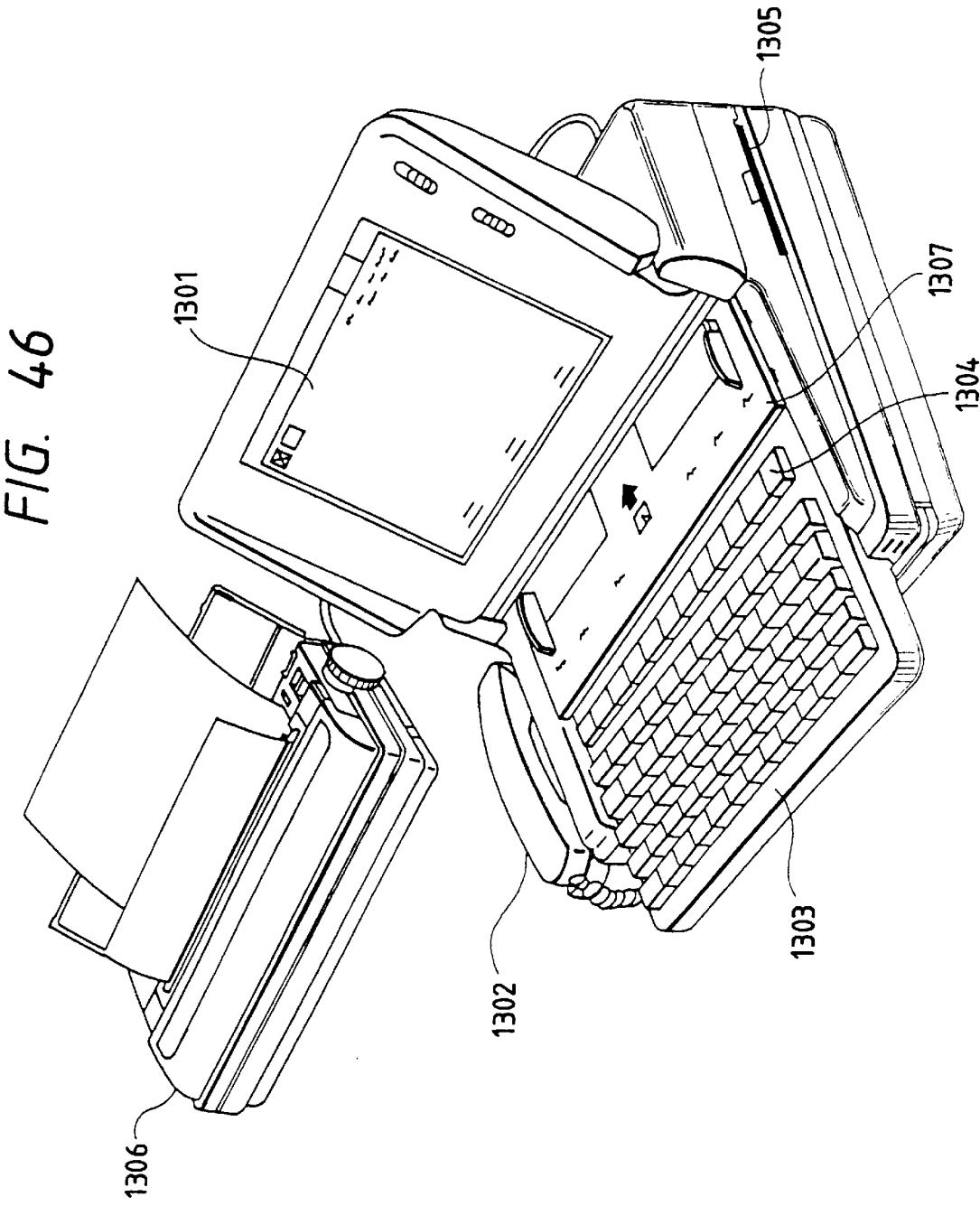

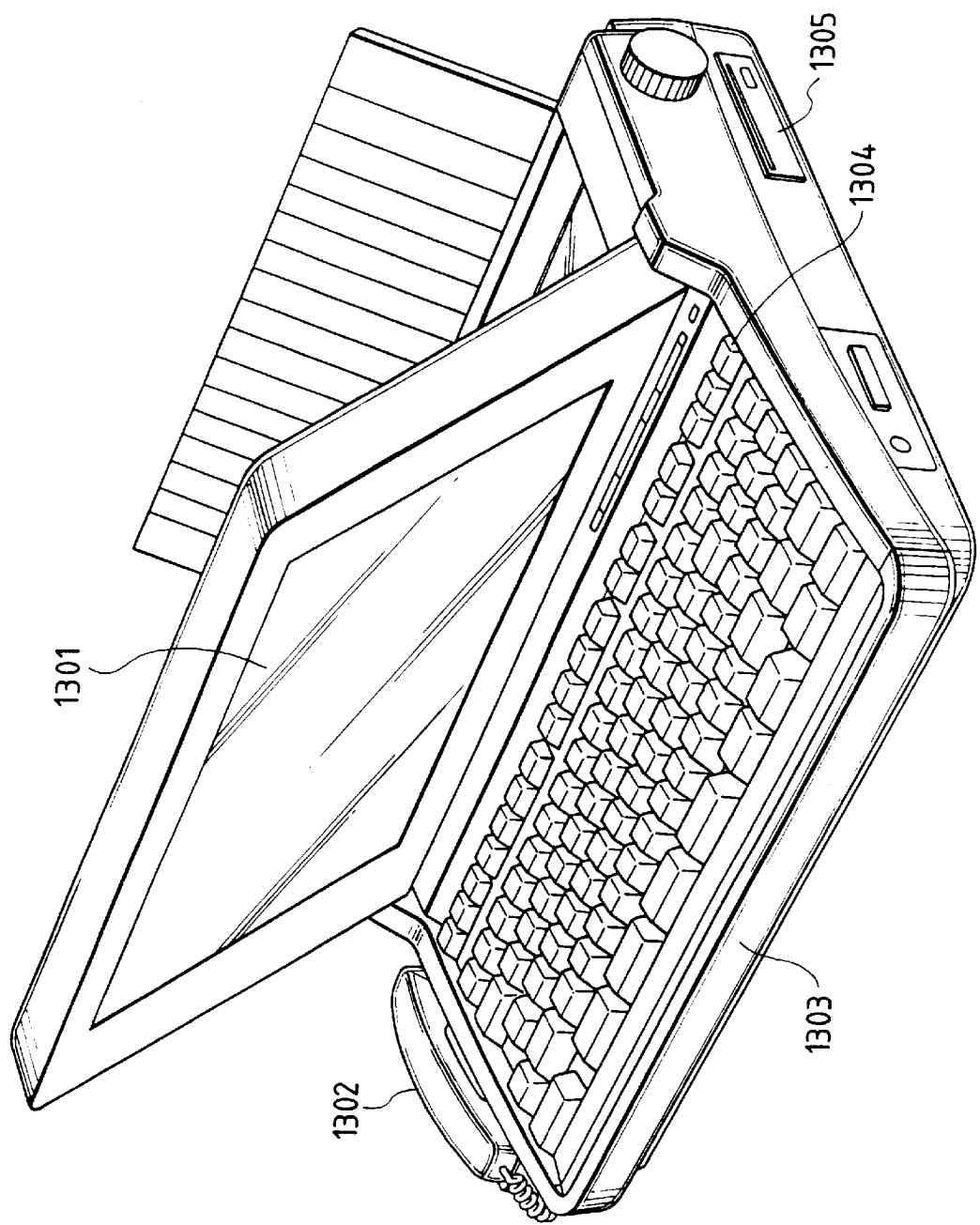

METHOD AND APPARATUS FOR INK-JET RECORDING WITH INKS HAVING DIFFERENT DENSITIES This application is a continuation of application Ser. No. 08/234,958 filed Apr. 28, 1994, now abandoned.

BACKGROUND OF THE INVENTION

1. Field of the Invention

The present invention relates to a method and apparatus for ink-jet recording by using inks of a similar color each having a different density.

2. Related Background Art

With the prevalence of information processing apparatuses such as copying machines, word processors, and computers, in addition to communication apparatuses, the use of a digital image recorder with an ink-jet recording head is spreading fast as one of these image forming (recording) apparatuses. Besides this, with the prevalence of high resolution or electrochromatic displays thereof, demand for high quality and color images is also increasing with respect to recording apparatuses. In these recording apparatuses, generally, multiple ink discharge ports and liquid paths are integrated with high density for a recording head (hereinafter referred to "multi-head") which is formed by multiple recording elements in an integrated arrangement in order to speed up the recording process, and the multi-heads can provide cyan, magenta, yellow, and black colors for color recording.

However, the multi-head made by the high-density integration of ink discharge ports and liquid paths cannot entirely satisfy the requirements, which results in causing a problem for high quality image recording because of ink dots being noticeable in a highlight region of the image. Accordingly, a multi-drop recording method has been proposed as a method for acquiring high quality images by contriving an apparatus configuration: instead of increasing the density of the integrated ink discharge ports and liquid paths, the size of the discharged ink dots is previously reduced, and then the smaller dots are duplicated several times, depending on the recording density, in the same pixels on a recording sheet. The multi-drop method slightly improves the image quality of the highlight region since it makes the dot diameter smaller than that normally available. It, however, provides limited enhancement of high quality images because of limitations on minimizing discharged ink dots due to balance against stable discharging. In addition, this method increases the number of duplication times in order to acquire the maximum density when the size of ink dots is reduced for enhancement of image quality, which lowers the recording speed significantly and causes an inconsistent relationship between the enhancement of the image quality and the recording speed.

As a method for enhancement of the image quality without increasing the integration density of the discharging port, there has been proposed a dark/light recording method which utilizes inks each having a different dyeing density and similar color; ink of a light color or light ink (ink having lower dyeing density and/or recording image density) is used for recording on highlight regions of an image to make ink dots unobtrusive and ink of a dark color or dark ink (ink having higher dyeing density and/or recording image density) is used for recording on dark regions of higher density to suppress the lowering of the recording speed.

FIG. 4 is a perspective view of one of the conventional ink-jet recording apparatuses utilizing the dark/light recording method and illustrates a main section of its configuration. In this drawing, eight ink tanks and eight multi-heads 702 are mounted on a carriage 706; the ink tanks contain dark/light inks of black, cyan, magenta, yellow, respectively, and the multi-heads are used for discharging the inks. FIG. 5 is a view of multiple nozzles arranged on the multi-heads in the z direction (viewed from the sheet) and multiple nozzles 801 are arranged on the multi-heads 702. Although the multiple nozzles 801 are arranged parallel to axis Y in the drawing, they can be arranged diagonally to some extent on the XY plane in the drawing. If so, printing is performed with different timings among respective nozzles while the heads move in a forward direction X. In FIG. 4 again, a sheet feeding roller 703 rotates in the direction of the arrow in the drawing while holding a printing sheet 707 with a supporting roller 704 to feed the printing sheet 707 in the y direction according to the rotation speed. A paper feed roller 705 functions to feed the printing sheet and to hold the printing sheet 707 in the same manner as do the rollers 703 and 704. The carriage 706 is standing by at the home position (h) indicated by a dotted line in the drawing while it does not print anything or during returning of the multi-heads.

Before starting printing, when the carriage 706 at the home position in the drawing receives a printing start instruction, it moves along a carriage guide axis 708 in the x direction to print data on the sheet within the range of width D of the recording head by discharging four-color dark/light inks depending on recording signals from n multiple nozzles 801 on the multi-heads 702 with appropriate timing on the basis of the read signal of a linear encoder 709. With this recording scan, dots are formed on the sheet by jet printing of inks such as dark black ink, light black ink, dark cyan ink, light cyan ink, dark magenta ink, light magenta ink, dark yellow ink, and light yellow ink in this order. When printing data is completed at the end of the sheet, the carriage returns to the home position and then starts printing in the x direction again. During the time between the completion of the first printing and the start of the second printing, the sheet feeding roller 703 rotates in the arrow direction to feed the sheet in the y direction only by the width D. In this manner, printing data of the multi-head width D and sheet feeding are performed at every scanning by the carriage, and then printing data on a single sheet is completed after repetition of this processing.

FIG. 6 illustrates an example of an image signal processing circuit in the ink jet recording apparatus. After color processing in a masking circuit 40 based on yellow, magenta, and cyan primary image density signals, Y1, M1, and C1, another color processing is performed by means of an under-color removal (UCR) black formation circuit 41 to convert the signals to new yellow, magenta, cyan, and black image density signals, Y36, M36, C36, and K36. Next, gamma correction is performed in a gamma (γ) correction circuit 42 by using a gamma correction table in FIG. 7. Image density signals after the correction, Y37, M37, C37, and K37 are distributed to image density signals Kk38, Ck38, Mk38, and Yk38 of higher dyeing density inks such as dark black ink dark cyan ink, dark magenta ink, and dark yellow ink, and image signals Ku38, Cu38, Mu38, and Yu38 of lower dyeing density inks such as light black ink, light cyan ink, light magenta ink, and light yellow ink in a dark/light distribution circuit 43. FIG. 8 shows one of the dark/light distribution methods. Although it is possible to calculate the signals to obtain output image density signal levels one by one on the basis of input image density signal levels, generally a dark/light distribution table based on FIG. 8 is used to speed up the processing. The dark/light distribution table is set according to the dyeing density rates so as to achieve a proportional relation between image density signal values and reflection density values after recording. After the dark/light distribution, the signals are binarized in a binarizing circuit 44 to create image signals Kk39, Ku39, Ck39, Cu39, Mk39, Mu39, Yk39, and Yu39 to be transferred to eight multi-heads 702.

As pseudo halftone processing methods with the binarizing processing which are generally known, there are a dither method, an error variance method, and an average density preservation method.

In the dither method, data of each pixel is binarized on the basis of a threshold value for each pixel determined by a dither matrix.

In the error variance method, multi-valued image data of a noted pixel is binarized (converted to the highest density level or the lowest density level) and a value of the binary level is added to a value before binarizing as described in, for example, R. FLOYD & L. STEINBERG, "AN ADAPTIVE ALGORITHM FOR SPATIAL GREY SCALE," SID 75 DIGEST, pp. 36–37.

In the average density preservation method, for example, as described in Japanese Patent Application Laid-Open No. 2-210962, threshold values are obtained on the basis of binary data around noted pixels or binary data including binarized black and white pixels which are noted, and then image data of the noted pixels is binarized on the basis of the threshold values.

Images recorded in the above methods have higher quality than the multi-drop method since light ink is used for recording data in the highlight region of an image so as to make ink dots unobtrusive and light and dark ink types are used for recording in the dark region of higher density. In the dark/light recording method, however, there are some problems caused by recording with dark/light ink of a similar color. For example, if dark/light distribution is performed as shown in FIG. 8, value 255 is always obtained as a result of addition of a dark/light output image density signal level to an input image density signal level in a region whose input image density signal level is higher than 128, therefore, the density of an inked area containing both dark and light areas of the similar color is equal to that of 100% duty. In other words, this dark/light recording consumes a large amount of ink for halftone images relative to a recording method with only dark ink, and the dark/light recording method has problems also in a halftone area which are problems in a high density inked area such as cockling of recording sheets or in an extremely high density image area in the recording method only with dark ink such as a fixing delay. The consumption of ink, however, is not a significant problem in consideration of cost performance compared with enhancement of the image quality, and the inked area density problem is not significant in comparison with the density obtained by the ink jet recording apparatus which records data only with dark ink if the configuration is changed so that an image of 100% duty can be recorded stably.

If pseudo halftone processing is used for the dark/light recording method, the following problems may occur:

If two kinds of ink each with a different density of a similar color is used for recording on the same pixel, binarizing is performed for each ink independently, which sometimes fails in acquiring the image density itself or may deteriorate the images because of the occurrence of a peculiar texture.

This is caused by the tendency of later-printed dots to sink more deeply into the recording sheet than previously-printed dots in an overlapped area when ink dots are printed over previously-printed ink dots in the ink-jet recording method. For example, if dark ink is discharged first, the density of an area having a higher rate of an overlapped area in which dark ink and light ink are discharged on the same pixels is lower than that of an area having a lower rate of an overlapped area even if an output image signal for dark ink is identical with the signal for light ink. In other words, the higher the rate of the overlapped area becomes, the more significantly the density is lowered since the light ink discharged on the dark ink dots sinks deeply and does not extend enough which does not make it possible to obtain the density itself of the light ink in the area. If this phenomenon occurs at random in the recording area, partially lower density areas may appear in the recording area which must have uniform image density in itself. Further, if such areas are repeated continuously, a peculiar texture will be made, and then it leads to deteriorating the image significantly.

If binarizing is performed for dark ink and light ink independently, a problem may occur in continuation of gradation for images with gradually changing density, even if the image density is fixed in the overlapped area of dark and light ink.

FIG. 9 is a drawing illustrating the phenomena concretely. This drawing shows an example in which only black dark/light ink is used for recording to simplify an explanation, illustrating the status of printing with dark and light heads and binarizing in the simple dither method when input image density signals at a 159/255 level are entered in the dark/light distribution table.

Output image density signals are distributed into the light head side for a 191 level and the dark head side for a 64 level on the basis of the dark/light distribution table in FIG. 8, and then they are binarized independently in the simple dither method to record data in the dark/light ink recording pixel arrangement as shown in FIG. 9. The dark ink head moves for scanning specified pixels previous to scanning with the light ink head as shown in the drawing, therefore, the dark ink is discharged to form dots first, and then the light ink is discharged in order to form dots. At the positions (shown by black solid dots in FIG. 9) where the light ink is put on the dark ink dots as described in the above, the light ink is fixed as if it sinks under the surface of the dark ink dots, therefore, the dot density of the pixels is slightly increased compared with printing by using the dark ink only and it cannot obtain an increase of the density acquired from dots recorded with the light ink independently. As a result, the dots can obtain only an output image density slightly lower than the required density in the dot forming method in FIG. 9.

In the same manner, if the error variance method or other known methods are used as a binarizing method, the arrangement of the dark/light ink recording pixels is not in order as shown in FIG. 10; the overlapped dots are disordered and it causes a density difference between overlapped areas and non-overlapped areas, and further their overlapping may cause a peculiar dark and light texture.

As described above, the dark/light recording method in which upgrading images is relatively easy also has a problem regarding the overlap between the dark ink and the light ink due to causes peculiar to the image signal processing method and the ink-jet recording. Accordingly it needs improvement in order to provide high quality images.

Further in the binarizing methods such as the error variance method and the average density preservation method, errors between multi-valued image data and binary threshold values of noted pixels are distributed into pixels around the noted pixels, therefore, the distributed error is not fixed (sometimes a large error is assigned or any error is not assigned) in the binarizing of image data obtained from the dark/light distribution table and it is difficult to obtain the image density which the image data itself has.

SUMMARY OF THE INVENTION

The present invention has been designed to solve the above problems. An object of the invention is to provide a method and an apparatus for ink-jet recording which can prevent density from becoming uneven due to binarizing data for images recorded with inks of a similar color each having a different density.

Therefore, according to one aspect of the present invention having the above object, there is provided an apparatus for forming an image by discharging ink on a recording medium with ink discharging means which can discharge multiple kinds of ink each having a different density, including means for controlling discharging in which ink is discharged from the ink discharging means so as not to match the center of printed ink dots each with a different density of a similar color on the recording medium.

According to another aspect of the present invention, there is provided a method of ink-jet recording in which multiple kinds of ink each with a different density are put on the recording medium for recording, characterized by printing without matching of printed positions of ink dots with different densities of a similar color on the recording medium.

According to another aspect of the present invention, there is provided a recorded article which has been recorded with multiple inks of different densities, characterized by printing without matching of the center of ink dots of a similar color each having a different density on the recording medium.

Accordingly, recorded articles with high quality gradation can be acquired since these are useful for suppressing uneven density caused by sinking of ink when dots are formed on the recording medium with ink of a similar color and with a different density.

In addition, according to another aspect of the present invention having the above object, there is provided an apparatus for forming an image by discharging ink on a recording medium with ink discharging means which can discharge multiple kinds of ink each having a different density, when an input image density signal has a level for recording with ink having different densities, including: means for converting the input image density signal to either an output image density signal for driving an ink discharging means for one density or an output image density signal for driving an ink discharging means for the other density to output the signal; means for binarizing the output image density signal and for inverting the binary data; and means for distributing the inverted binary data and non-inverted binary data into the data for driving the ink discharging means for one density and the data for driving the ink discharging means for the other density.

According to another aspect of the present invention, there is provided a method of ink-jet recording in which images are formed by discharging ink on the recording medium with an ink discharging means which can discharge multiple inks each with a different density, when an image is to be recorded with both dark and light ink of a similar color on the recording medium, the ink is discharged so as not to overlap the dark and light ink dots in the same pixels.

Accordingly, high quality images can be obtained since these prevent an area from having partially different densities and a peculiar dark and light texture.

In addition, to accomplish the above object, according to another aspect of the present invention, there is provided an ink-jet recording apparatus which records data by discharging ink on the recording medium from a recording head used for discharging (n−1) kinds of ink of a similar color and each with a different density, including: means for converting density data used for recording into n-valued data (n is an integer of or greater) for each pixel in the recording; and means for setting discharging data by selecting a single type of ink to be discharged on the pixel out of the (n−1) kinds of ink associated with the n-valued data converted by the n-value converting means.

According to another aspect of the present invention, there is provided a method of ink-jet recording in which data is formed by discharging ink on the recording medium, including the steps of: providing a recording head used for discharging (n−1) kinds of ink each with a different density and of a similar color; converting different density data used for recording into n-valued data for each pixel in the recording; and setting discharging data by selecting a single type of ink to be discharged on the pixel out of the (n−1) kinds of ink associated with the n-valued data.

In this configuration, the density data used for recording images or other data is converted into n-valued data for each pixel and discharging data is set by selecting a single type of ink corresponding to an n-valued data to be discharged on each pixel out of the (n−1) kinds of ink each with a different density of a similar color.

BRIEF DESCRIPTION OF THE DRAWINGS

FIG. 14 shows a conversion table for converting an input image density signal into output image density signals corresponding to inks of various densities;

FIGS. 16 and 17 are views for use in describing construction of a head unit;

FIGS. 40A to 40C and FIGS. 41A to 41D are views for use in describing a ternarizing processing according to the present invention;

FIGS. 44A to 44F are views for use in describing a ternarizing processing according to the present invention;

FIG. 45 is a block diagram showing a schematic construction of an ink-jet recording apparatus according to the present invention, which illustrates a case where it is applied to an information processing apparatus; and FIGS. 46 and 47 are views showing an outer configuration of an information processing apparatus.

DETAILED DESCRIPTION OF THE PREFERRED EMBODIMENTS

An embodiment of the present invention is described with reference to the drawings.
(First Embodiment)

Figure 1:
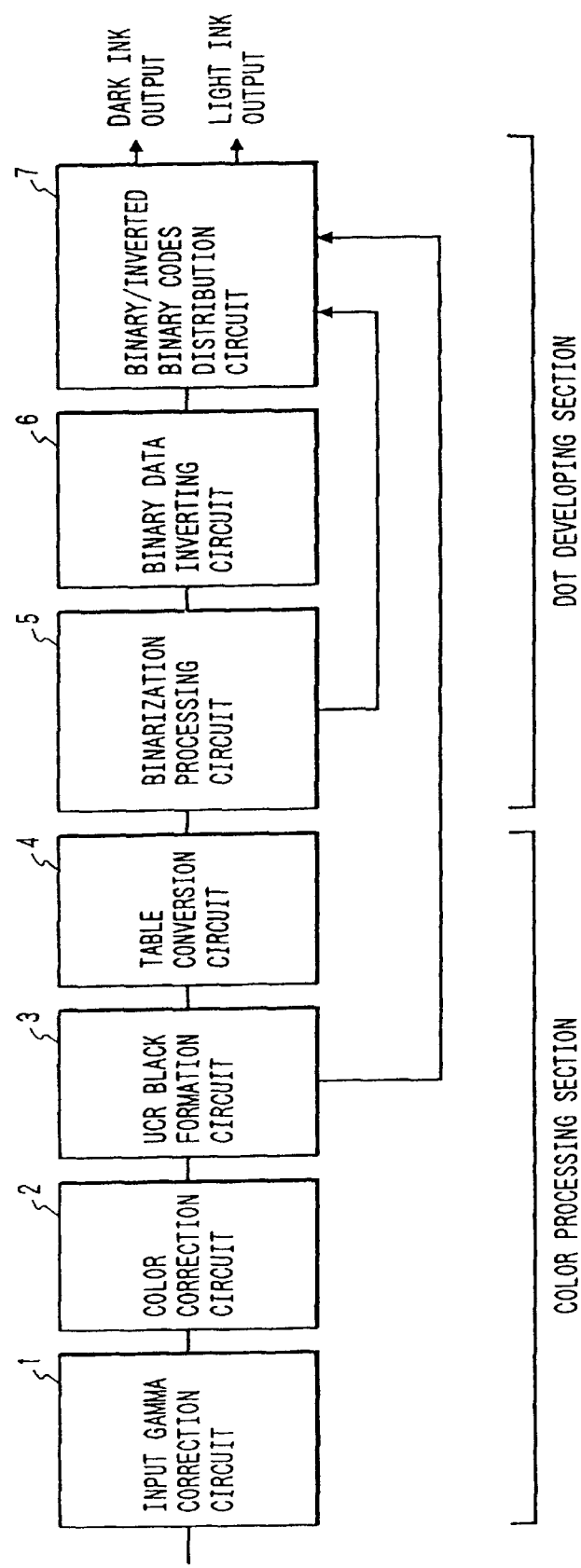
FIG. 1 is a view showing a flow of image signal processing.

FIG. 1 is a view most clearly showing a feature of the present invention. More specifically, illustrated is an example of image signal processing for generating from luminance signals of R, G, and B binary data for use in recording with dark inks of C, M, Y, and Bk and other binary data for use in recording with light inks of the same colors.

In this block diagram, an input gamma correction circuit 1 converts image luminance signals of R, G, and B for red, green, and blue, respectively, into image density signals of C, M, and Y for cyan, magenta, and yellow, respectively, according to characteristics of an input apparatus used.

A color correction (masking) circuit 2 and a black formation/UCR (undercolor removal) circuit 3 are for use in color processing of converting the image density signals of C, M, and Y subjected to the input gamma correction into image density signals of C, M, Y, and Bk to ensure matching between input images and output images.

A table conversion circuit 4 converts the image density signals of C, M, Y, and Bk subjected to the color processing into image density signals of C, M, Y, and Bk according to characteristics of an output apparatus (output medium).

A binarization processing circuit 5 converts the multivalued image density signals of C, M, Y, and Bk subjected to the table conversion into binarized signals of C, M, Y, and Bk.

A binary data inverting circuit 6 generates binary signals by means of inverting values of the binary signals of C, M, Y, and Bk.

A binary/inverted binary codes distribution circuit 7 refers to the values of the image density signals C, M, Y, and Bk subjected to the color processing. If the values are equal to or larger than a predetermined value, the binary/inverted binary codes distribution circuit 7 distributes the binarized binary signals of C, M, Y, and Bk and the inverted binary signals into print data for dark and light inks. If the values are smaller than the predetermined value, the binary/inverted binary codes distribution circuit 7 distributes the binarized binary signals of C, M, Y, and Bk and a binary signal "0" (hereinafter, a binary signal resulting in no dot stroke is represented by "0") into print data for light and dark inks.

Figure 2:
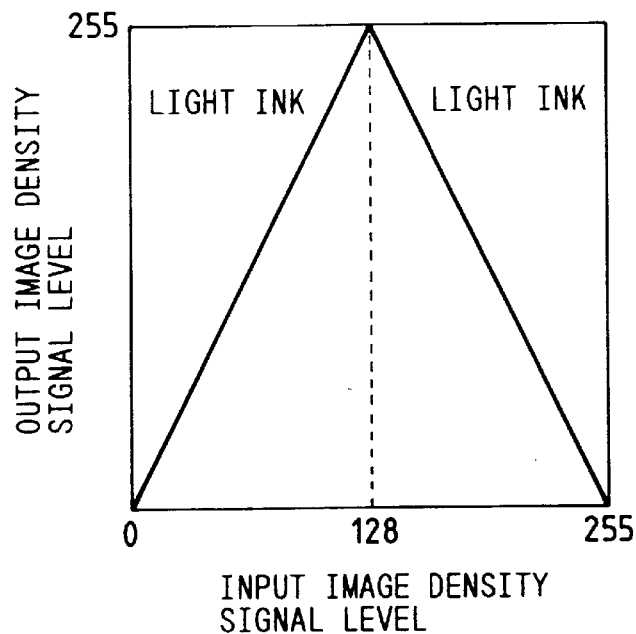
FIGS. 2 and 3 each show a conversion table for converting an input image signal into an output image signal.
Figure 3:
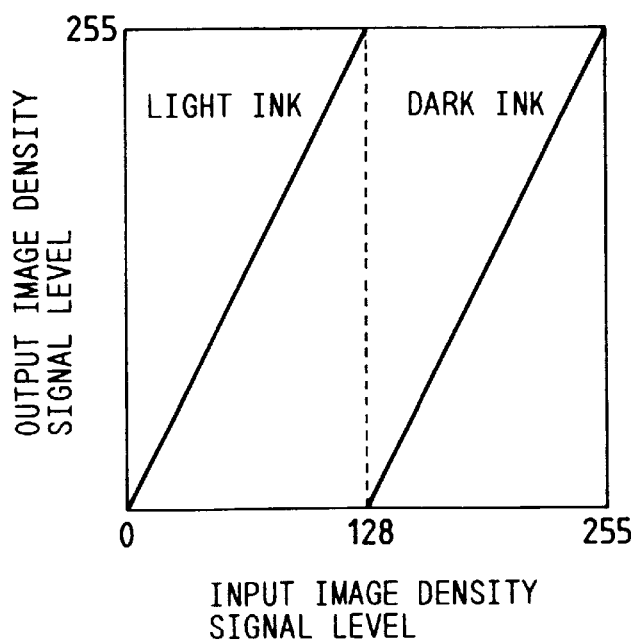
Figure 4:
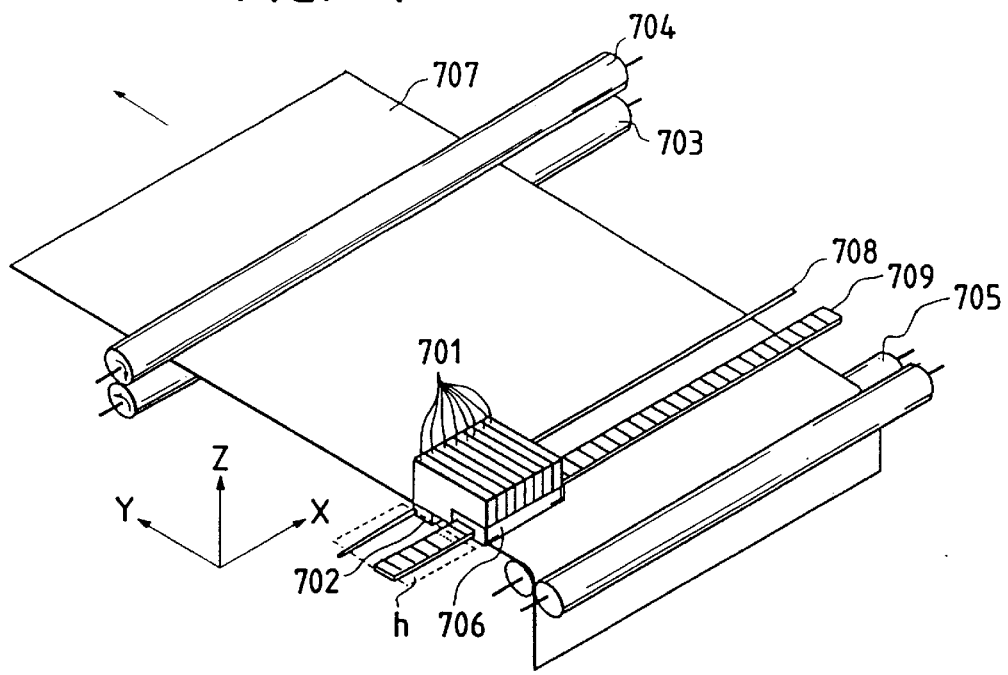
FIG. 4 is a view showing a conventional serial format color ink-jet recording apparatus which is capable of recording with inks of similar color at a different density.

Table conversion during this processing is for converting, as shown in FIG. 2, an input image density signal level into an output image density signal level. In this figure, input image density signal levels from 0 to 128 correspond to conversion of data indicative of printing with only light inks. Input image density signal levels from 129 to 255 correspond to conversion of data indicative of printing with both light and dark inks. Since a signal value obtained by means of adding the output density signal levels for light and dark inks relative to an input signal always yields 255, the binary signal for the dark ink corresponds to the inverted binary signal of the output density signal level for the light ink. On the contrary, the binary signal for the light ink corresponds to the inverted binary signal of the output density signal level for the dark ink. Accordingly, it is possible to generate the print data for both dark and light inks by means of either performing table conversion to the input density signal levels for the light ink or performing table conversion to the input density signal levels of the dark ink as shown in FIG. 3 for the input density signal levels of from 129 to 255.

The image signals are temporarily stored in a print buffer memory and loaded successively as image signals to a recording head at a proper timing during recording scanning. In this embodiment, dark and light inks of the same color are successively recorded on the same image area through separate recording scanning, so that storing to the print buffer is made by eight regions in total for each of the dark and light four colors. The recording heads for the same colors of different density is mounted on the same recording head at upper and lower positions thereof. Accordingly, in transferring the image recording signals from the print buffer memory to the recording heads, the data for dark and light densities for the same color are synthesized before loading. In other words, in the present embodiment, a dark-and-light ink nozzle array is formed of four nozzles for each of the upper and lower rows. As a result, the resultant image recording signal has a data format of dark and light image recording signals alternatively arranged by four. FIG. 1 shows a block diagram for use in performing the above mentioned image data processing and print control.

With such processing, the dark ink is not supplied to the same pixel as the light ink regardless of a method of binarization. This avoids local differences in density and hence avoids a particular texture on the printings.

Figure 11:
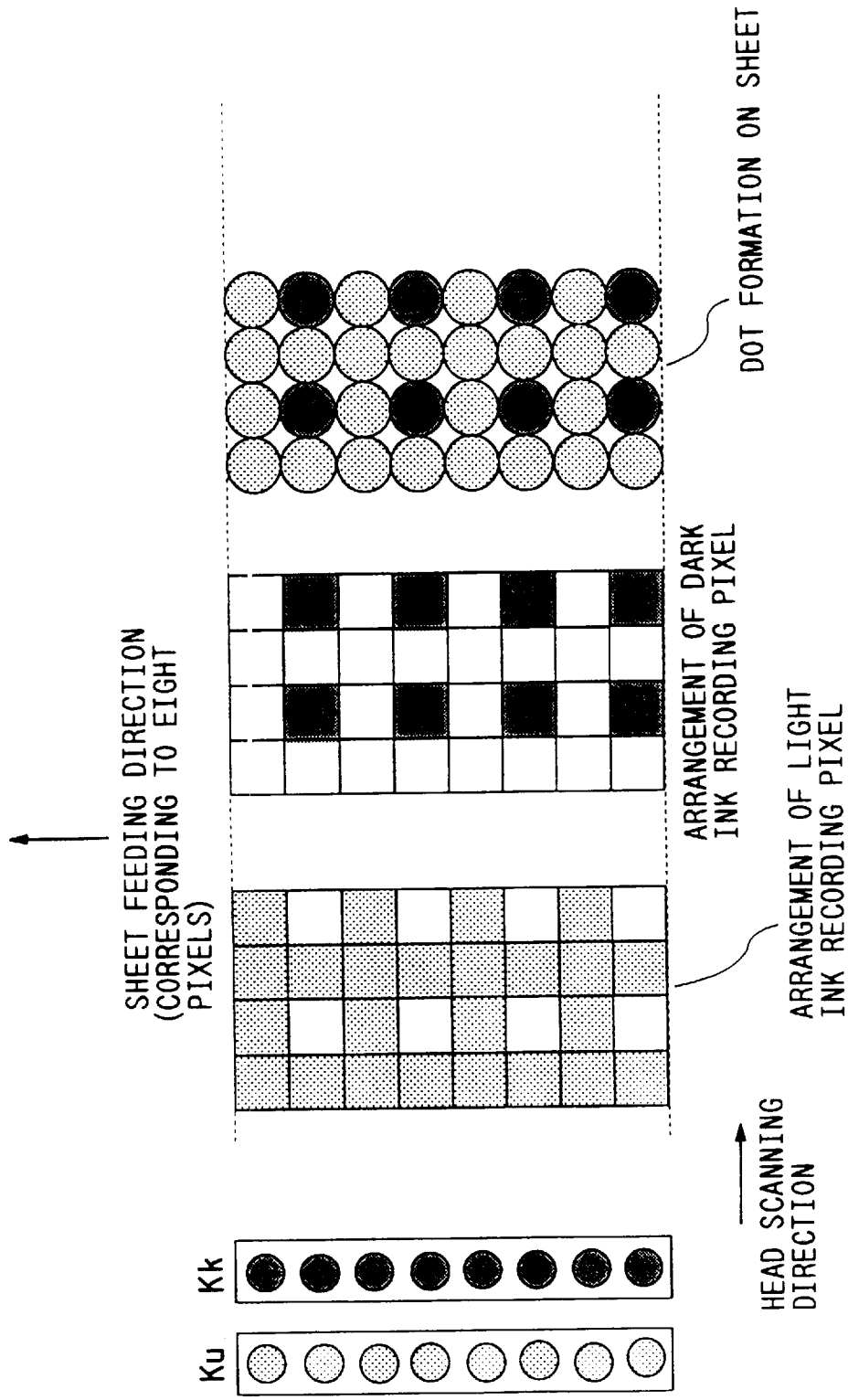
FIGS. 11 and 12 are views showing printed results obtained through an image signal processing according to the present invention.

This is clearly shown in FIG. 11. In this figure is illustrated an example of recording with only dark and light black inks to simplify the description. FIG. 11 shows printed results obtained with heads for dark and light inks for a case where the binarization processing is performed according to a simple dither when the input density signals of 159/255 level are subjected to table conversion. According to the table conversion described in FIG. 2, the input density signal for the light head is converted into the output image signal of 191 level. To binarize this signal with the simple dither method generates a binary signal for the light head. Subsequently, a binary signal (hereinafter, referred to as an inverted binary signal) that is an inverted equivalence to the original binary signal is generated. The binary/inverted binary codes distribution circuit 7 compares 159, the original input density signal, with a threshold value of 128. The input density signal of 159 is larger than the threshold value of 128, so that the dark head is provided with the inverted binary signal. This causes recording with the dark and light ink pixel arrangement as shown in FIG. 11. As shown in FIG. 11, the dark ink head is scanned ahead of the light ink head. The dark ink is thus first loaded on the sheet of paper forming dots, and following which the light ink is loaded on the sheet of paper. The position of the pixel recorded with the dark ink loaded earlier is in a complementary relation with the position of the pixel recorded with the light ink, so that these inks are not loaded on the same pixel. As a result, a uniform image can be obtained on the sheet of paper.

Figure 12:
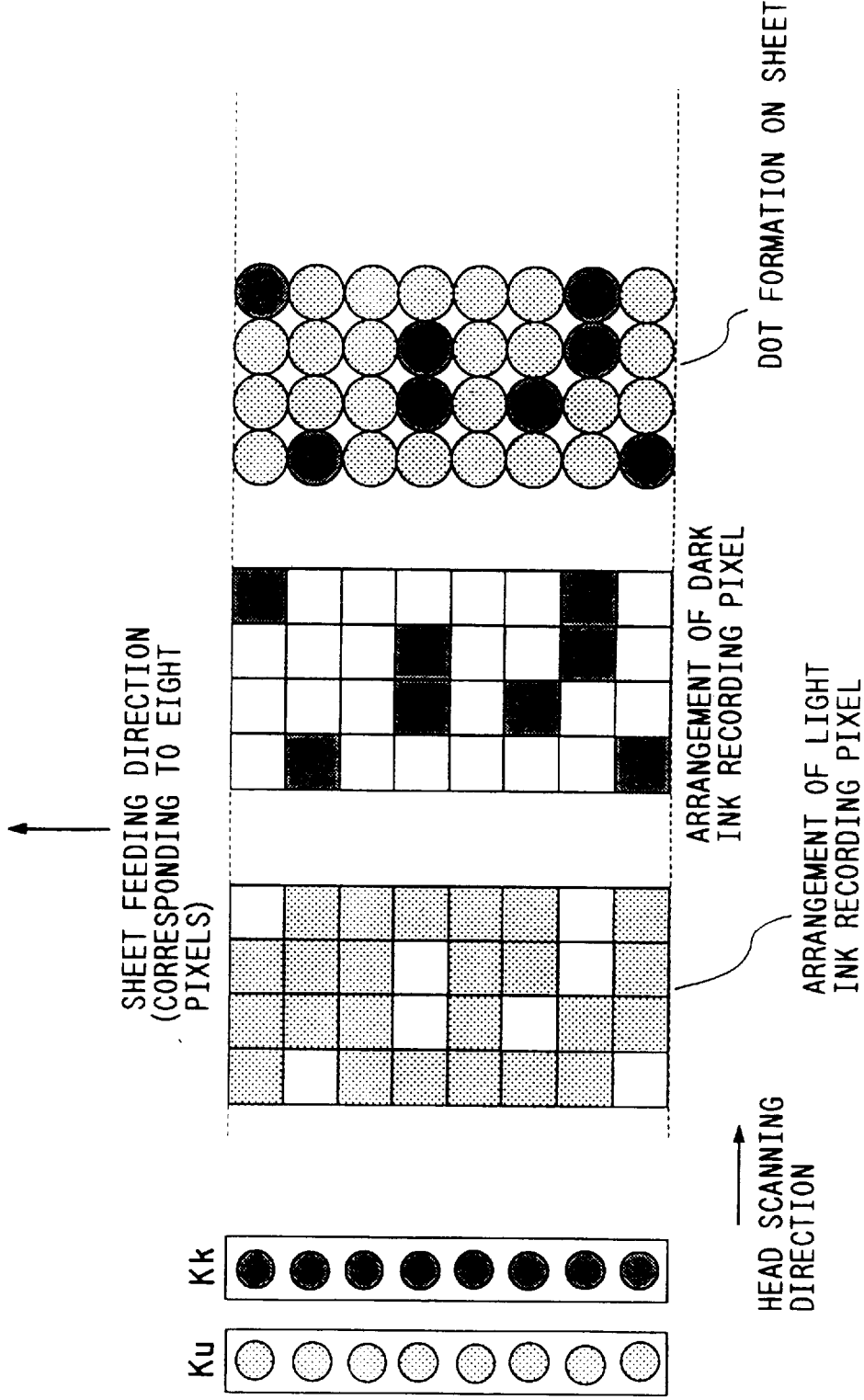

Likewise, the output density signal for either the light ink or the dark ink is binarized and inverted, which is used as the binary signal for either the dark or the light ink according to the input density signal level in an input density signal level region where both the dark and light inks are printed, even when the binarization processing is made according to a method of recording dots randomly such as an error distribution method. As a result, no image is recorded with both the dark and light inks in whole image regions as shown in FIG. 12, resulting in a uniform image on the sheet of paper.

In addition, the output density signal for the light ink is binarized and inverted, which is used as the binary signal for the dark ink according to the input density signal level for the light ink when any other conventional method is used for the binarization processing, so that no pixel is recorded with both the dark and light inks in the whole image regions, resulting in a uniform image without the texture.

Further, at a boundary between an area printed with only the light ink and an area printed with both the light and dark inks, the dark and light inks may be loaded on the same pixel in a predetermined ratio by means of, for example, shifting the dark ink pixel by one pixel in a predetermined ratio. In this event, the light ink may be loaded first and the dark ink may be loaded on the same pixel as the light one. A configuration of the dot printed with the dark ink may be shaded off to reduce contrast of dots with the dark ink. Alternatively, the amount of the light ink loaded may be increased within a predetermined range without changing the amount of the dark ink loaded on transfer the increased portion of the light ink to the same pixel as the dark ink, thereby increasing the density at a portion where the image density is high.

(Second Embodiment)

Figure 13:
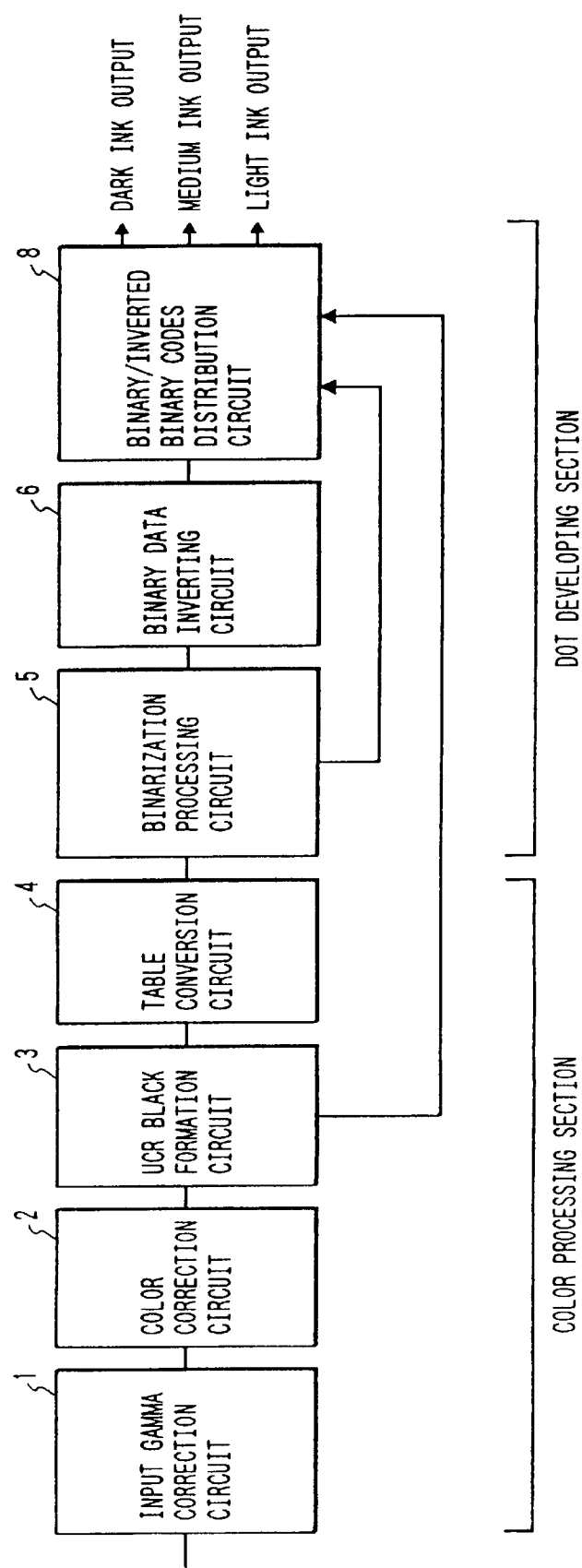
FIG. 13 is a view showing a flow of image signal processing.

FIG. 13 shows an example of a processing for generating, with three inks having different densities, from luminance signals of R, G, and B a binary data for use in recording with dark inks of C, M, Y, and Bk, a binary data for use in recording with medium-density inks (hereinafter, referred to as a medium ink) of the same colors and a binary data for use in recording with light inks of the same colors.

In this figure, illustrated components and parts are similar to those described in conjunction with FIG. 1 except for a "0"/binary/inverted binary codes distribution circuit 8.

The "0"/binary/inverted binary codes distribution circuit 8 refers values of the image density signals of C, M, Y, and Bk subjected to the color processing. The "0"/binary/inverted binary codes distribution circuit 8 distributes the binarized binary signals of C, M, Y, and Bk, the inverted binary signals thereof, and a binary signal "0" into print data corresponding to the dark, medium, and light inks.

Table conversion during this processing is for converting, as shown in FIG. 14, an input image density signal level into an output image density signal level. In this figure, input image density signal levels from 0 to 85 correspond to conversion of data indicative of printing with only light inks. Input image density signal levels from 86 to 170 correspond to conversion of data indicative of printing with both light and medium inks. Since a signal value obtained by means of adding the output density signal levels for light and medium inks relative to an input signal always yields 255, the binary signal for the medium ink corresponds to the inverted binary signal of the output density signal level for the light ink. On the contrary, the binary signal for the light ink corresponds to the inverted binary signal of the output density signal level for the medium ink. Accordingly, it is possible to generate the print data for both dark and light inks by means of either performing table conversion to the input density signal levels for the light ink or table conversion to the input density signal levels for the medium ink for the input density signal levels of from 86 to 170. Input image density signal levels from 171 to 255 correspond to conversion of data indicative of printing with both medium and dark inks. Since a signal value obtained by means of adding the output density signal levels for medium and dark inks relative to an input signal always yields 255, the binary signal for the dark ink corresponds to the inverted binary signal of the output density signal level for the medium ink. On the contrary, the binary signal for the medium ink corresponds to the inverted binary signal of the output density signal level for the dark ink. Accordingly, it is possible to generate the print data for both dark and medium inks by means of either performing table conversion to the input density signal levels for the medium ink or table conversion to the input density signal levels for the dark ink for the input density signal levels of from 171 to 255.

With such processing, the dark ink is not supplied to the same pixel as the light and medium inks regardless of a method of binarization. This avoids local differences in density and hence avoids a particular texture on the printings.

In the figure, the output image signals for the light, medium, and dark inks are generated within the input density signal levels of from 0 to 85, from 86 to 170, and from 171 to 255, respectively. However, the conversion may be made for any one of the inks in the individual input image signal ranges.

The "0"/binary/inverted binary codes distribution circuit 8 has the conversion table as shown in FIG. 14 for converting the input density signals of from 0 to 85, from 86 to 170, and from 171 to 255 into the output density signals for the light, medium, and dark inks, respectively. In this event, the binary signal, "0", and "0" are supplied to the recording head as the print data for the light, medium, and dark inks, respectively, for the input signal of from 0 to 85. The inverted binary signal, the binary signal, and "0" are supplied to the recording head as the print data for the light, medium, and dark inks, respectively, for the input signal of from 86 to 170. "0", the inverted binary signal, and the binary signal are supplied to the recording head as the print data for the light, medium, and dark inks, respectively, for the input signal of from 171 to 255.

(Third Embodiment)

Figure 15:
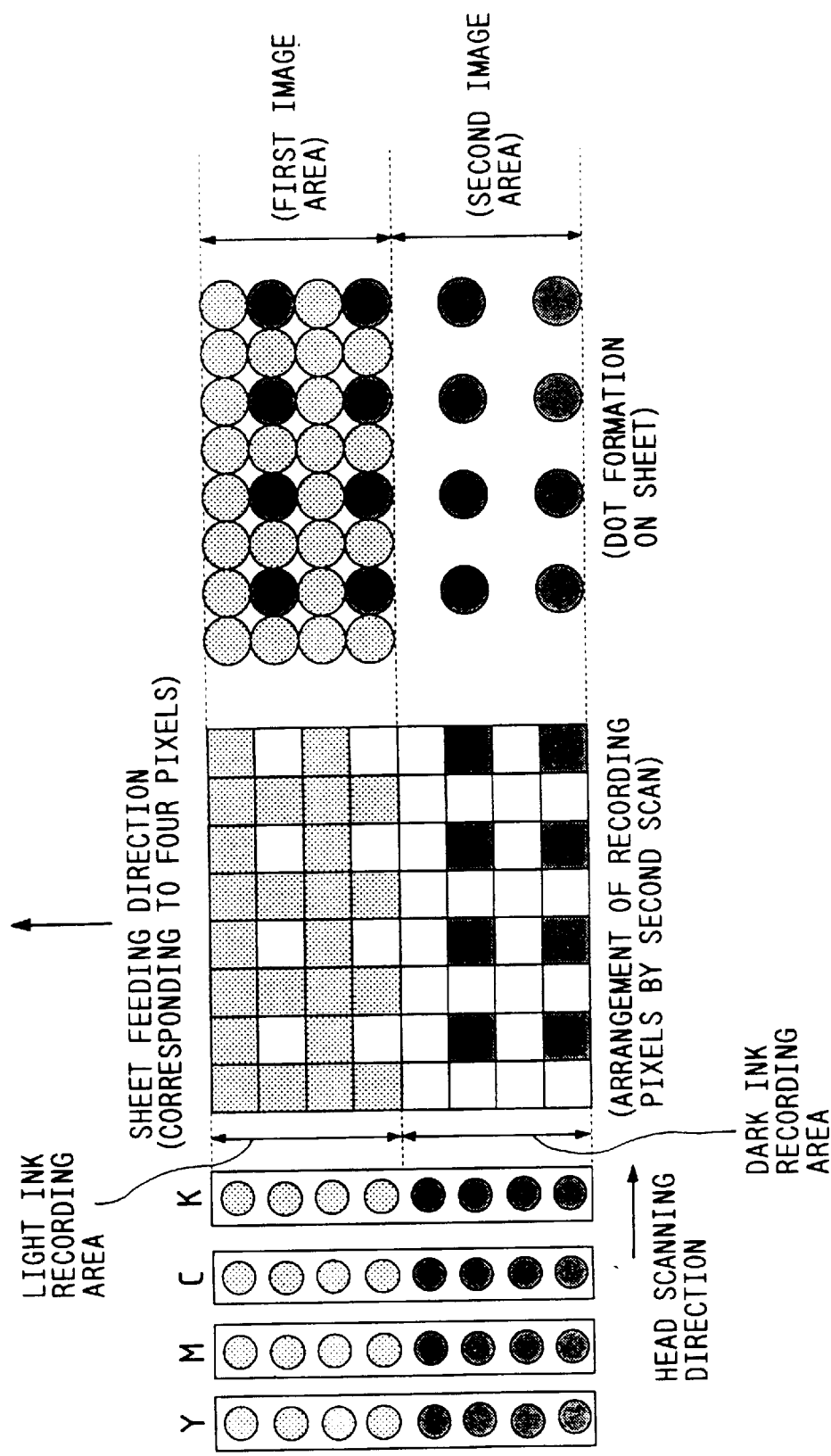
FIG. 15 is a view showing printed results according to the present invention.

Diagrammatically shown in FIG. 15 for use in describing printed results are construction of a recording head, arrangement of recording pixels and dot formation on a sheet of paper in an ink-jet recording apparatus where dark-and-light heads for four colors of black, cyan, magenta, and yellow are arranged in parallel for color printing and record scanning with dark and light inks being discharged from the same head to transfer the dark and light inks of each color with high accuracy without causing overlapped portion of the inks of the same color on the same pixel.

FIG. 16 is a view for use in describing construction of the recording head which discharges dark and light inks. A wiring board 200 is connected to a wiring portion of a heater board at one end thereof and is provided with a number of terminals at the other end thereof which correspond to respective electrical/thermal energy converters for use in receiving electrical signals supplied from a body of the recording apparatus. The electrical signals supplied from the body of the recording apparatus are thus supplied to the respective electrical/thermal energy converters. A metal support 300 supports in plane the back surface of the wiring board 200, which serves as a bottom plate of an ink-jet unit. A presser spring 500 comprises a portion formed into a generally U shape in section to elastically and linearly impart pressure force to the areas near an ink discharging port of a grooved head 1310, claws engaged with recess holes provided in a base plate, and a pair of rear legs to receive the force acted on the spring. The wiring board 200 is thus so attached as to abut to the grooved head 1310. The wiring board 200 is affixed to the support with adhesive or the like.

An ink supply pipe 2200 is provided with a filter 700 at one end thereof. An ink supply member 600 is formed through molding. The grooved head 1310 is integrally formed of an orifice plate portion 1300 and passages 1500 communicating with respective ink supply ports. The ink supply member 600 is secured to the support 300 in a simple manner by means of inserting and projecting two pins (not shown) provided on the back surface of the ink supply member 600 into and from holes 1901 and 1902, respectively, formed in the support 300, which are thermally fused thereto. In this event, a gap between the orifice plate portion 1300 and the ink supply member 600 is sealed. In addition, it is passed through a groove 310 formed in the support 300, thereby completely sealing the gap between the orifice plate portion 1300 and a front end portion of the support 300.

FIG. 17 is a perspective view of the grooved head 1310 of the recording head used in the present embodiment as the perspective from the heater board 100. A number of liquid chambers are provided, each of which are provided with a groove 30 in a surface abutted to the heater board 100 of a wall 10. This groove is communicated with an outer periphery of the grooved head 1310. The grooved head 1310 is abutted and adhered to the heater board, following which the outer periphery is sealed with a sealing agent as mentioned above. In this event, the sealing agent infiltrates along the above mentioned groove to fill the gap between the grooved head 1310 and the heater board 100. In this way, it is possible to completely separate the liquid chambers by using a technical process used in a conventional head. Construction of the groove differs depending on the physical characteristics of the sealing agent. In other words, the groove is required to be formed in a shape suitable for the sealing agent. To separate the liquid chamber into a number of chambers or compartments permits discharge of different inks to respective ink discharging outlets. Accordingly, the dark and light inks are discharged from the same head in the present embodiment. As mentioned above, the present embodiment improves an accuracy of loading of the dark and light inks of the same color which is particularly important.

Figure 18:
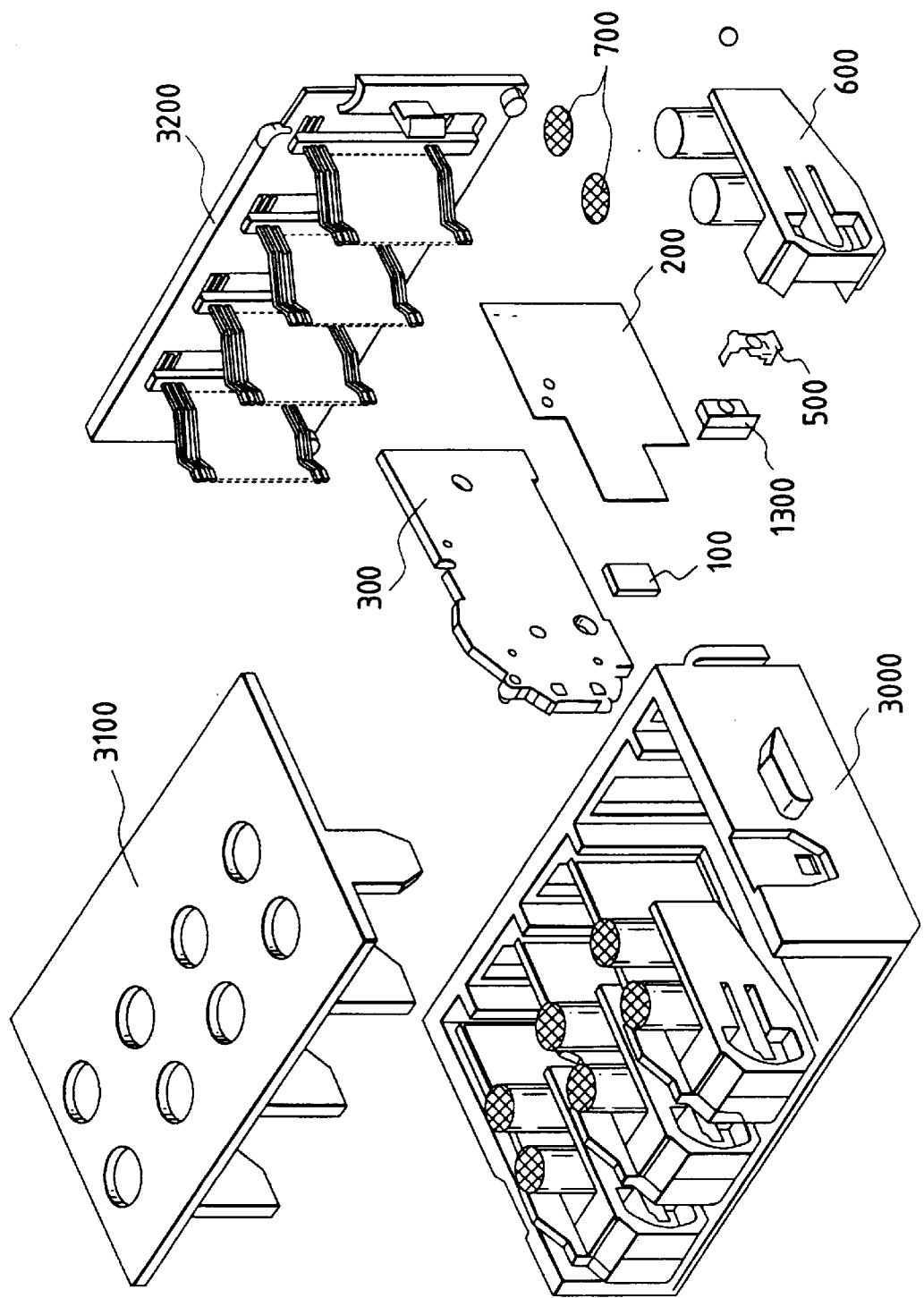
FIG. 18 is a structural view of a four-color head unit.

FIG. 18 shows construction of a four-head integrated ink-jet cartridge in which the above mentioned four heads capable of discharging dark and light inks of four colors of K, C, M, and Y are arranged integrally with a frame 3000. The four recording heads are attached in the frame 3000 at a predetermined distance. In this event, the heads are secured thereto with a resist in a nozzle row direction being adjusted. In this embodiment, the accuracy of loading between colors is improved by means of adjusting with a mechanical reference surface of the head. However, the ink may be discharged with the recording heads being temporarily attached to the frame to measure the positions where the inks are loaded and the measured data are used to further improve the accuracy by means of directly adjusting the relative loading position between colors. A reference numeral 3100 represents a cover for the frame while a reference numeral 3200 represents a connector for connecting pads provided on the wiring boards 200 of the four recording heads to electrical signals supplied from the body of the recording apparatus. To assemble the four heads integrally is advantageous and is effective to improve the relative loading position between the heads as mentioned above. In addition, there is another effect of eliminating interpositioning of the heads. Further, it is also advantageous in that the number of signal line connections to the body of the recording apparatus can be reduced. For example, a signal line common to the four heads such as a GND line may be used commonly to reduce the number of the wirings. In addition, an integrated circuit board may be provided to perform time-divisional driving for the individual heads, which permits common usage of a recording signal line. Such reduction in the number of electrical connections is particularly effective in an apparatus having a relatively large number of signal lines such as a color apparatus or a multi-nozzle high speed machine. In particular, this is an extremely effective feature of the dark-and-light ink-jet recording apparatus according to the present invention.

Figure 19:
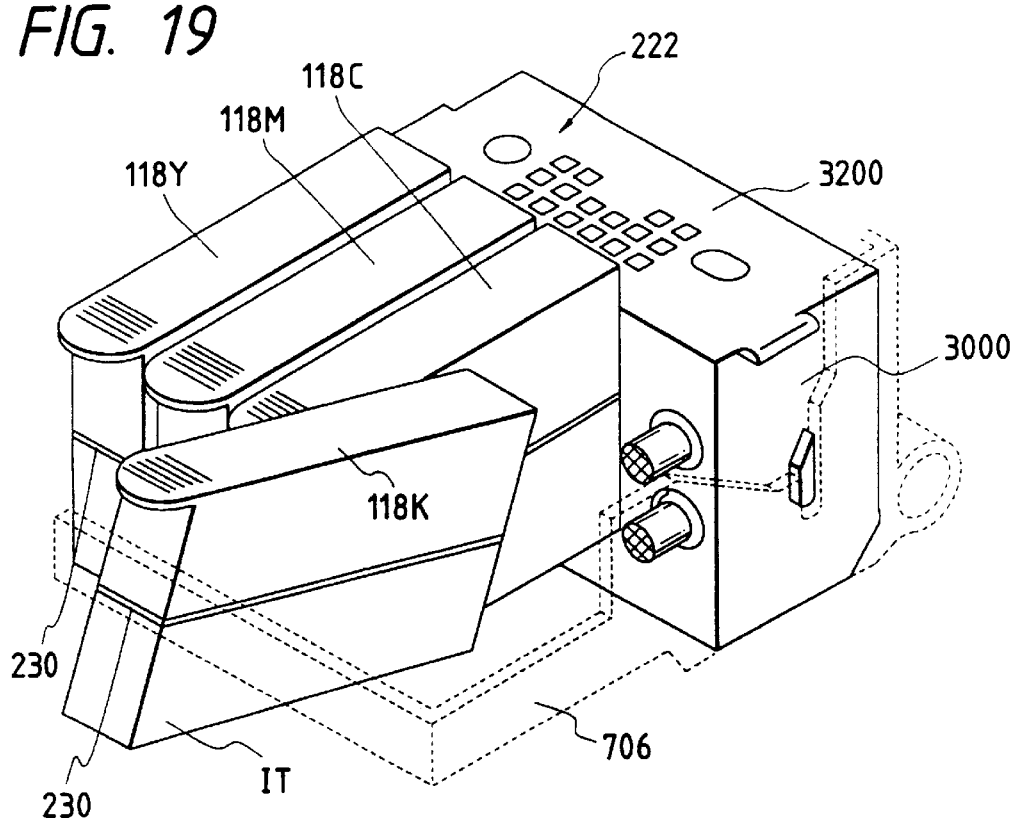
FIG. 19 is a view showing an ink-jet cartridge and an ink tank mounted on a carriage.

FIG. 19 is a view showing a four-head integrated ink-jet cartridge 222 mounted on a carriage for use in record scanning. An ink tank 118 is divided into upper and lower chambers through a partition 230. The upper chamber is filled with a light ink and the lower chamber is filled with a dark ink. Four dark-and-light ink tanks for the four colors are connected to the ink jet cartridge 222 on the carriage and are connected to the respective separated liquid chambers to supply inks. As mentioned above, in the present embodiment, recording is made with the integrated recording head comprising the ink tanks for four colors each of which is filled with dark and light inks, eight liquid chambers in total and the corresponding nozzle rows. This solves a problem of inconvenience involved in dark and light recording.

Figure 20:
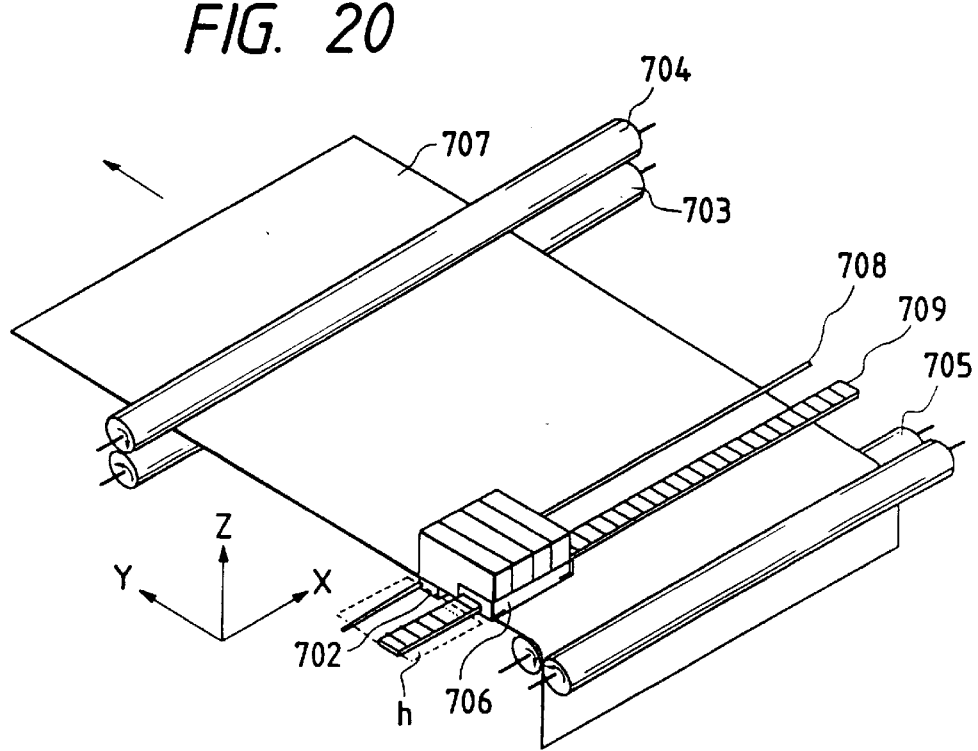
FIG. 20 is a schematic explanatory view of an ink jet recording apparatus.

An ink-jet recording apparatus to which the present embodiment can be applied has major components as shown in FIG. 20. In this figure, a carriage 706 carries the above mentioned head 702 where four ink tanks, each of which is filled with dark and light inks of four colors of black, cyan, magenta and yellow, integrated with four heads to discharge through the upper and lower nozzle rows the dark and light inks of four colors. For a fundamental operation of the ink jet printer in this embodiment, elements assigned similar reference numerals to those described in the related art functions and operates similarly. However, description is again made here. A reference numeral 703 represents a sheet feeding roller which rotates in a direction depicted by an arrow in cooperation with an auxiliary roller 704 while supporting a print sheet 707. The print sheet 707 is transferred in a y direction. A reference numeral 705 represents a sheet feeding roller to feed the print sheet and supports the print sheet 707 as do the rollers 703 and 704. A carriage 706 is ready for operation at a home position (h) depicted by a dotted line in the figure when no printing is made or when the multi-head is rotated.

Before starting the printing operation, the carriage 706 is located at the illustrated position (home position). The carriage 706 discharges dark and light inks of four colors from upper and lower nozzle rows of each color on the multi-head 702 according to recording signals at a proper timing in response to reading signals for a linear encoder 709 while traveling in an x direction along a carriage guide shaft 708 in response to a print start command, thereby printing by a width corresponding to four pixels for each of the dark and light inks on the sheet of paper.

After completion of printing of data to the end of the sheet of paper, the carriage returns to the initial home position and then prints again in the x direction. After completion of the first printing and before starting of the second printing, the sheet feeding roller 703 rotates in the direction depicted by the arrow to feed the sheet of paper in the y direction by the width corresponding to four pixels. In this way, printing of data for one sheet of paper is completed through repeated operation of printing and paper feeding by the width corresponding to four pixels for each of the dark and light inks by a single scan of the carriage.

Figure 6:
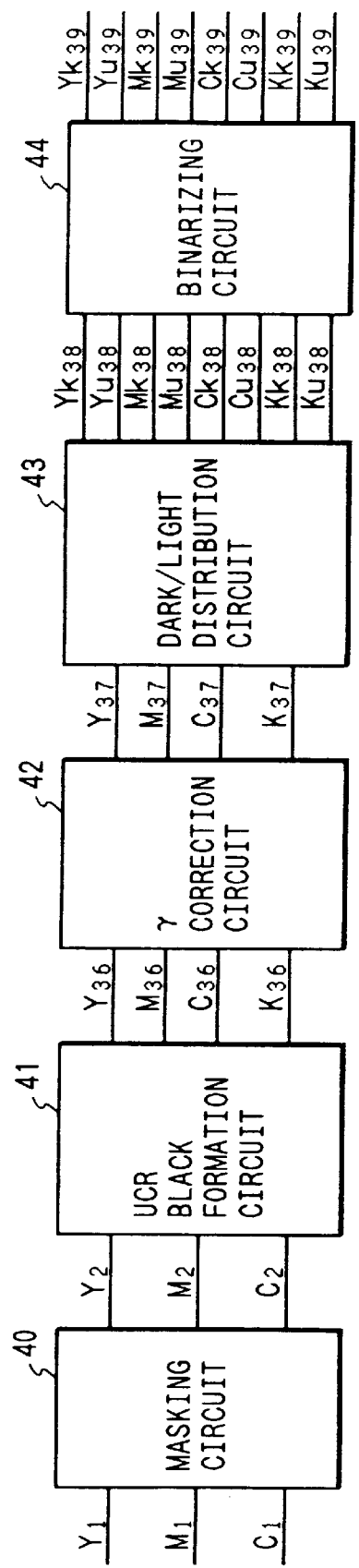
FIG. 6 is a view showing a flow of image signal processing.
Figure 7:
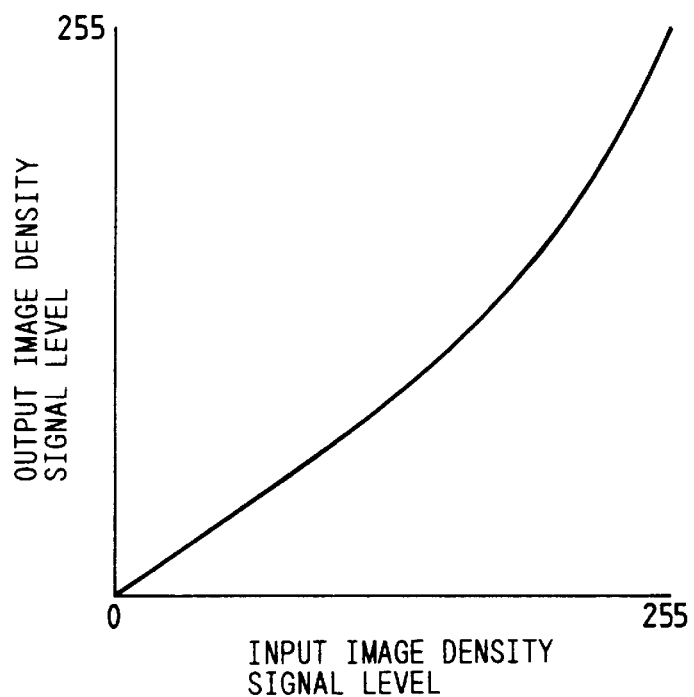
FIG. 7 shows a gamma-correction table for use in converting an input density signal into an output density signal.
Figure 21:
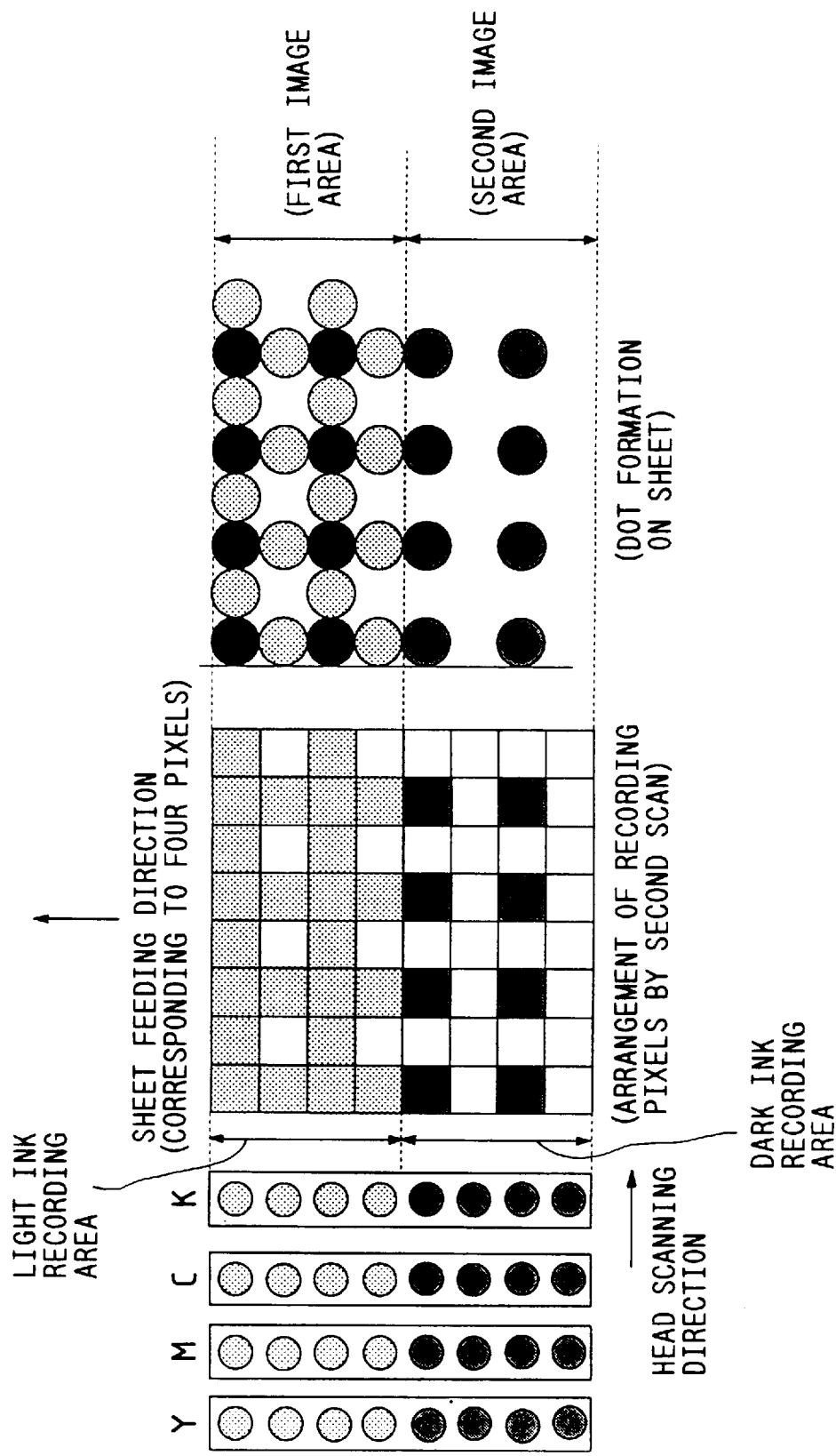
FIGS. 21 and 22 are views showing printed results obtained through conventional image signal processing.
Figure 22:
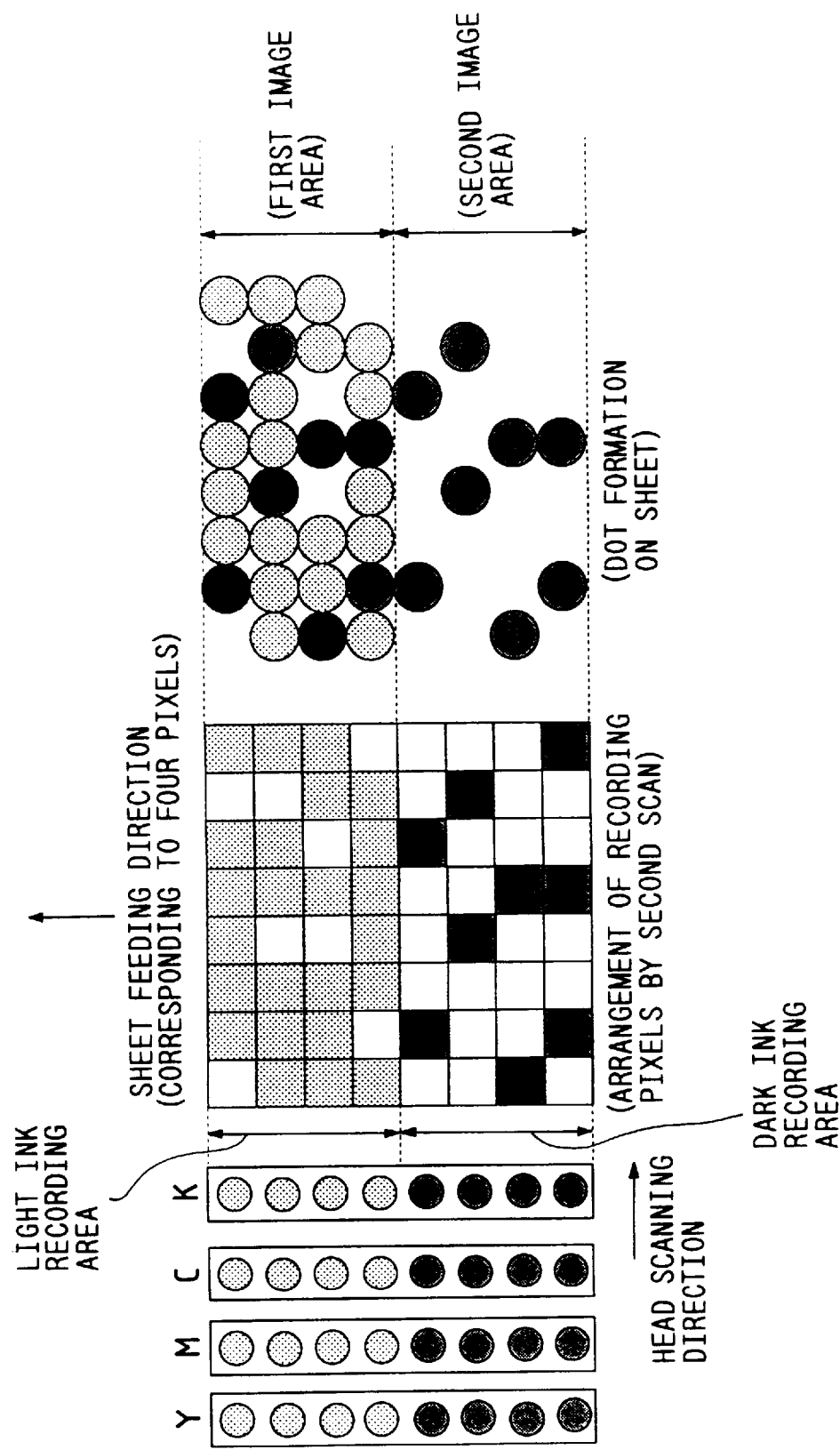

Even with the above mentioned construction, the dark and light inks may be printed on the same pixel if the conventional image signal processing shown in FIG. 6 is performed, regardless of whether the signals are binarized through a simple dither method shown in FIG. 21 or through an error distribution method shown in FIG. 22.

Figure 23:
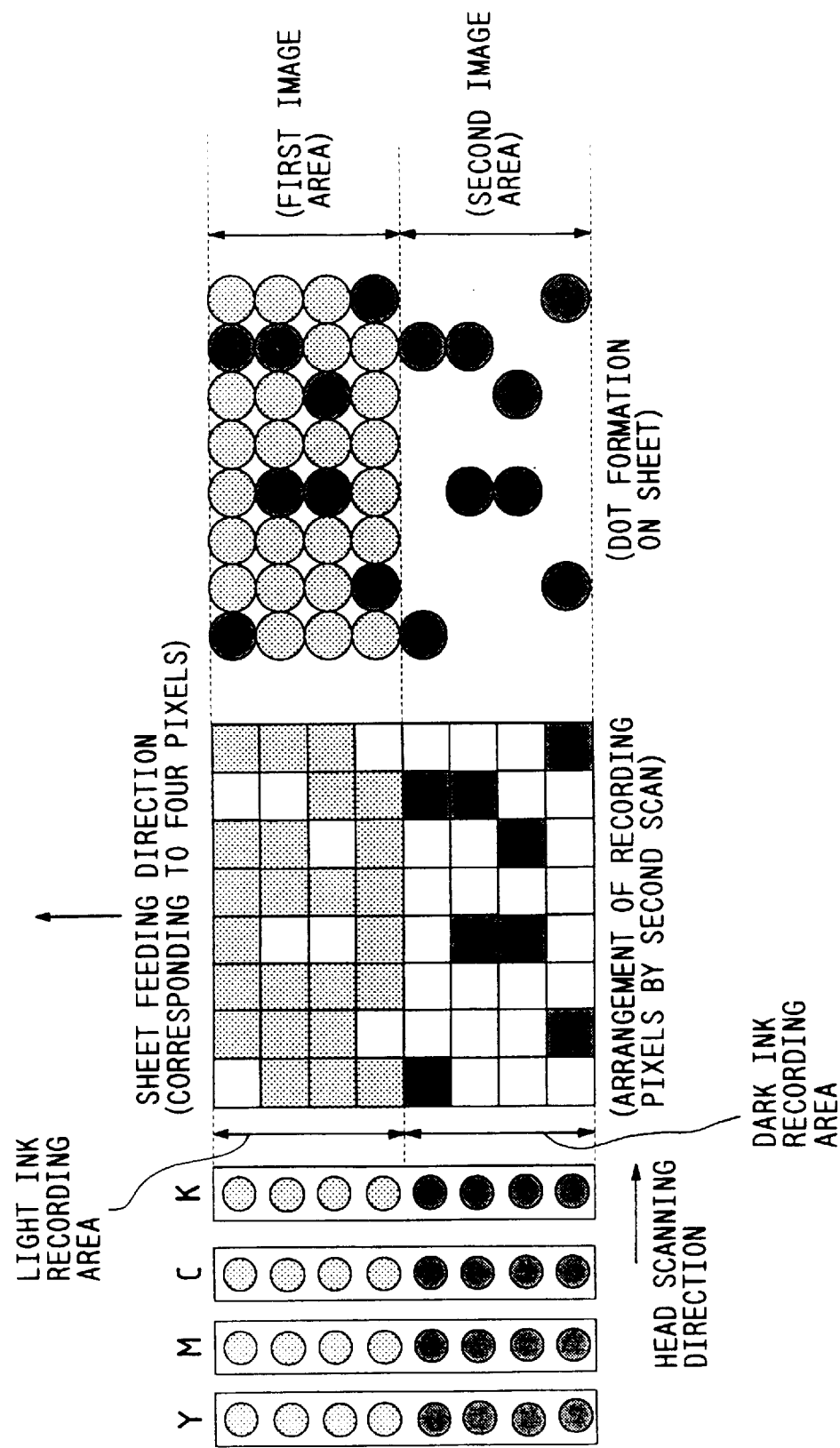
FIG. 23 is a view showing a printed result obtained through image signal processing according to the present invention.

However, the image signal processing according to the present invention causes no overlapping of the dark and light inks on the same pixel regardless of the binarization method used as shown in FIGS. 15 and 23, resulting in higher accuracy of loading position of the recorded dots of the dark and light inks having the same color.

According to the first through third embodiments described above, when image density to be recorded is the density for recording with both inks of the same color but of the different density discharged on a recorded medium in forming images with the inks discharged on the recorded medium by using ink discharging means capable of discharging two or more inks having different density, recording is made with the inks discharged such that both the above mentioned inks are not loaded on the same pixel, which avoids local difference in density and hence reduces the unique texture to realize images of high quality. In addition, a necessary time for binarization processing can be reduced by means of converting the input image density signal for binarization into either the output image density signal for use in driving the ink discharging means for one density or the output image density signal for use in driving the ink discharging means for the other density, according to the input image density signals, in obtaining the binary data for use in driving the ink discharging means.

(Fourth Embodiment)

Figure 24:
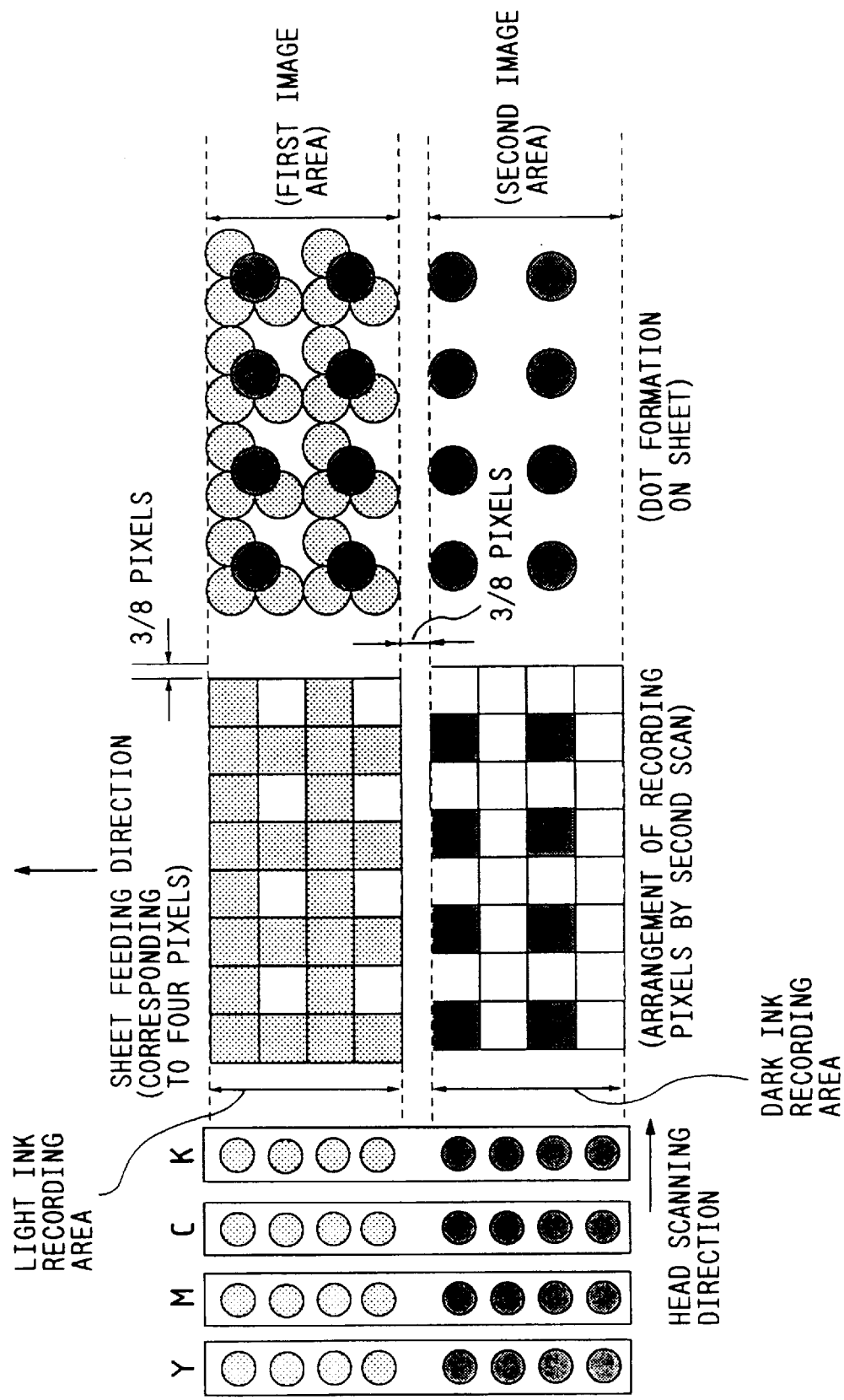
FIG. 24 is a view showing a printed result formed with inks of different densities according to the present invention.

Diagrammatically shown in FIG. 24 for use in describing printed results are construction of a recording head, arrangement of recording pixels and dot formation on a sheet of paper in an ink-jet recording apparatus according to a fourth embodiment of the present invention. In this embodiment, dark-and-light heads for four colors of black, cyan, magenta, and yellow are arranged in parallel for color printing and record scanning is executed with dark and light inks being discharged from the same head to transfer the dark and light inks of each color with high accuracy without causing overlapped portion of the inks of the same color on the same pixel.

An ink-jet recording apparatus to which the present embodiment can be applied has similar parts and components as those described in conjunction with the third embodiment. Detailed description thereof is thus omitted.

Figure 25:
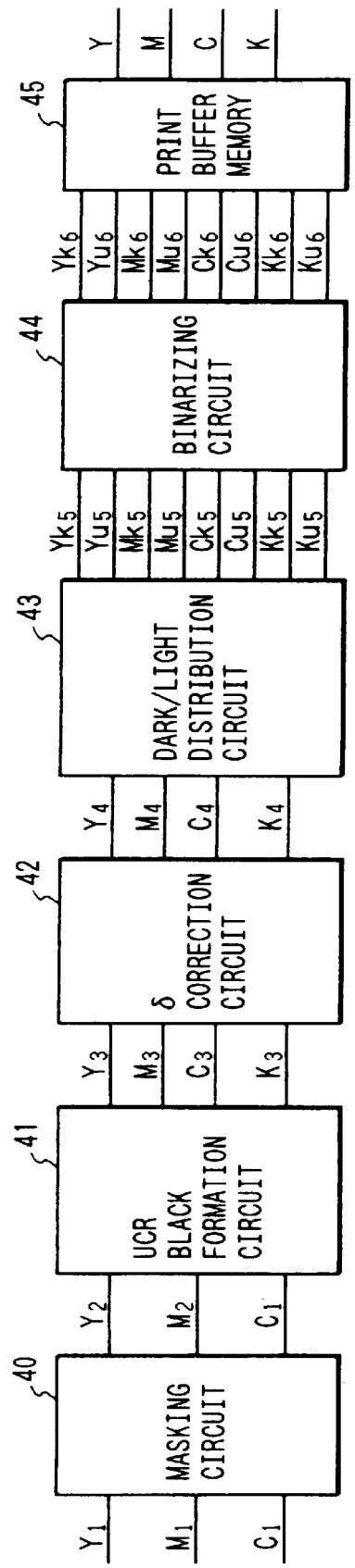
FIGS. 25 and 26 are block diagrams of an image processing circuit according to the present invention.

FIG. 25 shows an example of an image signal processing circuit according to this embodiment. Original image density signals Y1, M1, and C1 for yellow, magenta, and cyan, respectively, are subjected to color processing in a masking circuit 40. The resultant signals are then subjected to color processing in an undercolor removal (UCR) black formation circuit 41, which are converted into new image density signals Y3, M3, C3, and K3 for yellow, magenta, cyan, and black, respectively. As in the conventional arts, gamma correction and dark/light distribution are performed and then binarization processing is carried out. The generated image signals Kk6, Ku6, Ck6, Cu6, Mk6, Mu6, Yk6, and Yu6 to be transferred to the head are temporarily stored in a print buffer memory 45. The stored signals are successively transferred to the recording head at a proper timing in recording.

Figure 26:
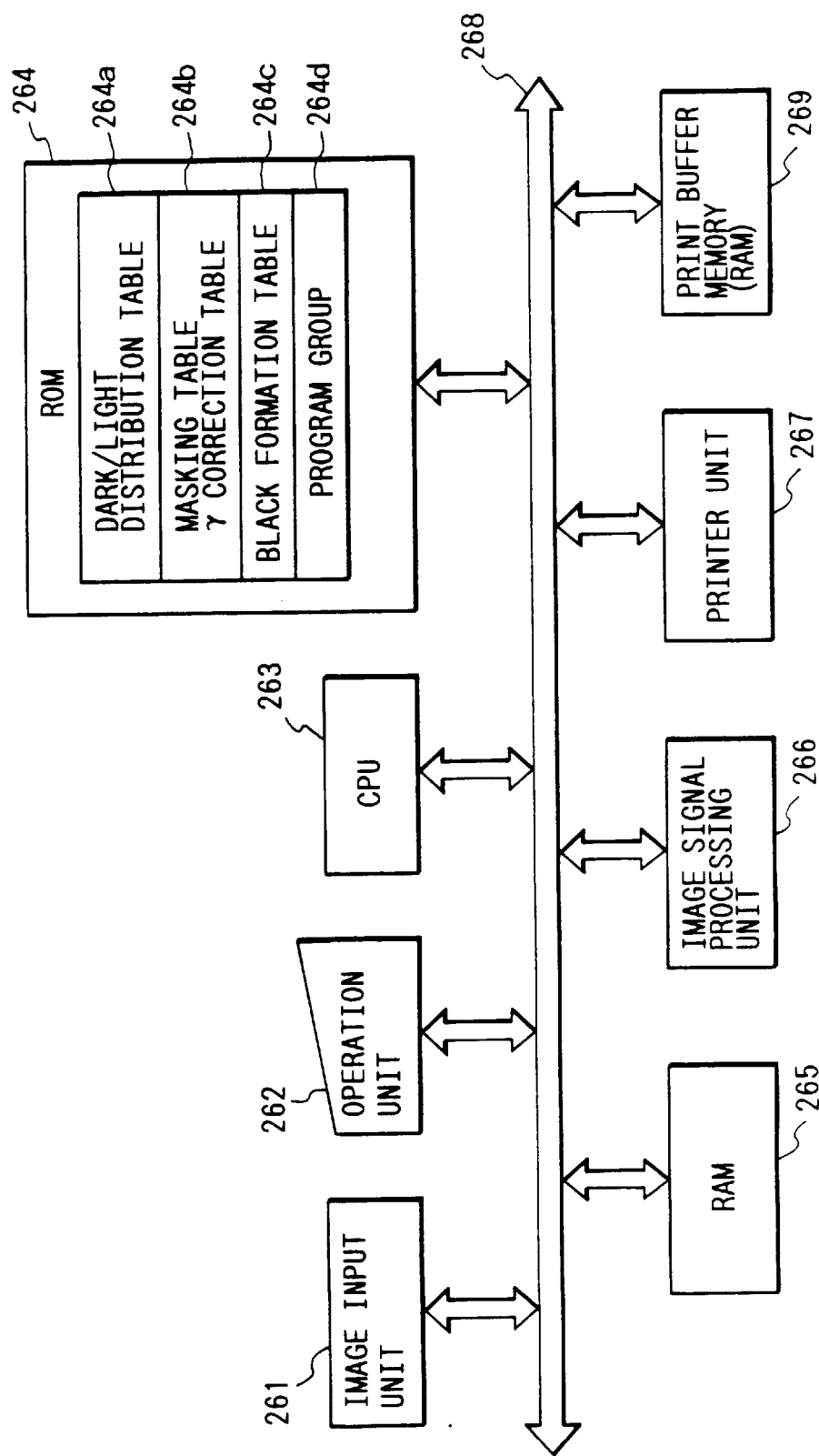

In this embodiment, dark and light inks of the same color are successively recorded on a same image area through separate recording scanning, so that storing in the print buffer is made by eight regions in total for each of the dark and light four colors. The recording heads have nozzles adapted to discharge inks of different density for the same colors being mounted on the same recording head at upper and lower positions thereof. Accordingly, in transferring the image recording signals from the print buffer memory to the recording heads, the data for dark and light densities for the same color are synthesized before loading. In other words, in the present embodiment, a dark-and-light ink nozzle array is formed of four nozzles for each of upper and lower rows. As a result, the resultant image recording signal has a data format of dark and light image recording signals alternatively arranged by four. FIG. 26 shows a block diagram for use in performing the above mentioned image data processing and print control.

In this figure, a reference numeral 261 represents an image input unit for use in optically reading original images through CCD or the like or in receiving image luminance signals (RGB) from a host computer, a video instrument, etc. A reference numeral 262 represents an operation unit comprising various keys for use in setting various parameters and instructing to start printing operation. A reference numeral 263 represents a central processing unit (CPU) for use in controlling the entire recording apparatus according to various programs stored in a read-only memory (ROM). A reference numeral 264 represents the ROM storing programs or the like required for operating the present recording apparatus according to a control program and an error processing program. In this ROM, a reference numeral 264a represents a dark/light distribution table which is referred to in processing carried out by the dark/light distribution circuit. A reference numeral 264b represents a gamma correction table which is referred to in processing carried out by the input gamma conversion circuit and a masking table which is referred to in processing carried out by the color correction (masking circuit). A reference numeral 264c represents an UCR black formation table which is referred to in processing carried out by the black formation UCR circuit. A reference numeral 264d represents a program group storing various programs. The CPU 3 and the ROM 4 form a major part of discharge controlling means according to the present invention. A reference numeral 265 represents a random-access memory (RAM) used as a work area for various programs and as a temporal shelter area in error processing. A reference numeral 266 represents an image signal processing unit for carrying out image signal processing. A reference numeral 267 represents a printer unit for use in forming dot images according to image signals processed by the image signal processing unit in recording. A reference numeral 268 represents a bus line for use in transmitting address signals, data, control signals or the like in the present apparatus. A reference numeral 269 represents a print buffer memory for use in temporarily storing the image signals.

Turning back to description of FIG. 24, the recording heads are so arranged as to ensure recording with the light ink discharged from an upper half (four nozzles) and with the dark ink discharged from a lower half (four nozzles) in the figure. In this event, as shown in FIG. 24, the nozzle row for use in discharging the light ink is arranged with being shifted by ⅜ pixels in a sheet feeding direction (sub-scanning direction). More particularly, in each head of the four-head integrated ink-jet cartridge according to this embodiment, a nozzle pitch of the above mentioned grooved head and an arrangement pitch of the electrical/thermal energy converters on the heater board are larger than a distance corresponding to the normal pixel density by an amount equivalent to ⅜ pixels at the partition corresponding to the liquid chamber for the dark and light inks. In addition, printing is made with a discharging timing of the light ink nozzle row increased by an amount corresponding to ⅜ pixels in a main scanning direction relative to the dark ink nozzle row which is used for taking a timing of discharge in response to the image signals in synchronism with main scanning of the carriage.

Figure 8:
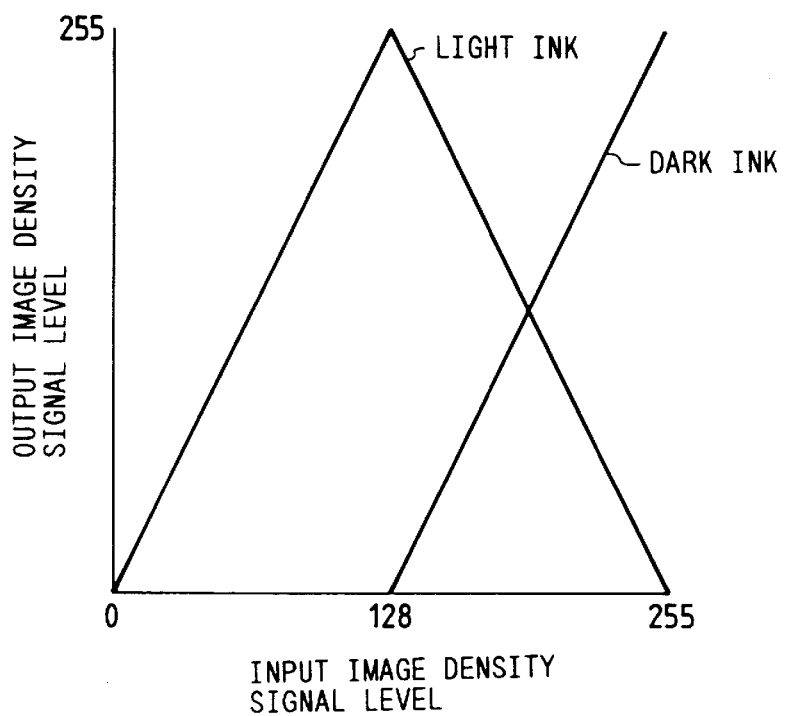
FIG. 8 shows a conversion table for converting an input image signal into an output image signal.
Figure 9:
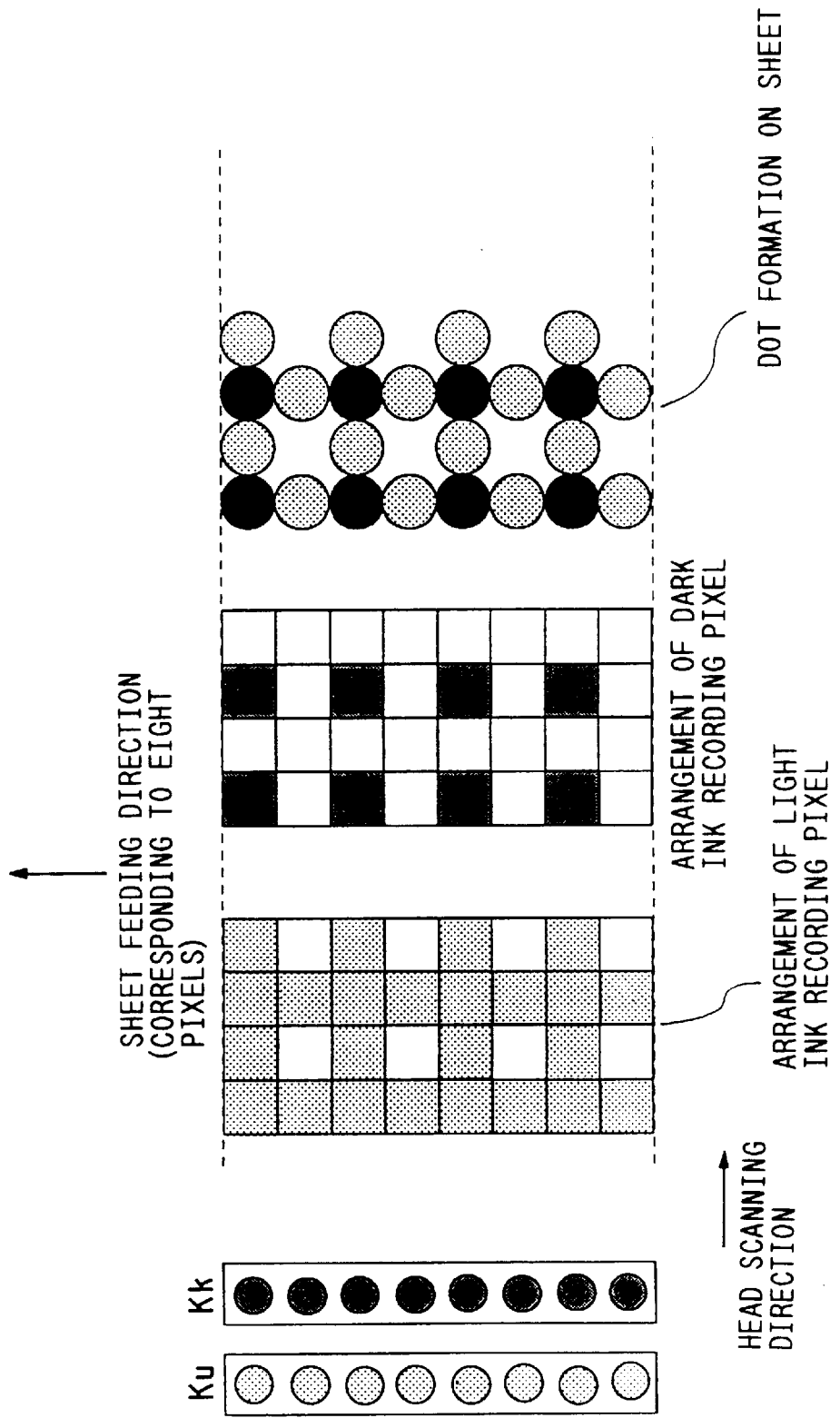
FIGS. 9 and 10 are views showing printed results obtained through a conventional image signal processing.
Figure 10:
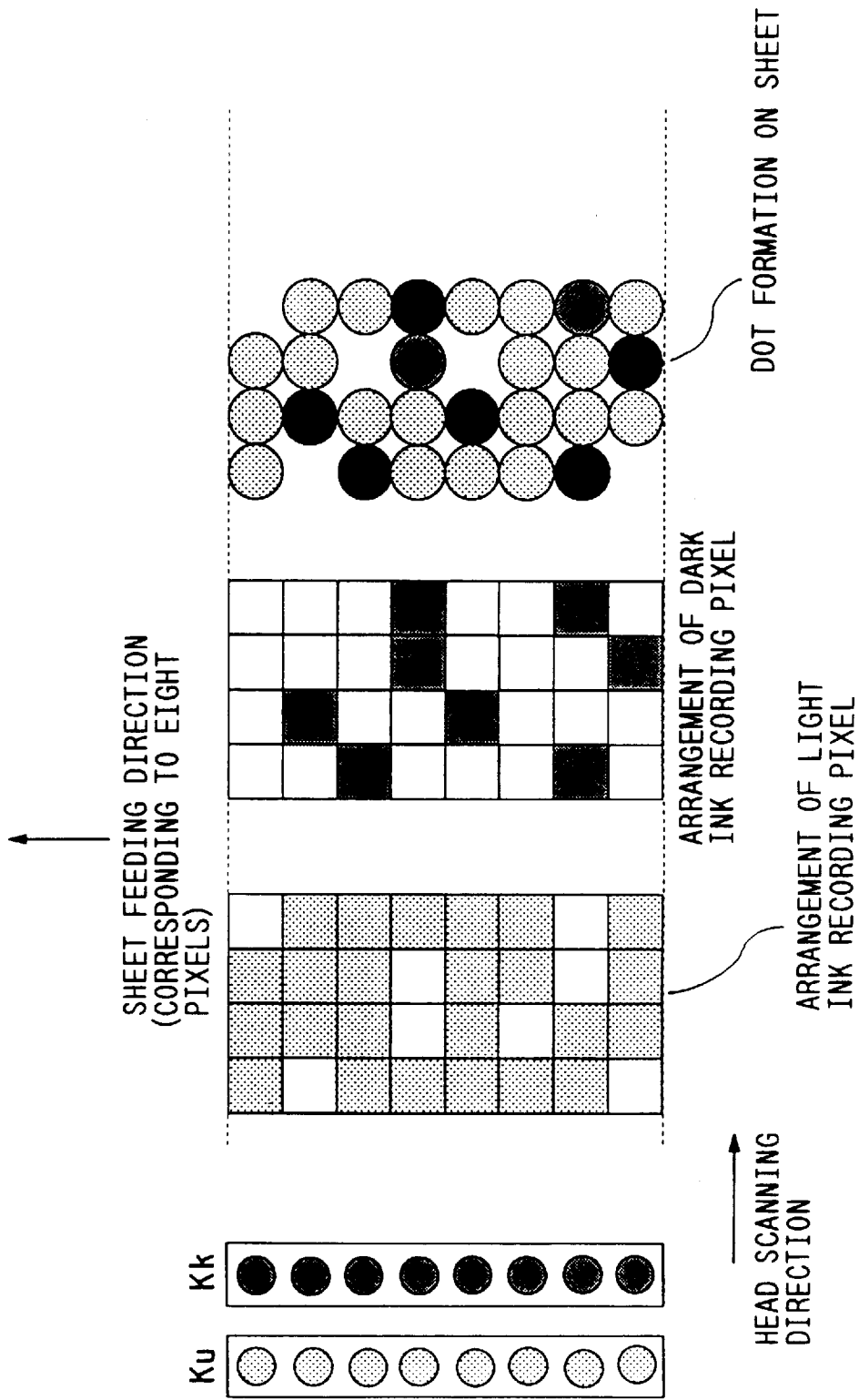

The recording pixel arrangement shown in FIG. 24 shows printing in a case where the binarization processing is made according to a simple dither when the image input density signals of 159/255 level are received. According to the dark/light distribution table shown in FIG. 8, the output image density signal of 63 level is distributed to the dark ink nozzle row side while the output image density signal of 191 level is distributed to the light ink nozzle row side. Accordingly, as shown in the recording pixel arrangement in FIG. 1, discharge recording is made to ¼ pixels periodically in the dark ink recorded area while discharge recording is made to ¾ pixels in the light ink recorded area. FIG. 1 shows printing in a second recording scanning to record while feeding a sheet of paper by an amount corresponding to four pixels, so that the dark ink nozzle row performs dot formation to a second image area on the sheet of paper while the light ink nozzle row performs dot formation to a first image area on the same sheet. The first image area is previously subjected to dot formation with the dark ink in a first recording scanning, so that the light ink dot-formed is overlapped with the dark ink in the second recording scanning. In this embodiment, the light ink is dot-formed with being shifted by ⅜ pixels to up, down, right, and left as mentioned above. Accordingly, the dot of the light ink formed later is hardly filtrated below the dot of the dark ink, which contributes to offering a desired density. FIG. 9 shows an example of recording similar to the present embodiment except that the dot shifting between the dark and light inks is not made. In the comparative example shown in FIG. 9, the light ink is dot-formed on the pixel where the dark ink has already been dot-formed. As a result, as described in the related art, eight pixels out of twenty-four pixels formed later with the light ink are completely overlapped with the dark ink as shown in FIG. 9. Accordingly, it is hard to achieve a desired increase in density.

Figure 27:
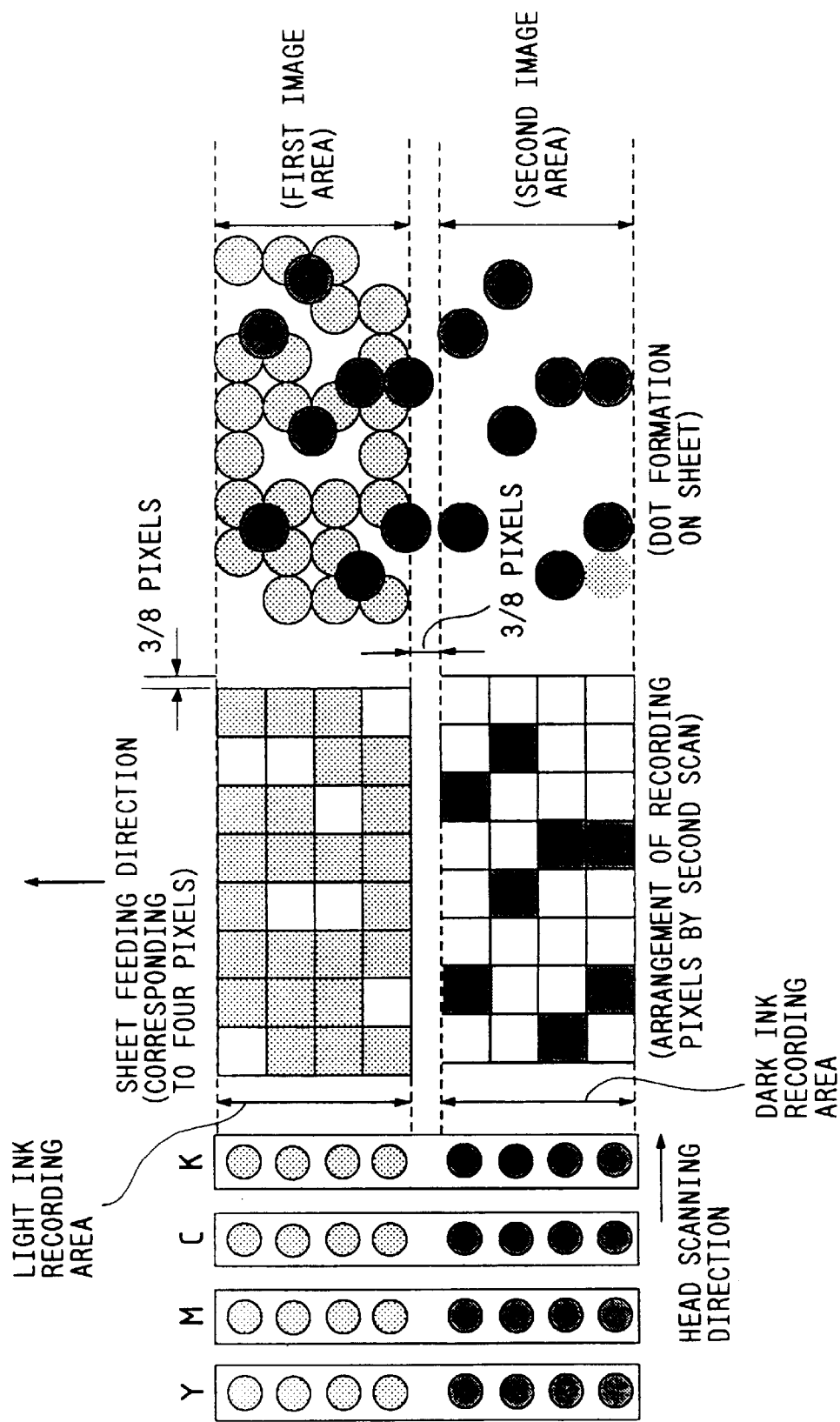
FIG. 27 is a view showing a printed result obtained according to the present invention.
Figure 28:
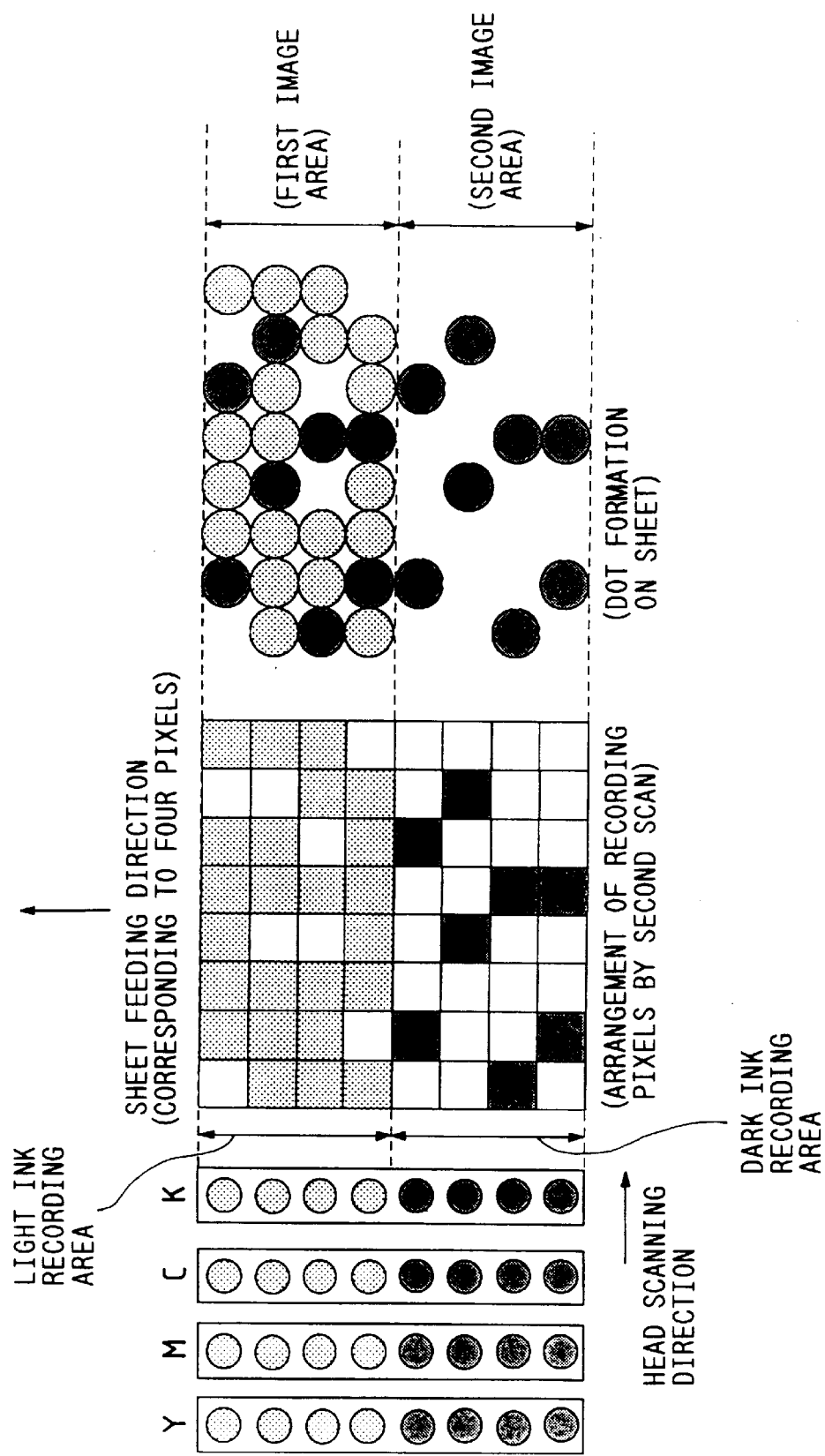
FIG. 28 shows a printed result compared with FIG. 27.

FIG. 27 shows an example of a case where the binarization is made according to a well known error distribution method in the present embodiment. FIG. 28 shows an example of a case where the binarization is made according to the error distribution method in the comparative example. Since recorded pixels are randomly arranged in the error distribution method, a probability of recording of the dark and light inks recorded on the same pixel is reduced. As a result, reduction in density due to overlapping of the inks is less than in the case with the simple dither. In addition, gradation reproducibility is also improved. However, even with the error distribution method, the image having the density closer to the desired one can be obtained as in the above mentioned examples if there is a portion where the dark and light inks are printed on the same pixel, when the dot formation positions for the dark and light inks are shifted by ⅜ pixels as in the present embodiment. On the other hand, in the comparative example, it is hard to achieve a desired increase in density because some dots of the dark ink are completely overlapped with the dots of the light ink.

While the present embodiment has thus been described in conjunction with the color ink-jet recording apparatus using the dark and light inks of four colors, the present invention is also effective in a monochrome ink-jet recording apparatus where the gradation is increased with inks of a single color such as dark and light black inks.

(Fifth Embodiment)

Figure 5:
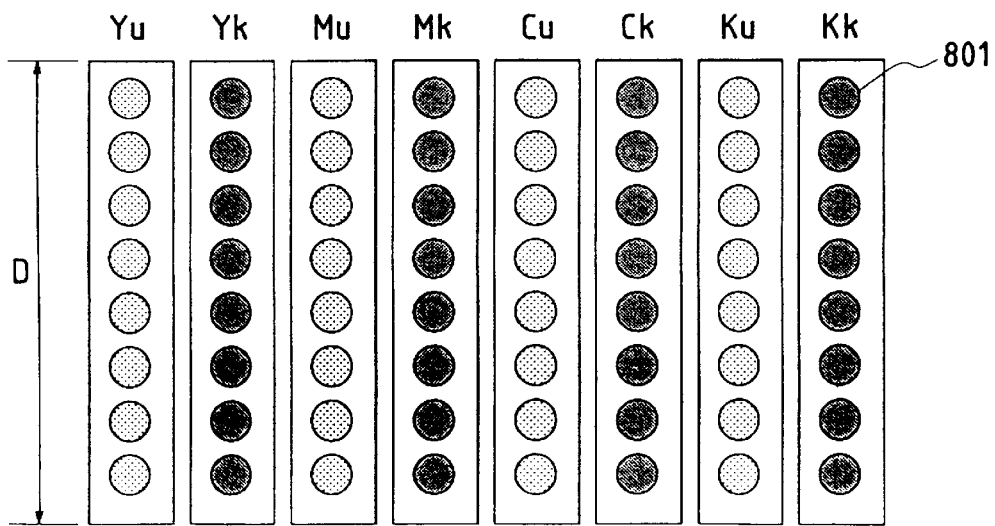
FIG. 5 shows a multi-head with a multi-nozzle used in the recording apparatus in FIG. 4 with the perspective from the paper side.
Figure 29:
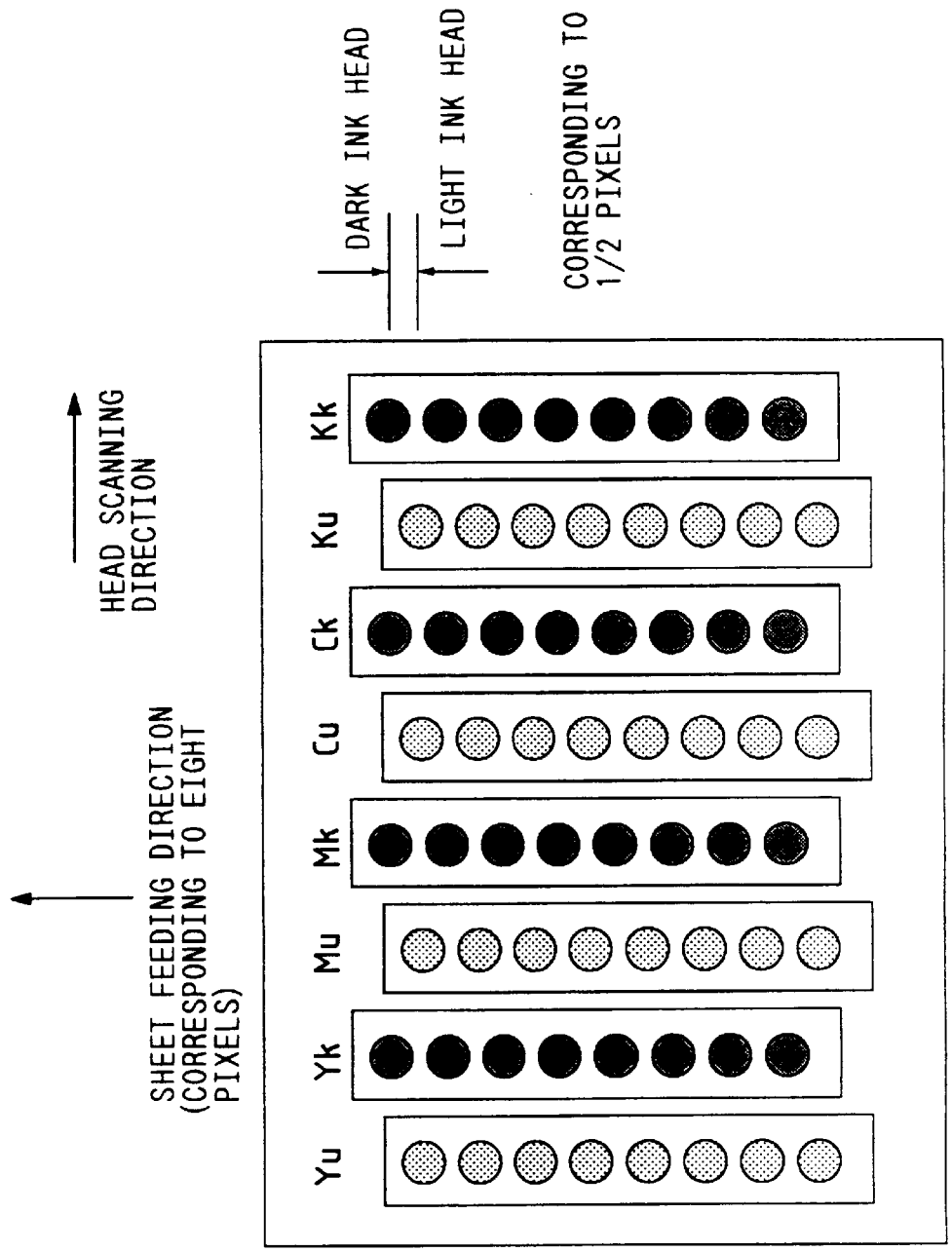
FIGS. 29, 30 and 31 are views showing construction of a head according to an embodiment of the present invention.

In this embodiment, described is a case where eight recording heads for dark and light four colors as in the conventional art in FIG. 5 are arranged in parallel on a carriage to perform dark and light recording through a same recording scanning. When the dark and light inks are printed on the same pixel at a short time interval through the same recording scanning, it is expected that the inks are mixed on the sheet of paper. Accordingly, deterioration of the density reproducibility due to filtration is less as compared with a case where a dot is overlapped with the ink which has previously been dot-formed and well fixed as in the above mentioned embodiment. A fixing speed to a certain degree is required to improve ease of dealing by means of restricting blot between different colors or increasing the fixing time. In this respect, there is a limitation on the mixing of the inks on the sheet of paper. This will be a matter of images as described in the related art. On the other hand, the fifth embodiment according to the present invention provides the recording heads for use in discharging the dark and light inks being shifted by an amount corresponding to ½ pixels in the sheet feeding direction as shown in FIG. 29. As a result, as in the above mentioned embodiment, the density reproducibility is improved as compared with the case where recording is made without shifting the dots printed with the inks having the different density as shown in FIG. 5.

Figure 30:
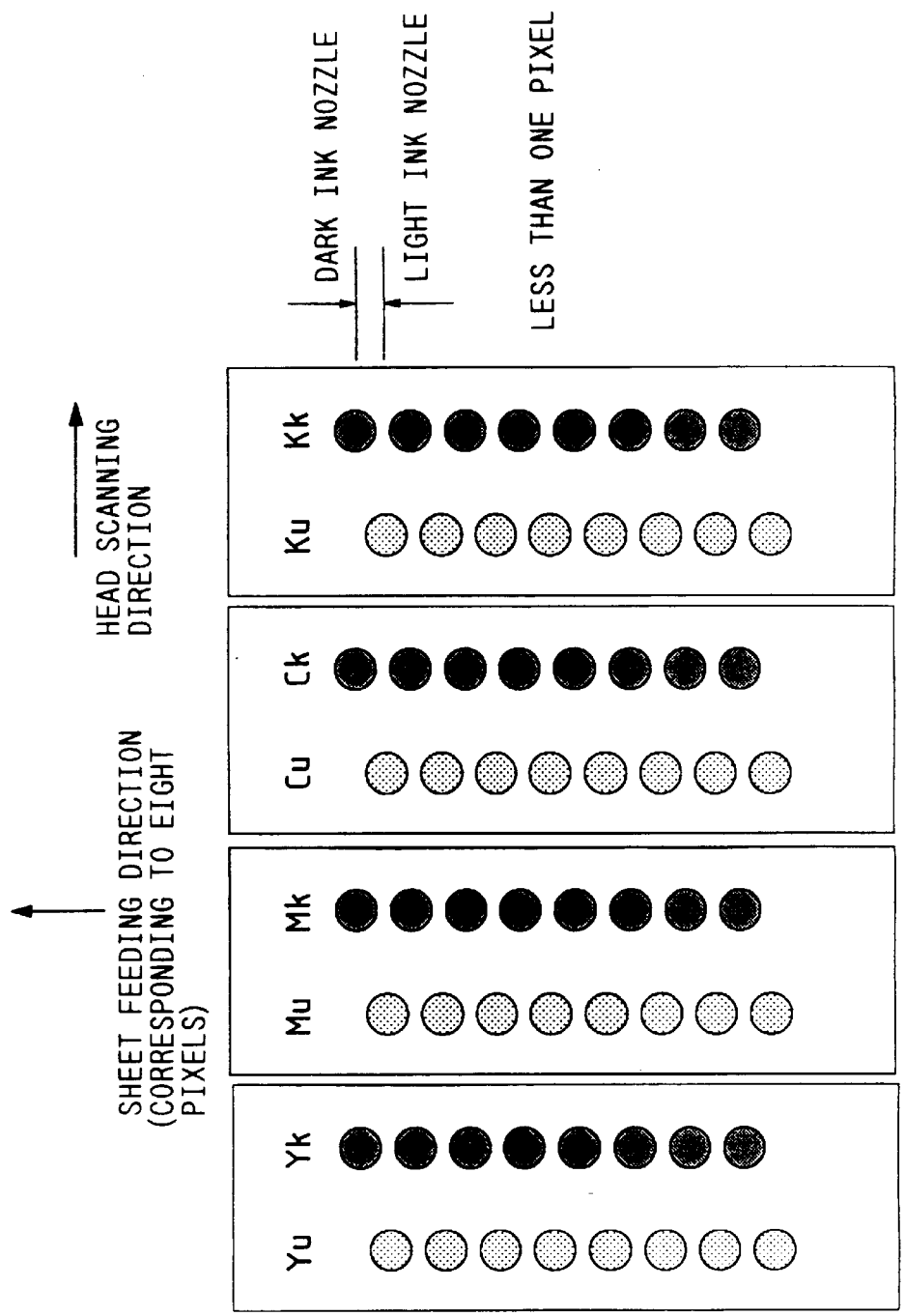
Figure 31:
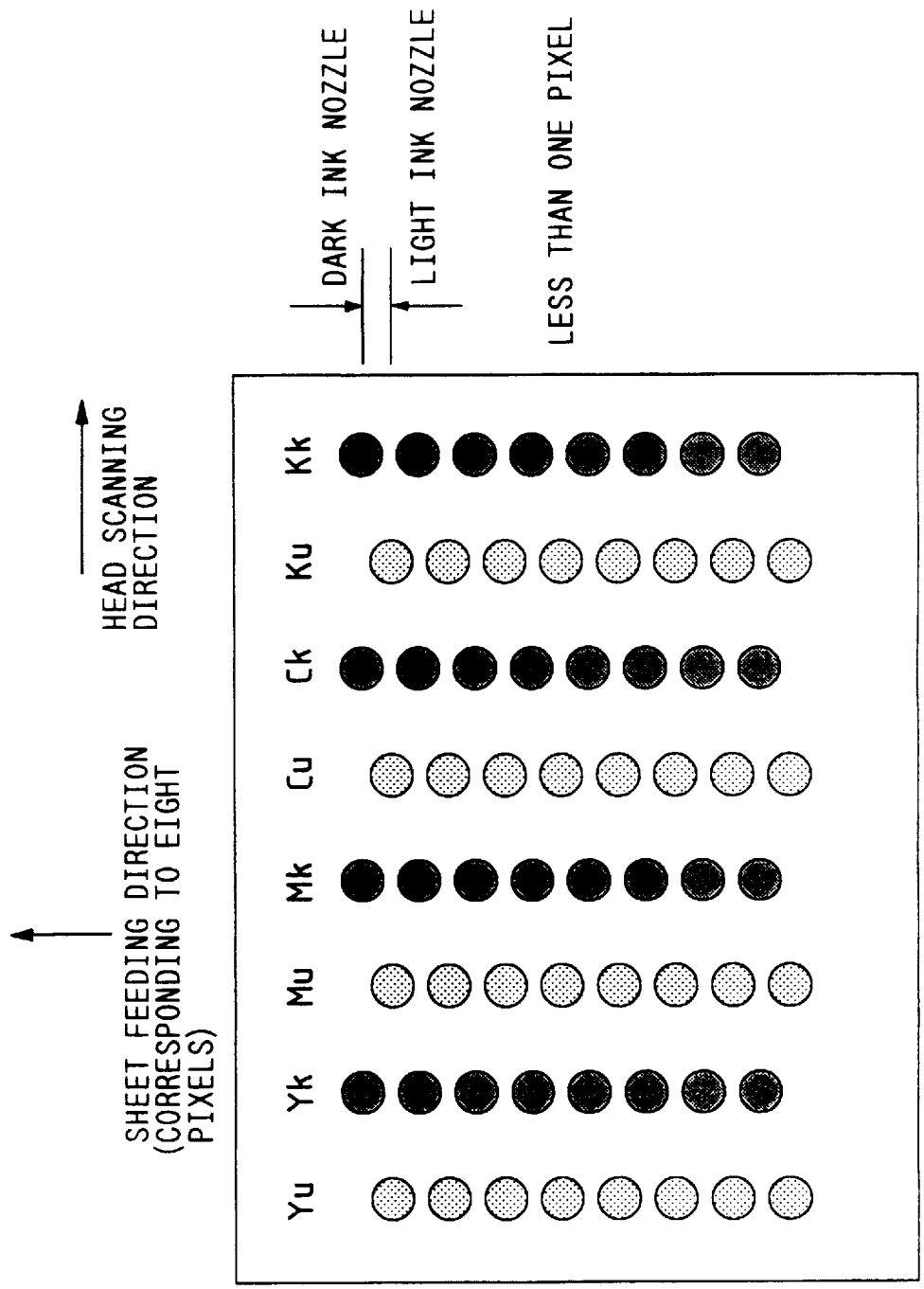

As the construction of the recording head, the recording head in this embodiment is shifted by a predetermined pixel in mounting to the carriage. However, to improve the accuracy of pixel shifting, eight recording heads may be shifted previously and assembled integrally into a head unit. In addition, recording heads for the dark and light colors may be shifted for each color and assembled integrally into four head units in total. Alternatively, as shown in a cross section of a recording head in FIG. 32, with a nozzle construction different from the above mentioned embodiment, a nozzle row of dark and light as shown in FIG. 30 may be constructed being shifted by an amount corresponding to less than one pixel on the same recording head. Further, as shown in FIG. 31, eight nozzle rows for dark and light four colors may be assembled on the same recording head being shifted by an amount corresponding to less than one pixel to improve a resist accuracy between colors.

(Sixth Embodiment)

Figure 33:
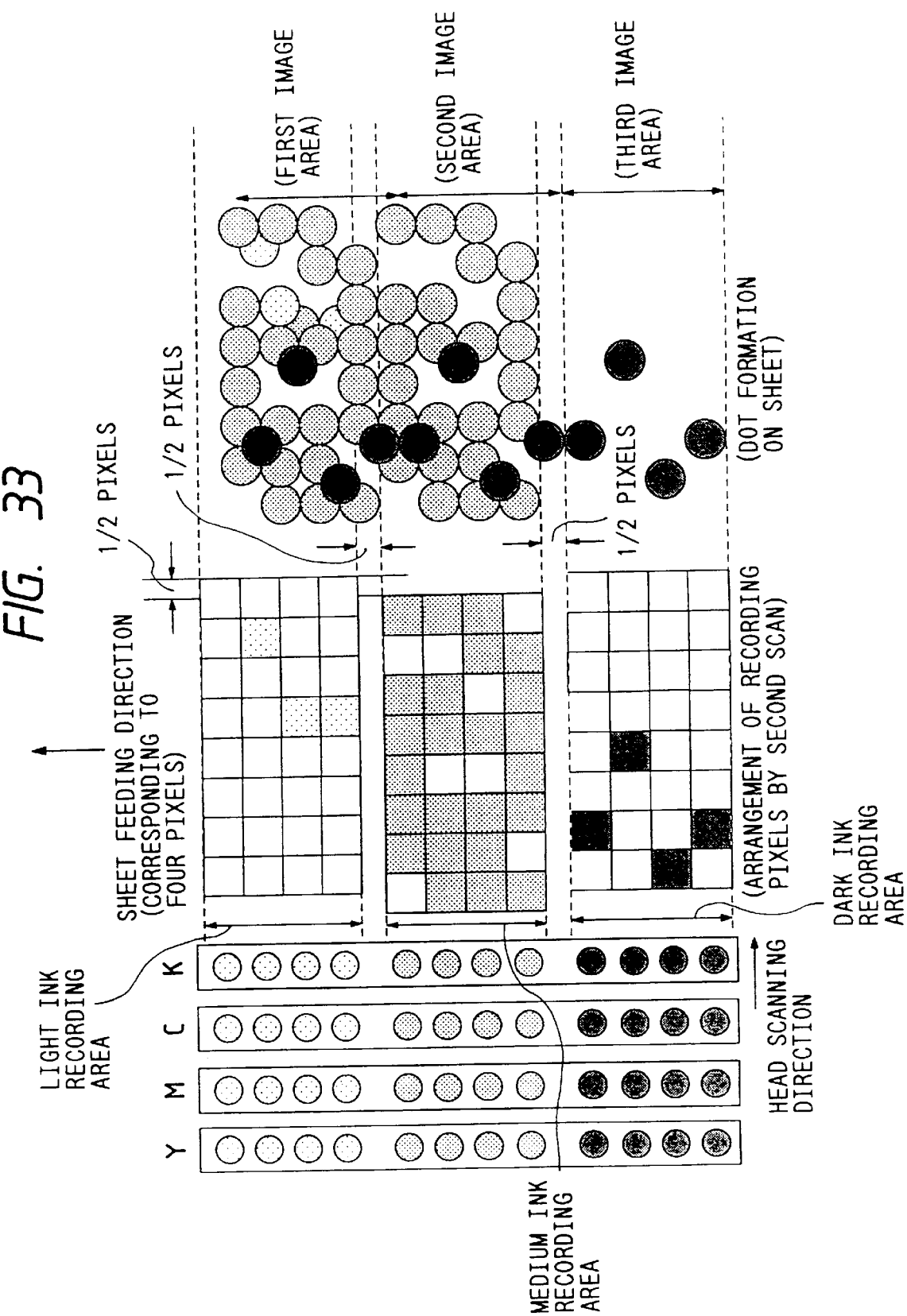
FIGS. 33 and 34 are views showing printed results obtained according to the present invention.
Figure 34:
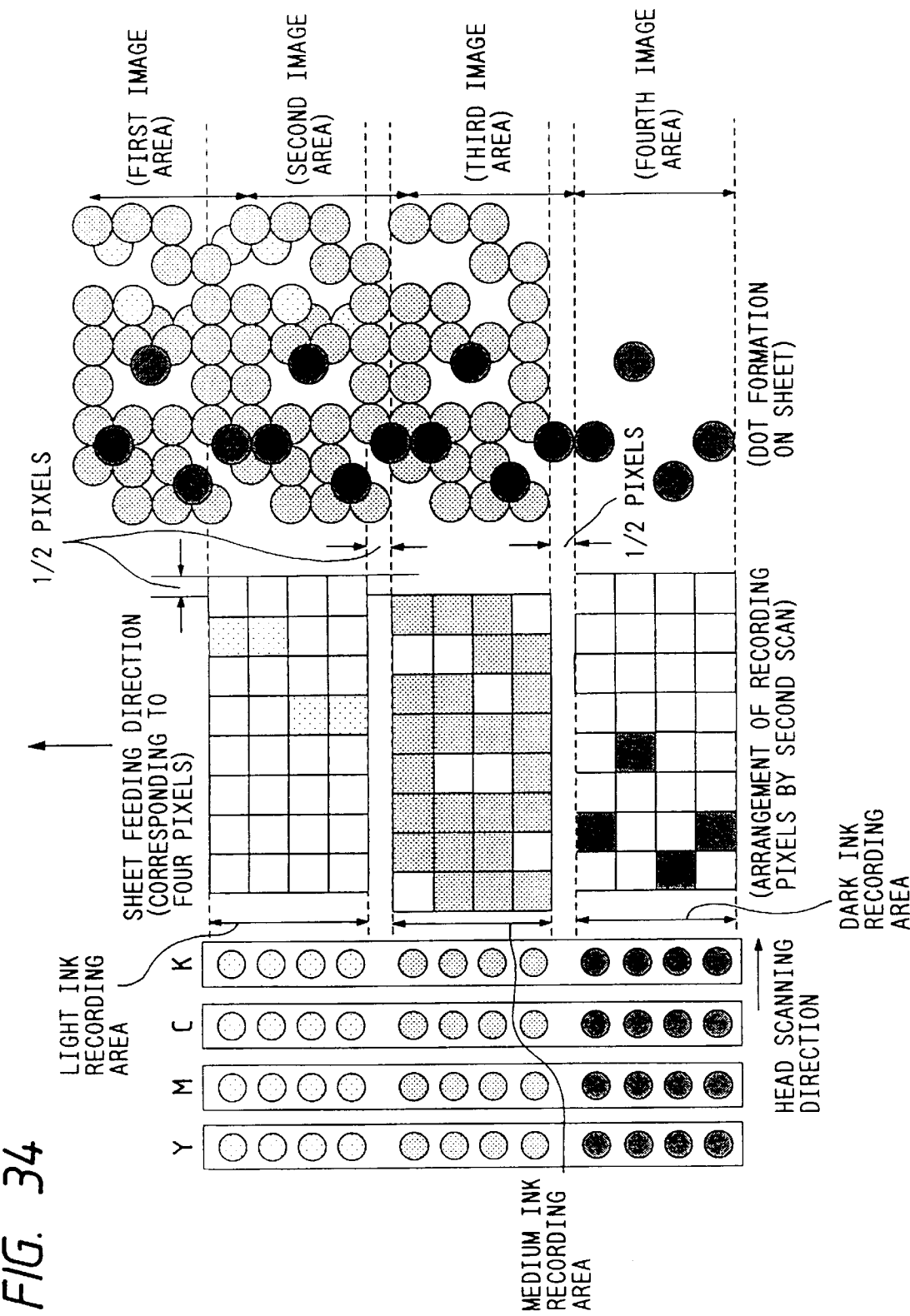
Figure 35:
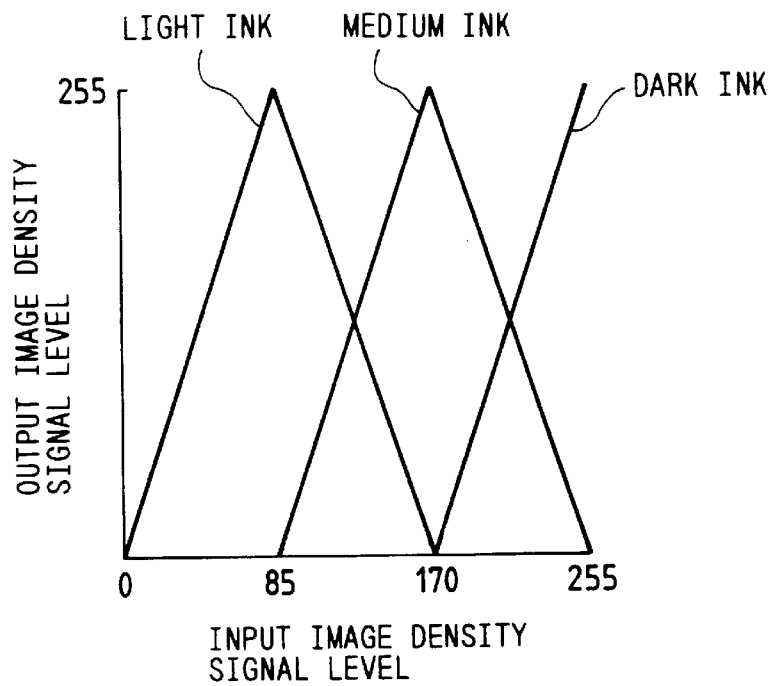
FIG. 35 shows a conversion table for converting an image input density signal into output image density signals corresponding to inks of various densities.
Figure 37:
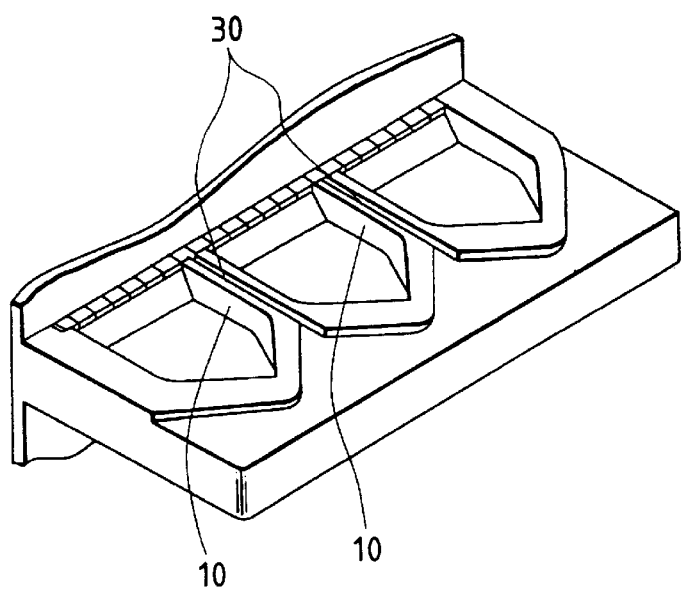
FIGS. 36 and 37 are views showing exemplified construction of the head according to the present invention.
Figure 36:
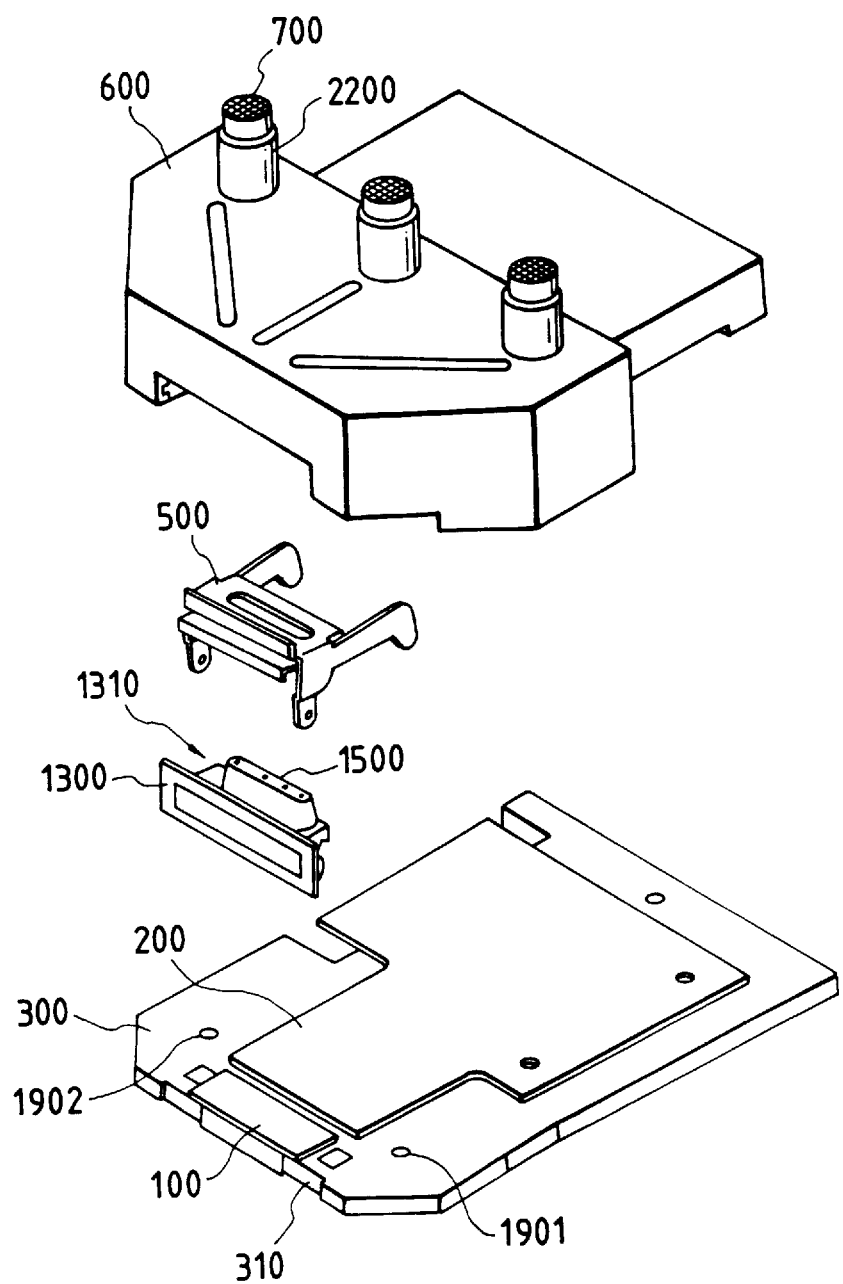

As a sixth embodiment of the present invention, illustrated is an example of an ink-jet recording apparatus in which gradation is further improved by using three inks of the same color but are different in density. Along with the above mentioned embodiments, images are formed with an ink (medium ink) of which density is intermediate between the dark and light inks. FIG. 33 shows four nozzles provided for each nozzle row. The nozzle rows are provided on a single recording head for three inks of different densities. A distance between the adjacent nozzle rows corresponds to ½ pixels. Accordingly, the dark and light inks are dot-formed on the same place on the sheet of paper while the medium ink is dot-formed at a position shifted from the dark and light dots to up, down, right and left by ½ pixels, including a discharge timing shift. FIG. 33 shows recorded pixel arrangement and dot formation on the sheet of paper after completion of a third recording scanning. The sheet of paper is successively fed by an amount corresponding to four pixels, so that a pixel row for a lower one pixel of a first image area is not reached to an area recorded with the light ink. This area is completed in a fourth recording scanning shown in FIG. 34. The dark and light distribution in this embodiment is such that the inks of different densities are not overlapped with each other in any input image density signal level as shown in FIG. 35. Accordingly, there is no possibility of the inks of the same color printed at 300% relative to a specific image density. In the examples shown in FIGS. 33 and 34, an image area recorded with two kinds of inks of higher density is aligned with an image area recorded with intermediate and light inks. However, the inks of the same color are not overlapped with each other in both areas. A desired improvement of the gradation reproducibility can thus be obtained with the inks which are different in density from each other. FIGS. 36 and 37 are views showing construction of an ink-jet head used in the present embodiment. Similar parts and components to those described in the above mentioned embodiments are depicted by like reference numerals and have similar functions thereto.

Figure 32:
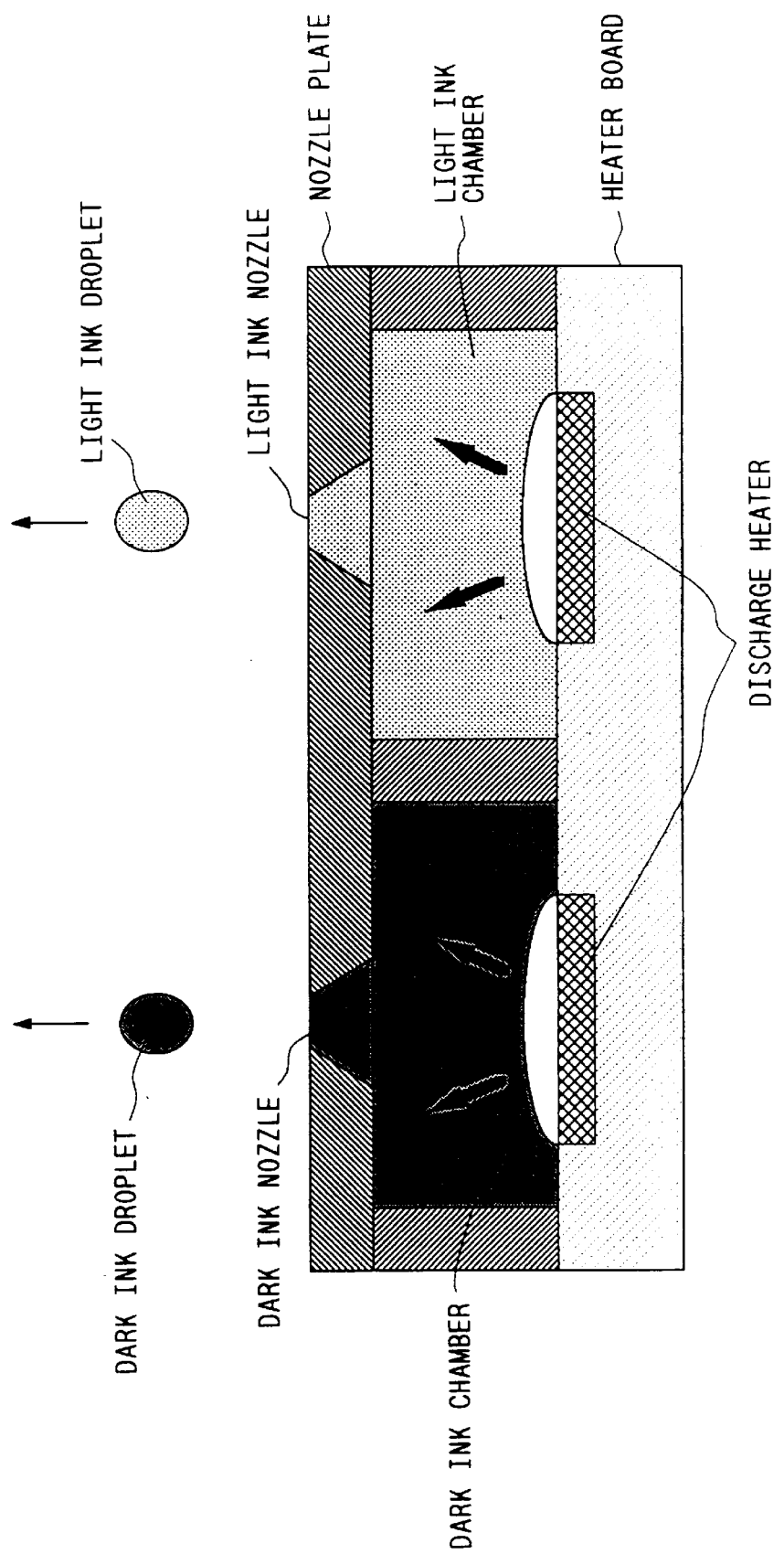
FIG. 32 is a view showing construction of a nozzle of a recording head.
Figure 38:
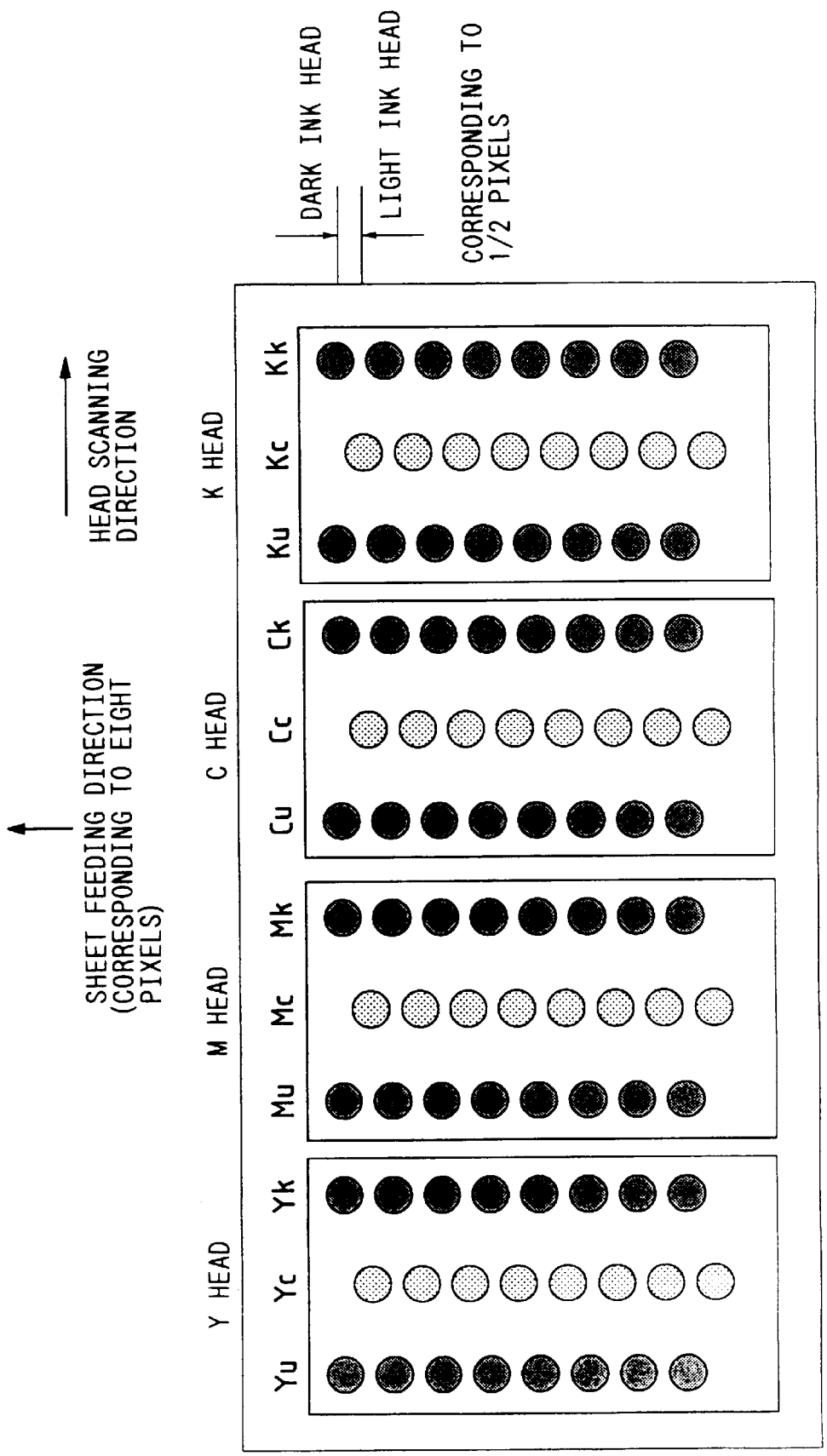
FIG. 38 is a view showing arrangement of the heads according to the present invention.

In this embodiment, recording heads for four colors having nozzle rows for inks of divergent densities and four heads are arranged on a carriage to provide a resist accuracy between colors. A nozzle row for the medium ink may be shifted by ½ pixels or by less than 1 pixel relative to the dark and light nozzle rows as shown in FIG. 38 with a nozzle construction as shown in FIG. 32 to integrally form it. In this event, Yu represents a discharge nozzle for a yellow ink of the medium density, Mu represents a discharge nozzle for a magenta ink of the medium density, Cu represents a discharge nozzle for a cyan ink of the medium density, and Ku represents a discharge nozzle for a black ink of the medium density. In addition, according to a dark/light distribution method of the present embodiment, the dark ink is not overlapped with the light ink and thus the dark and light inks are dot-formed on the same position. However, inks of different density may be overlapped with each other depending on the dark/light distribution method used. With this respect, the arrangement of the nozzle row for the inks may be shifted by less than 1 pixel.

According to the above mentioned fourth through sixth embodiments, when the dots are formed on a recording medium with the inks of the same color but of the different density, the inks of the same color but of the different density are not loaded on the same position. This contributes to restricting variation in density due to filtration of the inks, resulting in a recorded result having a high gradation reproducibility.

(Seventh Embodiment)

Next, a seventh embodiment of the present invention is described.

Figure 39:
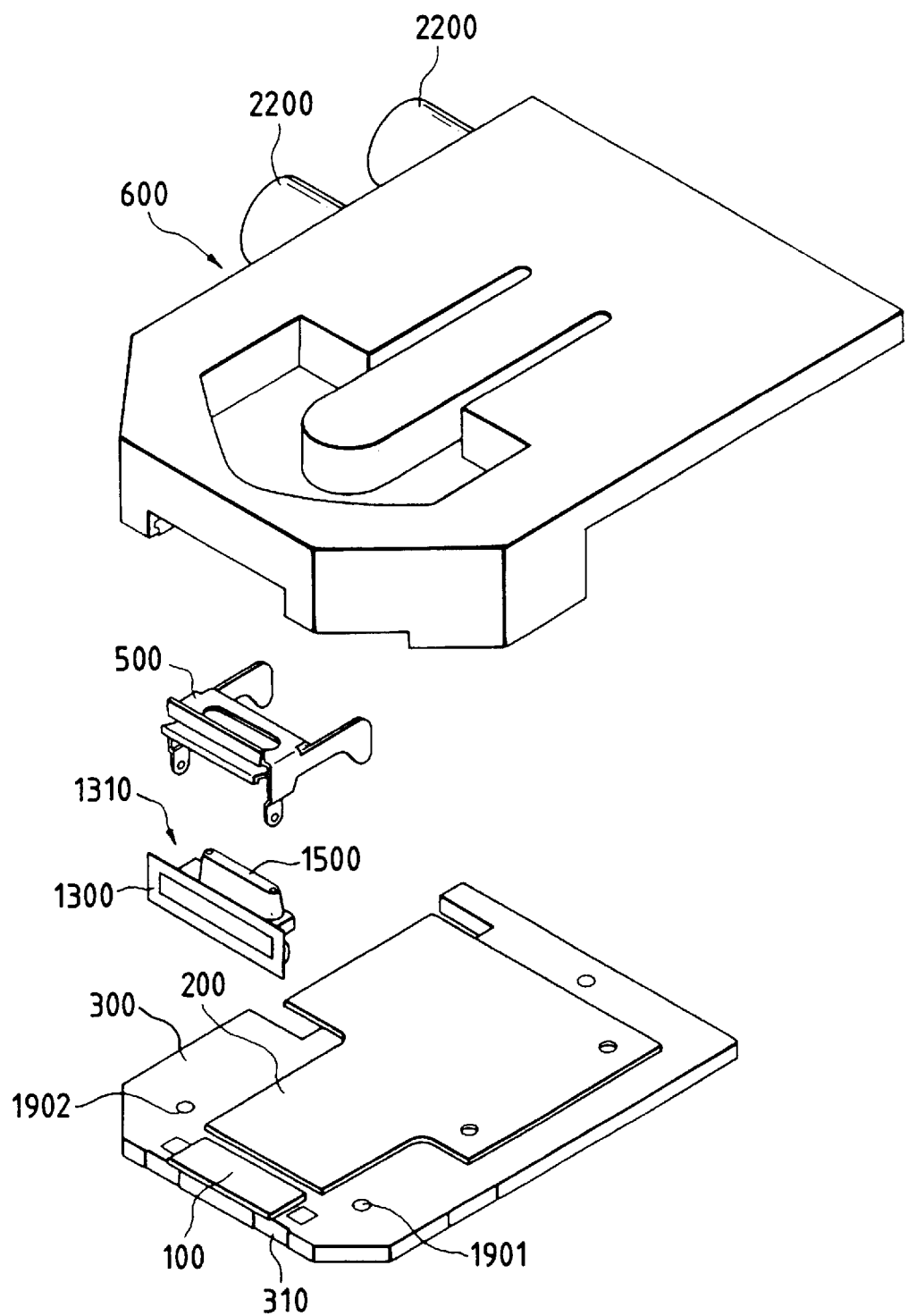
FIG. 39 is an exploded perspective view of a head according to an embodiment of the present invention.
Figure 41A:
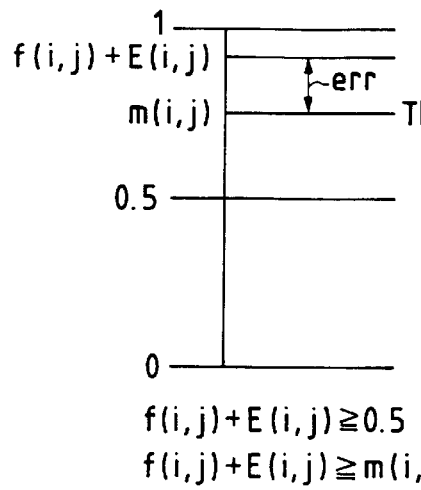
Figure 41C:
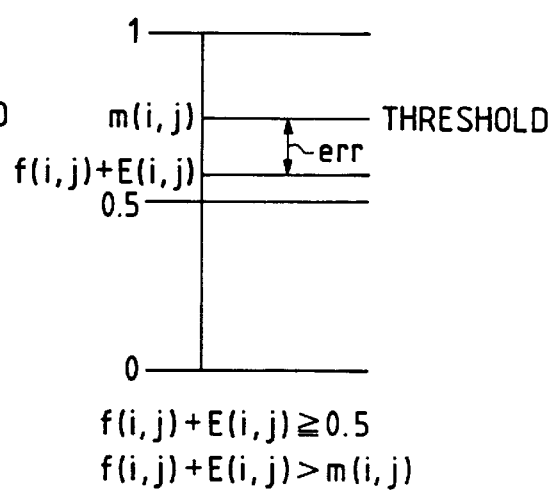
Figure 41B:
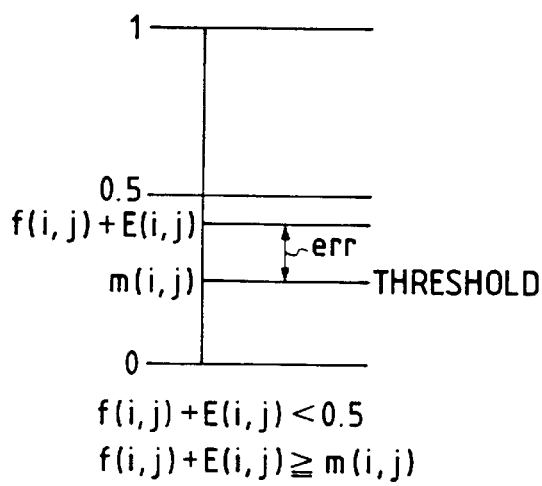
Figure 41D:
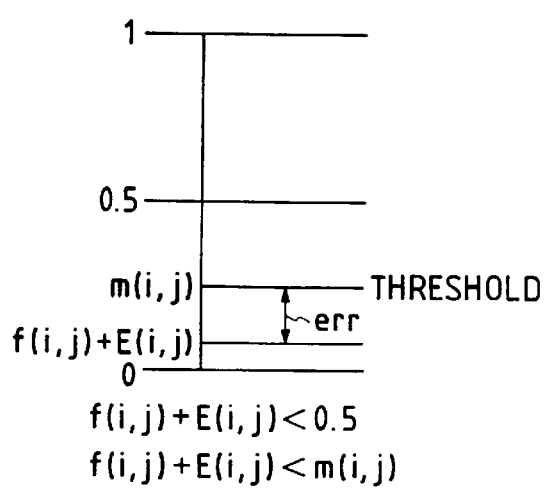

FIG. 39 is an exploded perspective view showing construction of a recording head which discharges dark and light inks according to an embodiment of the present invention.

Similar components and parts to those described in the above mentioned embodiments are depicted by like reference numerals. Constructions of the recording head, an ink-jet cartridge, and a carriage are similar to those described in conjunction with FIGS. 17 through 20 in the above embodiment. Accordingly, detailed description thereof will be omitted.

Referring to FIGS. 40A to 40C, descriptions are made as regards an image processing according to a seventh embodiment of the present invention. This embodiment is for ternarizing the image data to ensure that no dark and light ink data is contained in the data for the same pixel to avoid the above mentioned problems in a case where the dark and light inks are recorded on the same pixel.

FIG. 40A is a diagrammatic representation of input image data and, more particularly, is a view showing multi-value density data of the pixels for some pixels. In FIG. 40A, f(i, j) represents a multi-value density data of a remarkable pixel (i, j) to be ternarized and has normalized 256 values of from 0 to 1. In addition, pixels (i−2, j−1) through (i, i−1) above the broken line have already been subjected to ternarization processing. After ternarization of the remarkable pixel (i, j), the ternarization processing is successively made in a same manner on f(i, j+1), f(i, j+2).

FIG. 40B is a diagrammatic representation of ternarized image data. B(i, j) represents a density data (values of "0", "0.5", and "1") after ternarization of the remarkable pixel (i, j). A portion enclosed by the broken line contains pixel data which have already been subjected to ternarization processing at the time of processing the remarkable pixel. These data are used for the ternarization processing on the remarkable pixel (i, j).

FIG. 40C is a diagrammatic representation of a weighting mask. In this figure, R represents a weight corresponding to a pixel to be weighted and is represented by a matrix of 3 by 3. In this event, a value of a weight R (0. 0), R(0, −1) corresponding to a non-ternarized pixel (i, j), (i, j+1) is equal in number to zero. Predetermined values are given for any other weights R.

A ternarization processing according to the present invention by using a mean density method is described below.

First, a weighted mean density of a ternary image at or around the remarkable pixel (i, j) is given as m(i, j) according to the following equation:

$$m(i,j) = \sum_{X=0}^{2} \sum_{Y=-1}^{1} R(x,y) \times B(i-x, j-y) \quad (1)$$

Next, the multi-value data f(i, j) of the remarkable pixel (i, j) is ternarized according to a series of equations (2) given below with the mean density m(i, j) obtained in the above equation (1) used as a threshold value and by using a ternarized correction value E(i, j) based on an error caused in the former ternarization processing.

For $f(i, j)+E(i, j) \geq 0.5$, $B(i, j)=1$ when $f(i, j)+E(i, j) \geq m(i, j)$ and $B(i, j)=0.5$ when $f(i, j)+E(i, j) < m(i, j)$.

For $f(i, j)+E(i, j) < 0.5$, $B(i, j)=0.5$ when $f(i, j)+E(i, j) \geq m(i, j)$ and $B(i, j)=0$ when $f(i, j)+E(i, j) < m(i, j)$.

$err = f(i, j)+E(i, j)-m(i, j)$ $e1(i, i+1) = K1 \times err$ $e2(i+i, j) = K2 \times err$ $e3(i+i, j+1) = K3 \times err$ where $E(i, j) = e1(i, j) + e2(i, j) + e3(i, j)$ $$K1+K2+K3=1 \quad (2)$$

FIGS. 41A, 41B, 41C, and 41D are views for use in describing calculation of the above mentioned series of equations (2) for the individual conditions. In the equation (2), E(i, j) is a sum of an error e1(i, j) caused in ternarization of the multi-value density data f(i, j−1) of the pixel (i, j−1), or one pixel before processing the remarkable pixel (i, j), an error e2(i, j) caused in ternarization of the multivalue density data f(i−1, j) of the pixel (i−1, j) on one line before, and an error e3(i, j) caused in ternarization of the multi-value density data f(i−1, j−1) of the pixel (i−1, j−1) which is one pixel before that pixel.

This ternarized error E(i, j) is added to the multi-value density data f(i, j) of the remarkable pixel(i, j) for correction. The resultant value is then ternarized, which permits restoring of the image density after ternarization as a mean density over the entire input image area.

In addition, in the equation (2), distribution rates K1, K2, and K3 used in distributing an error err into three pixels adjacent to each other may be used with being randomly changed into previously prepared by ¼, ¼, ½, for example, random numbers. This avoids occurrence of periodic characteristics on the ternarized images.

The ternarized error err is given as follows:
err=0 when $$|f(i, j)+E(i, j)-m(i, j)| > \alpha \quad (3)$$

(α is a predetermined constant), and otherwise $$err = f(i, j)+E(i, j)-m(i, j) \quad (4).$$

As a result, in comparison between the mean density m and a remarkable pixel density corrected by E(i, j) (hereinafter, referred to as a corrected remarkable pixel density) in ternarization processing, a difference between the corrected remarkable pixel density and the mean density is assigned as a correction value (depending on the distribution rates K1, K2, and K3) in ternarization processing on the subsequent pixel according to the above mentioned equation (4) if the corrected remarkable pixel density is within a predetermined range that is close in value to the mean density m (an absolute value of a difference between the mean density m and the corrected remarkable pixel density is within the range not larger than the above).

On the other hand, if being out of the predetermined range, i.e., when a difference between the corrected remarkable pixel density and the mean density is sufficiently large (the absolute value of the difference is larger than α), the correction value for the ternarization processing on the subsequent pixel becomes equal to zero with the error err of zero.

In other words, correction of the error (former case) indicates that there is a small amount of change in density of the image at or around the remarkable pixel. Accordingly, the difference to the mean density is corrected at the subsequent pixel to reserve the density by means of ternarization, thereby allowing a pseudo intermediate processing while reproducing correctly a smooth change in the image density.

On the contrary, if no correction on the error is made (latter case), this indicates that an edge portion of a character or a line is changed suddenly on the remarkable pixel relative to the neighboring image density. For the pixel in such a case, the density is stored with the correction value of zero to restrict deterioration of the resolution. As a result, it becomes possible to improve the resolution at the edge portion.

As mentioned above, to perform the ternarization processing for each pixel causes each pixel to have the ternarized data of 0, 0.5 or 1. The dot of the ink at a dye density corresponding to that value is loaded on the recording medium to form an image. In this event, for two kinds of inks of dark and light, the dot of the dark ink is loaded on when a result of the ternarization processing indicates "1" while the dot of the light ink is loaded on when the result indicates "0.5" to form the image.

Figure 42:
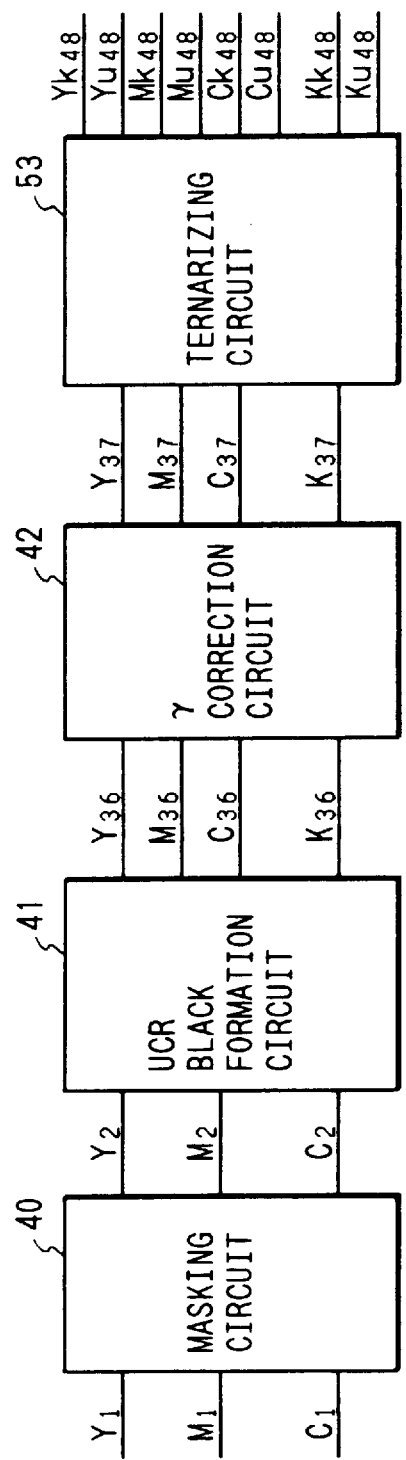
FIG. 42 is a block diagram of image processing according to the present invention.

FIG. 42 is a block diagram of an image processing circuit involved in the above mentioned ternarization processing. Similar circuits to those shown in FIG. 6 are depicted by like reference numerals and description thereof will be omitted.

Multi-value density signals $Y_{37}$, $M_{37}$, $C_{37}$, and $K_{37}$, for each pixel for the individual colors subjected to the predetermined color processing and gamma correction are supplied to a ternarizing circuit 53 where the processing represented by the above mentioned equations (1) through (4) is carried out to obtain ternarized image data of "0", "0.5", or "1" for each pixel. If the resultant ternarized image data has "0", discharge signals of the dark and light inks ($Y_{k48}$, $Y_{u48}$), ($M_{k48}$, ($Mu_{k48}$), ($C_{k48}$, $C_{u48}$) or ($K_{k48}$, $K_{u48}$) is set to "0". If the resultant ternarized image data has "0.5", a discharge signal of the light ink $Y_{u48}$ $M_{u48}$, $C_{u48}$ or $K_{u48}$ is set to "1" while a discharge signal of the dark ink is set to "0". In addition, if the resultant ternarized image data has "1", the discharge signal of the dark ink $Y_{k48}$, $M_{k48}$, $C_{k48}$ or $K_{k48}$ is set to "1" while the discharge signal of the light ink is set to "0".

The ternarizing circuit 53 for use in carrying out the above mentioned processing may be formed of a CPU constituting a control portion of the ink-jet recording apparatus according to this embodiment.

Figure 43:
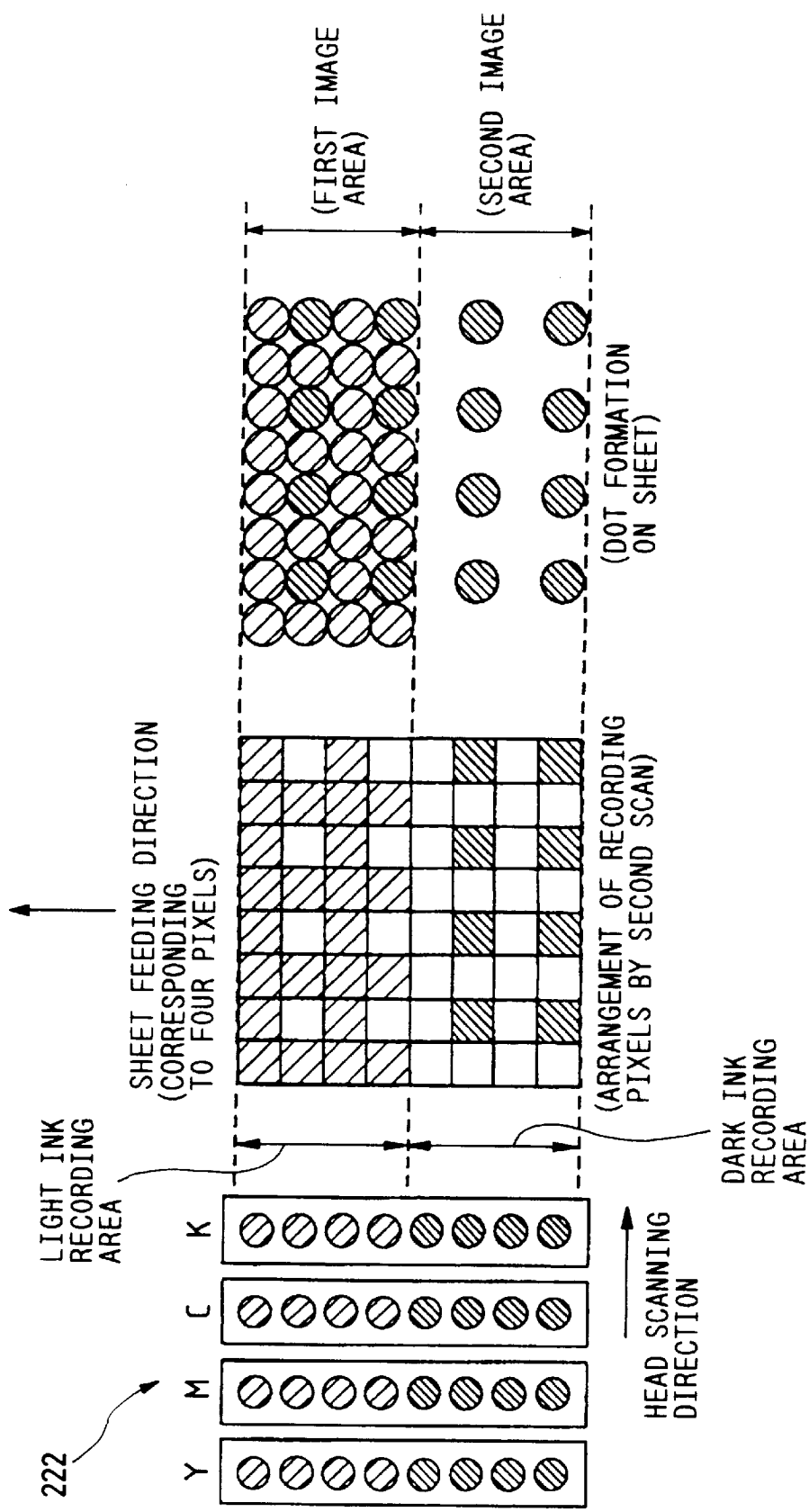
FIG. 43 is a view showing an exemplified recorded result according to the present invention.

FIG. 43 is a diagrammatic representation for use in describing recording based on the discharge data obtained through the above mentioned processing.

An ink-jet cartridge 222 of this Embodiment is for arranging a group of light ink discharge outlets and a group of the dark ink discharge outlets in a same line in the sheet feeding direction for each color of the ink. Accordingly, the sheet of paper is fed by an amount corresponding to ½ of the entire discharge width for each color of the ink. In scanning prior to the second scanning shown in the figure, the dark ink is discharged to the first image area on the recording paper and the dot of the dark ink is formed on the corresponding pixel. In this event, no image area is present that corresponds to the light ink discharge outlet.

Next, in the second scanning shown in the figure after sheet feeding by ½ of the entire discharge width for each color of the ink, the light ink is discharged on the first image area and the dot is formed on the corresponding pixel.

As apparent from FIG. 43, the dots of the dark and light inks are not formed on the same pixel through the above mentioned ternarization processing. Accordingly, it is possible to avoid occurrence of a texture due to overlapping of the dark and light inks.

While FIG. 43 shows a case where the dots are formed with the ink of a single color to simplify the description, the dots of the other colors are formed in practice according to the recording data.

As mentioned above, according to the present embodiment, deterioration of the image density or occurrence of the texture, which are caused as a result of loading the inks of the same color but of the different dye density on the same pixel as done conventionally, can be eliminated completely. In addition, correction is made such that the gradation of the image density for each pixel is reproduced more accurately, so that the gradation reproducibility caused with the inks of the same color that are different in density can be maintained.

While the above mentioned embodiment has thus been described in conjunction with the construction where two inks are not discharged on the same pixel because of the ternarization processing when two inks of different density are used for the inks of the same color, the present invention is also applicable to a case where k inks of different density are used.

A value of (k+1)-valued data B(i, j) as a result of (k+1)-valued processing with k kinds of inks of the same color that are different in dye density may be "0", "1/k", "2/k", ..., "1" and a threshold value, i.e., the mean density m(i, j) is given as follows:

$$m(i,j) = \sum_{X=0}^{2} \sum_{Y=-1}^{1} R(x,y) \times B(i-x, j-y) \quad (5)$$

The multi-value density data f(i, j) of the remarkable pixel (i, j) is (k+1)-valued according to a series of equations given below with the mean density m(i, j) and a (k+1)-valued correction value E(i, j) based on an error caused in the former (k+1)-valued processing.

For $f(i, j)+E(i, j) \geq (k-1)/k$, $B(i, j)=1$ when $f(i, j)+E(i, j) \geq m(i, j)$, and $B(i, j)=(k-1)/k$ when $f(i, j)+E(i, j)<m(i, j)$.

For $(k-1)/k > f(i, j)+E(i, j) \geq (k-2)/k$, $B(i, j)=(k-1)/k$ when $f(i, j)+E(i, j) \geq m(i, j)$, and $B(i, j)=(k-2)/k$ when $f(i, j)+E(i, j)<m(i, j)$.

For $f(i, j)+E(i, j)<1/k$, $B(i, j)=1/k$ when $f(i, j)+E(i, j) \geq m(i, j)$, and $B(i, j)=0$ when $f(i, j)+E(i, j)<m(i, j)$.

$err=f(i, j)+E(i, j)-m(i, j)$ $e1(i, j+1)=K1 \times err$ $e2(i+1, j)=K2 \times err$ $e3(i+1, j+1)=K3 \times err$ where $E(i, j)=e1(i, j)+e2(i, j)+e3(i, j)$ $K1+K2+K3=1$ \hfill (6)

With the above mentioned calculation equations, occurrence of the texture can be avoided in the case where k kinds of inks of the different density are used.

(Modification of the Seventh Embodiment)

In this embodiment, calculation for the ternarization is made in a following manner.

More specifically, the multi-value density data f(i, j) of the remarkable pixel (i, j) is ternarized according to a series of equations (7) and (8) given below with the mean density m(i, j) and a ternarized correction value E(i, j) based on an error caused in the former ternarization processing:

For $f(i, j)+E(i, j) \geq 0.5$ and $m(i, j) \geq 0.5$, $B(i, j)=1$ when $f(i, j)+E(i, j) \geq m(i, j)$, and $B(i, j)=0.5$ when $f(i, j)+E(i, j)<m(i, j)$, $err=f(i, j)+E(i, j)-m(i, j)$.

For $f(i, j)+E(i, j)<0.5$ and $m(i, j)<0.5$, $B(i, j)=0.5$ when $f(i, j)+E(i, j) \geq m(i, j)$, and $B(i, j)=0$ when $f(i, j)+E(i, j)<m(i, j)$, $err=f(i, j)+E(i, j)-m(i, j)$.

For $f(i, j)+E(i, j) \geq 0.5$ and $m(i, j)<0.5$, $B(i, j)=0.5$, $err=f(i, j)+E(i, j)-0.5$.

For $f(i, j)+E(i, j) \geq 0.5$ and $m(i, j)<0.5$, $B(i, j)=0.5$, $err=f(i, j)+E(i, j)-0.5$.

$e1(i, j+1)=K1 \times err$ $e2(i+1, j)=K2 \times err$ $e3(i+1, j+1)=K3 \times err$ where $E(i, j)=e1(i, j)+e2(i, j)+e3(i, j)$ $K1+K2+K3=1$ \hfill (7)

FIGS. 44A to 44F are diagrammatic representations of the above mentioned series of equation (7).

Processing of the above mentioned series of equation (7) is performed when the following equation (8) holds, and otherwise, the ternarization processing is carried out according to the equation (2) described in the first embodiment:

$$|f(i, j)+E(i, j)-m(i, j)|>\beta \text{ (}\beta \text{ is a constant)} \quad (8)$$

According to this embodiment, the gradation reproducibility of the density at the image density has a value of 0.5 or around by means of properly determining the value of β. In addition, the ternarized error err is given as in the first embodiment:

err=0 when $$|f(i, j)+E(i, j)-m(i, j)|>\alpha \quad (9)$$

(α is a predetermined constant), and otherwise $$err=f(i, j)+E(i, j)-m(i, j) \quad (10)$$

While in above mentioned seventh embodiment and other embodiments, the mean density method is used to obtain the ternarization or (n+1)-valued result, another method may be used such as the dither or the error distribution method.

As apparent from the above description, according to this embodiment, the density data for use in recording images or the like are n-valued by every one pixel and one ink of the (n−1) inks of the same color and different density that corresponds to the n-value for each pixel is discharged.

As a result, the inks of the same color that are different in density are not discharged on the same pixel. Accordingly, it is possible to reduce the texture due to overlapping of the inks having the different density.

(Other Embodiments)

The present invention yields good effects particularly in a recording head or a recording apparatus of the ink-jet type that forms atomized liquid drops by using a thermal energy to record.

For typical construction and principle thereof, it is preferable to use a basic principle disclosed in, for example, U.S. Pat. Nos. 4,723,129 and 4,740,796. This method is applicable to either a so-called on-demand type or a continuous type. In particular with the on-demand type, it is advantageous because a thermal energy is caused on an electric/thermal converter by means of applying at least one driving signal for suddenly increasing temperature which exceeds nucleate boiling and which corresponds to the recorded information to the electric/thermal converter arranged for a sheet or a liquid path where the liquid (ink) is held, thereby causing film boiling on a thermal acting surface of the recording head to form bubbles in the liquid (ink) corresponding one by one to this driving signal. The liquid (ink) is discharged through a discharging outlet using this growing and contraction of the bubbles to form at least one droplet. With the driving signal in a form of pulsed signal, the bubbles are grown and contracted at a proper timing. As a result, liquid (ink) discharge of particularly excellent responsiveness can be achieved and is thus more preferable.

Preferable pulsed driving signals are those disclosed in U.S. Pat. Nos. 4,463,359 and 4,345,262. With the conditions disclosed in U.S. Pat. No. 4,313,124, an invention regarding to a temperature increase ratio on the above mentioned thermal acting surface, it is possible to achieve further excellent recording.

The construction of the recording head includes a discharge port disclosed in the above mentioned U.S. Patents, a liquid path, a combination of the electric/thermal converter (linear liquid path of L-shaped liquid path) as well as constructions using U.S. Pat. No. 4,558,333 disclosing construction with the thermal acting portion being arranged at a bent position, and U.S. Pat. No. 4,459,600.

In addition, the present invention is also effective with the construction based on Japanese Patent Application Laid-Open No. 59-123670 disclosing the construction where a common slit is used as a discharging portion for the electric/thermal converter to a plurality of electric/thermal converters as well as on Japanese Patent Application Laid-Open No. 59-138461 disclosing construction where an opening for absorbing pressure waves of the thermal energy is provided for the discharging portion.

Further, a full-line type recording head having a length corresponding to the width of the maximum recording medium available in a recording apparatus may have construction that covers the length by a combination of a plurality of recording heads as disclosed in the above mentioned specifications or may be a single recording head integrally formed. However, the present invention can exhibit the above mentioned effects more effectively.

Moreover, the present invention is also effective in a replaceable chip type recording head where it is possible to use electrical connection to the apparatus body and supply of inks from the apparatus body, or a cartridge type recording head where an ink tank is formed integrally with the recording head itself.

In addition, to add restoring means to the recording head or supplemental auxiliary means is preferable because the effects of the present invention can further be stabilized. More specifically, the following can be used effectively to perform stable recording: capping means to the recording head; cleaning means; pressurizing or absorbing means; preliminary heating means achieved by an electric/thermal converter or other heating elements or a combination thereof; and to perform a preliminary discharging mode to perform discharge other than for recording.

While the above mentioned embodiments of the present invention have thus been described in conjunction that the ink is in a liquid form, inks may be solid at or lower than at a room temperature and softened at a room temperature, or liquid, or the inks may be in the liquid form upon applying a use recording signal because the above mentioned ink-jet system typically carries out temperature control to ensure viscosity of the ink to be in a stable discharge range by means of controlling temperature of the ink itself within a range from 30° C. to 37° C., both inclusive.

In addition, to avoid actively any increase of temperature due to the thermal energy by means of using it as an energy for state transition from solid to liquid, or by means of using an ink that is solidified when unused to avoid evaporation of the ink, in any cases such inks can be used in the present invention that are changed into liquid in response to the thermal energy including those changed into liquid in response to application of the thermal energy according to the recording signal and discharged as liquid ink, or those that start solidification at the timing of reaching the recording medium. In this event, the ink may be formed in an opposite position to the electric/thermal converter with being held as liquid or solid in a porous sheet concave portion or a penetrating bore. In the present invention, the most effective one to the above mentioned inks is the one that performs the above mentioned film boiling system.

Further, the recording apparatus according to the present invention may be in the form of a copier combined with a reader or the like, or a facsimile apparatus having a transceiver function along with those integrally or separately provided as an image output terminal for an information processing apparatus such as the above mentioned word processor or computer.

FIG. 45 is a block diagram showing a schematic construction of the ink-jet recording apparatus according to the present invention applied to an information processing apparatus that has a function as a word processor, a personal computer, a facsimile apparatus, and a copier. In the figure, a reference numeral 1201 represents a control unit that controls the entire apparatus and comprises a CPU such as a microprocessor and various I/O ports. The control unit 1201 supplies control signals and data signals to other components. The control unit 1201 also receives control signals and data signals from other components for control. A reference numeral 1202 represents a display unit having a screen on which various menus, text information, and image data read by an image reader 1207 are displayed. A reference numeral 1203 represents a transparent pressure-responsive touch panel mounted on the display unit 1202. Items and coordinates on the display 1202 can be introduced into the apparatus by means of pressurizing the surface of the touch panel with a finger.

A reference numeral 1204 represents a frequency modulation (FM) sound source to read sound information generated by a sound editor or the like stored in a memory unit 1210 or an external storage 1212 as digital data and to perform frequency modulation on that data. An electrical signal supplied from the FM sound source 1204 is converted into an audible sound by a loud speaker unit 1205. A printer unit 1206 is where the recording apparatus according to the present invention is applied as an output terminal for a word processor, a personal computer, a facsimile apparatus or a copier.

A reference numeral 1207 represents the image reader unit which reads original data photoelectrically and supplies them. The image reader is provided in a transportation path for the original to read various originals such as a facsimile original and a copy original. A reference numeral 1208 represents a facsimile transmission/reception unit for transmitting via facsimile the original data read by the image reader unit 1207 and for receiving and synthesizing a transmitted facsimile signal. The facsimile transmission/reception unit 1208 has an interface function to the outside. A reference numeral 1209 represents a telephone unit which has various telephone functions including a normal telephone function and a caretaking function. A reference numeral 1210 represents the memory unit comprising a ROM for storing system programs, manager programs and other application programs as well as dictionaries, a RAM for storing application programs loaded from the external storage 1212 and character information, and a video RAM.

A reference numeral 1211 represents a keyboard unit for use in introducing text information and various commands. A reference numeral 1212 represents the external storage for which recording medium is a flexible disk or a hard disk. The external storage 1212 stores character information, sound information, and application programs of a user.

FIG. 46 is an outer configuration of an information processing apparatus shown in FIG. 45. In this figure, a reference numeral 1301 represents a flat panel display using a liquid crystal or the like for displaying various menus, graphical information and text information or the like. A touch panel is mounted on the display 1301. Items and coordinates on the display 1301 can be introduced into the apparatus by means of pressing the surface of the touch panel with a finger. A reference numeral 1302 represents a hand set used when the apparatus serves as a telephone.

A keyboard 1303 is removably connected to the body through a cord for supplying character information and data to the apparatus. The keyboard 1303 is provided with various function keys 1304. A reference numeral 1305 represents an inserting opening for a flexible disk.

A reference numeral 1307 represents a sheet mounting portion for mounting an original to be read by the image reader unit 1207. The original of which content is read is discharged from the backside of the apparatus. In facsimile reception, received information is recorded with an ink-jet printer 1307.

While the above mentioned display 1301 may be a CRT display, it is preferable to use a flat panel such as a liquid crystal using a ferroelectric liquid crystal. This is because such liquid crystal offers a small, thin and light apparatus. When the above mentioned information processing apparatus serves as a personal computer or a word processor, the information supplied from the keyboard 1211 in FIG. 24 is processed by the control unit 1201 according to a predetermined program and is supplied to the printer unit 1206 as an image. When the information processing apparatus serves as a receiver of a facsimile apparatus, facsimile information received through a communication line by the facsimile transmission/reception unit 1208 is reception processed by the control unit 1201 according to a predetermined program and is supplied to the printer unit 1206 as a received image.

In addition, when the information processing apparatus serves as a copier, the original is read by the image reader unit 1207. The read original data is supplied to the printer unit 1206 as a copied image through the control unit 1201. When the information processing unit serves as a transmitter of the facsimile apparatus, the original data read by the image reader unit 1207 is transmission processed by the control unit 1201 according to a predetermined program and is transmitted to a communication line through the facsimile transmission/reception unit 1208. The above mentioned information processing apparatus may be an integrated type comprising a built-in ink-jet printer as shown in FIG. 47. In this event, it becomes possible to further improve a portable feature. In this figure, components and parts having the same function as those illustrated in FIG. 46 are depicted by like reference numerals.

By applying the recording apparatus according to the present invention to the multi-function information processing apparatus described above, recorded image of high quality can be obtained, offering further improvement in function of the above mentioned information processing apparatus.

As mentioned above, according to the present invention, it is possible to form images of high quality without causing local differences in density or occurrence of textures in an ink-jet recording apparatus adapted to recording with two or more kinds of inks having different densities.

What is claimed is:

1. An ink jet recording apparatus which includes plural ink discharge means for discharging ink onto a recording medium to form an image, said plural ink discharge means discharging plural kinds of ink each with a different density, respectively, comprising:

converting means for converting an input image density signal into either an output image density signal for driving a first ink discharge means for a first ink density or an output image density signal for driving a second ink discharge means for a second ink density, in accordance with an amplitude of said input image density signal at which recording is performed with two kinds of ink each having a different density;

binarizing means for converting the output image density signal outputted from said converting means into binary data;

inverting means for inverting the binary data converted into binary data by said binary means;

distributing means for distributing the binary data inverted by said inverting means and binary data to be inverted by said inverting means into drive data for said first ink discharge means for said first density and drive data for said second ink discharge means for said second density; and drive control means for correspondingly driving said first and second ink discharge means in accordance with distributed drive data to form an image on the recording medium by discharging corresponding ink.

2. An ink jet recording apparatus according to claim 1, wherein different kinds of ink discharged from said plural ink discharge means are of plural colors each having a different density, said plural ink discharge means corresponding to said different kinds of ink of plural colors, respectively.

3. An ink jet recording apparatus according to claim 1, wherein each of said plural ink discharge means discharges ink by utilizing thermal energy, and wherein said ink discharge means includes a thermal energy conversion to produce thermal energy for application to the ink.

4. An ink jet recording apparatus according to claim 3, wherein each of said plural ink discharge means causes a change in state of the ink due to the thermal energy transferred by said thermal energy conversion element to jet ink from a nozzle.

5. An ink jet recording apparatus according to claim 1, further comprising image reading means for reading an original.

6. An ink jet recording apparatus according to claim 1, further comprising image information transmission and/or receiving means for receiving and/or transmitting information.

7. An ink jet recording apparatus according to claim 6, further comprising image reading means for reading an original.

8. An ink jet recording apparatus according to claim 1, further comprising record signal inputting means for inputting a record signal.

9. An ink jet recording apparatus according to claim 8, wherein said record signal inputting means comprises a keyboard.

10. An ink jet recording method utilizing plural ink discharge means for discharging ink onto a recording medium to form an image, said plural ink discharge means discharging plural kinds of ink each with a different density, respectively, said method comprising the steps of:

converting an input image density signal into either an output image density signal for driving a first ink discharge means for a first ink density or an output image density signal for driving a second ink discharge means for a second ink density, in accordance with an amplitude of said input image density signal at which recording is performed with two kinds of ink each having a different density;

converting the output image density signal into binary data;

inverting binary data converted in said converting step;

distributing the binary data inverted in said inverting step and the binary data to be inverted into first drive data for said first ink discharge means for said first density and second drive data for said second ink discharge means for said second density; and driving said plural ink discharge means based on the first and second drive data distributed to perform a recording operation.

11. An ink jet recording method according to claim 10, wherein different kinds of ink discharged from said plural ink discharge means are of plural colors each having a different density, said plural ink discharge means corresponding to said different kinds of ink of plural colors, respectively.

12. An ink jet recording method according to claim 10, wherein each of said plural ink discharge means discharges ink by utilizing thermal energy, and wherein said ink discharge means includes a thermal energy conversion element to produce thermal energy for application to the ink.

13. An ink jet recording method according to claim 12, wherein each of said plural ink discharge means causes a change in state of the ink due to the thermal energy transferred by said thermal energy conversion element to jet ink from a nozzle.

14. An ink jet recording apparatus including plural ink discharge means for discharging ink onto a recording medium to form an image, said plural ink discharge means discharging plural kinds of ink, each with a respectively different density, said apparatus comprising:

means for obtaining an output image density signal for driving said ink discharge means for discharging ink having a predetermined density in accordance with an image density exhibited by the image density signal;

binarizing means for converting the output image density signal into binary data;

inverting means for inverting the binary data; and distributing means for distributing the binary data and the inverted binary data into drive data for driving said ink discharge means for discharging the plural kinds of ink each with a different density.

15. An ink jet recording apparatus according to claim 14, wherein said distributing means converts the binary data into drive data for driving said ink discharge means for discharging the ink having the predetermined density and the binary data inverted by said inverting means into drive data for driving said ink discharge means for discharging ink having a density different from the predetermined density.

16. An ink jet recording method utilizing plural ink discharge means for discharging ink onto a recording medium to form an image, said plural ink discharge means discharging plural kinds of ink, each with a respectively different density, said method comprising the steps of:

obtaining an output image density signal for driving the ink discharge means for discharging ink having a predetermined density in accordance with an image density exhibited by the image density signal;

converting the output image density signal into binary data;

inverting the binary data; and distributing the binary data and the inverted binary data into drive data for driving the plural ink discharge means for discharging the plural kinds of ink each with a different density.

17. An ink jet recording method according to claim 16, wherein in said distributing step the binary data is converted into drive data for driving the ink discharge means for discharging ink having the predetermined density and the binary data inverted in said inverting step is converted into drive data for driving the ink discharge means for discharging ink having a density different from the predetermined density.

* * * * *

UNITED STATES PATENT AND TRADEMARK OFFICE
CERTIFICATE OF CORRECTION

PATENT NO. : 5,825,377
DATED : October 20, 1998
INVENTOR(S) : GOTOH ET AL.

It is certified that error appears in the above-identified patent and that said Letters Patent is hereby corrected as shown below:

ON THE TITLE PAGE:

Item [56] References Cited:
FOREIGN PATENT DOCUMENTS, "2210962" should read --2-210962--.

COLUMN 6:
Line 8, "of" should read --of 3--.

COLUMN 13:
Line 9, "functions and operates" should read --function and operate--.

COLUMN 14:
Line 28, "which" should read --and--.

COLUMN 15:
Line 10, "an" should read --a--.

COLUMN 17:
Line 23, "are" should be deleted.

COLUMN 19:
Line 35, "In" should begin a new paragraph.
Line 59, "($\alpha$is" should read --($\alpha$ is--.

UNITED STATES PATENT AND TRADEMARK OFFICE
CERTIFICATE OF CORRECTION

PATENT NO. : 5,825,377
DATED : October 20, 1998
INVENTOR(S) : GOTOH ET AL.

It is certified that error appears in the above-identified patent and that said Letters Patent is hereby corrected as shown below:

COLUMN 20:
　　Line 51, "($Mu_{K48}$)," should read --$M_{U48}$),--.

COLUMN 23:
　　Line 6, "of 0.5" should read --of or around 0.5--.
　　Line 7, "or around" should be deleted.
　　Line 57, "regarding" should read --relating--.

COLUMN 24:
　　Line 34, "that the" should read --with the ink being--.
　　Line 35, "ink is" should be deleted and "at" should be deleted.
　　Line 57, "to" should read --using--.

COLUMN 25:
　　Line 16, "pressurizing" should read --pressing--.
　　Line 31, "them." should read --read original data.--

UNITED STATES PATENT AND TRADEMARK OFFICE
CERTIFICATE OF CORRECTION

PATENT NO. : 5,825,377
DATED : October 20, 1998
INVENTOR(S) : GOTOH ET AL.

It is certified that error appears in the above-identified patent and that said Letters Patent is hereby corrected as shown below:

COLUMN 27:
Line 20, "conversion" should read --conversion element--.

Signed and Sealed this

Nineteenth Day of September, 2000

Q. TODD DICKINSON

Attest:

Attesting Officer

Director of Patents and Trademarks